United States Patent
Hum et al.

(10) Patent No.: US 10,587,541 B2
(45) Date of Patent: *Mar. 10, 2020

(54) DEVICE, METHOD, AND GRAPHICAL USER INTERFACE FOR LIGHTWEIGHT MESSAGING

(71) Applicant: Facebook, Inc., Menlo Park, CA (US)

(72) Inventors: Sarah Hum, Richmond Hill (CA); Andrew Nolan Rasmussen, San Francisco, CA (US); Arturo J Esquivel Chambergo, Elizabeth, NJ (US); Tatiana Janov Grossman, Palo Alto, CA (US); Ursula Anne Lim, Burnaby (CA); Robert Michael Baldwin, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 646 days.

This patent is subject to a terminal disclaimer.

(21) Appl. No.: 14/558,661

(22) Filed: Dec. 2, 2014

(65) Prior Publication Data

US 2016/0156574 A1 Jun. 2, 2016

(51) Int. Cl.
*H04L 12/58* (2006.01)
*G06Q 50/00* (2012.01)
(Continued)

(52) U.S. Cl.
CPC .......... *H04L 51/046* (2013.01); *G06Q 10/02* (2013.01); *G06Q 20/10* (2013.01); *G06Q 50/01* (2013.01); *H04L 51/02* (2013.01); *H04L 51/32* (2013.01)

(58) Field of Classification Search
None
See application file for complete search history.

(56) References Cited

U.S. PATENT DOCUMENTS

| 5,213,510 A | * | 5/1993 | Freeman | ................. G09B 5/04 434/319 |
| 6,718,368 B1 | * | 4/2004 | Ayyadurai | .............. H04L 51/12 704/1 |

(Continued)

FOREIGN PATENT DOCUMENTS

| CN | 103079008 B | * | 5/2015 | |
| EP | 2688014 A1 | * | 1/2014 | ........... G06F 17/276 |

(Continued)

*Primary Examiner* — Yongjia Pan
(74) *Attorney, Agent, or Firm* — Morgan, Lewis & Bockius LLP

(57) ABSTRACT

An electronic device of a second user receives, from a first user, a first message. Subsequent to receiving the first message, the electronic device sends, to the first user, a second message responsive to the first message, wherein the second message is selected from a set of predefined first-reply messages. The set of predefined first-reply messages is based on first-reply factors for the second user, including content from one or more messages between the first user and the second user, and including one or more of: relationship characteristics between the first user and the second user, information provided by the first user and/or the second user to a social network, profile characteristics of the first user and/or the second user, environmental characteristics of the first user and/or the second user, and/or technical characteristics of the electronic device of the first user and/or the second user.

23 Claims, 33 Drawing Sheets

(51) Int. Cl.
  *G06Q 20/10* (2012.01)
  *G06Q 10/02* (2012.01)

(56) References Cited

U.S. PATENT DOCUMENTS

| | | | | |
|---|---|---|---|---|
| 6,980,870 | B1* | 12/2005 | Mok | G06Q 10/10 700/16 |
| 7,406,504 | B2* | 7/2008 | Paul | G06Q 10/107 709/206 |
| 8,078,978 | B2* | 12/2011 | Perry | G06F 17/24 715/752 |
| 8,150,385 | B1* | 4/2012 | Majeti | G06Q 10/107 455/418 |
| 8,385,975 | B2* | 2/2013 | Forutanpour | H04L 51/02 455/415 |
| 8,423,577 | B1* | 4/2013 | Lee | G06Q 10/1093 705/5 |
| 8,571,937 | B2* | 10/2013 | Rose | G06Q 20/12 340/506 |
| 8,577,401 | B1* | 11/2013 | Osinga | H04W 4/21 455/466 |
| 8,583,148 | B2* | 11/2013 | Ollila | G06F 3/0237 455/466 |
| 8,589,407 | B2* | 11/2013 | Bhatia | G06F 17/30528 707/748 |
| 8,626,748 | B2* | 1/2014 | McDougall | G06F 3/0481 707/721 |
| 8,825,474 | B1* | 9/2014 | Zhai | G06F 17/276 704/1 |
| 8,868,566 | B2* | 10/2014 | Yanagihara | G06Q 10/107 707/748 |
| 8,893,023 | B2* | 11/2014 | Perry | G06F 17/24 715/752 |
| 8,996,639 | B1* | 3/2015 | Faaborg | H04L 51/02 455/412.1 |
| 9,100,809 | B2* | 8/2015 | Olincy | H04M 3/42365 |
| 9,134,215 | B1* | 9/2015 | Vignisson | G06N 5/04 |
| 9,191,786 | B2* | 11/2015 | Davis | H04W 4/12 |
| 9,213,941 | B2* | 12/2015 | Petersen | G06Q 10/107 |
| 9,237,231 | B2* | 1/2016 | Swanburg | H04L 29/12047 |
| 9,244,905 | B2* | 1/2016 | Joshi | G06F 17/276 |
| 9,306,878 | B2* | 4/2016 | Patil | G06F 17/276 |
| 9,602,988 | B1* | 3/2017 | Hajdu | H04M 1/7253 |
| 9,685,160 | B2* | 6/2017 | Lee | H04M 1/72552 |
| 9,722,957 | B2* | 8/2017 | Dymetman | H04L 51/02 |
| 9,805,371 | B1* | 10/2017 | Sapoznik | G06Q 30/016 |
| 2004/0162724 | A1* | 8/2004 | Hill | G10L 15/22 704/231 |
| 2006/0247915 | A1* | 11/2006 | Bradford | G06F 3/0481 704/1 |
| 2007/0094217 | A1* | 4/2007 | Ronnewinkel | G06F 17/30707 706/52 |
| 2008/0189189 | A1* | 8/2008 | Morgenstern | G06Q 30/02 705/12 |
| 2008/0244010 | A1* | 10/2008 | Singh | G06F 15/16 709/206 |
| 2009/0076795 | A1* | 3/2009 | Bangalore | G06F 17/2785 704/9 |
| 2009/0253445 | A1* | 10/2009 | Bettis | H04L 51/066 455/466 |
| 2009/0254624 | A1* | 10/2009 | Baudin | G06Q 10/107 709/206 |
| 2009/0282114 | A1* | 11/2009 | Feng | G06Q 10/107 709/206 |
| 2010/0145694 | A1* | 6/2010 | Ju | G10L 15/1815 704/235 |
| 2010/0167766 | A1* | 7/2010 | Duarte | H04L 51/16 455/466 |
| 2010/0223341 | A1* | 9/2010 | Manolescu | H04L 51/32 709/206 |
| 2010/0312769 | A1* | 12/2010 | Bailey | G06F 17/30705 707/740 |
| 2011/0191717 | A1* | 8/2011 | Cort | G06F 3/048 715/816 |
| 2011/0302249 | A1* | 12/2011 | Orr | G06O 10/107 709/206 |
| 2012/0094698 | A1* | 4/2012 | Casto | H04W 4/14 455/456.4 |
| 2012/0265819 | A1* | 10/2012 | McGann | G06Q 30/00 709/204 |
| 2012/0272160 | A1* | 10/2012 | Spivack | G06Q 10/10 715/752 |
| 2012/0290662 | A1* | 11/2012 | Weber | G06N 99/005 709/206 |
| 2012/0323928 | A1* | 12/2012 | Bhatia | G06F 17/30528 707/748 |
| 2013/0144785 | A1* | 6/2013 | Karpenko | G06Q 20/409 705/44 |
| 2013/0212190 | A1* | 8/2013 | Patil | G06F 17/276 709/206 |
| 2013/0246329 | A1* | 9/2013 | Pasquero | G06F 17/276 706/52 |
| 2013/0253906 | A1* | 9/2013 | Archer | G06F 17/276 704/9 |
| 2013/0328665 | A1* | 12/2013 | Cranfill | G06Q 10/109 340/7.55 |
| 2013/0346804 | A1* | 12/2013 | Shanbhag | G06F 11/3684 714/38.1 |
| 2014/0004889 | A1* | 1/2014 | Davis | H04W 4/12 455/466 |
| 2014/0115078 | A1* | 4/2014 | Bhatia | G06F 17/30528 709/206 |
| 2014/0122407 | A1* | 5/2014 | Duan | G06N 5/02 706/50 |
| 2014/0122584 | A1* | 5/2014 | Gargi | G06Q 50/01 709/204 |
| 2014/0163954 | A1* | 6/2014 | Joshi | G06F 17/276 704/9 |
| 2014/0214605 | A1* | 7/2014 | Argue | G06Q 30/00 705/26.9 |
| 2014/0244622 | A1* | 8/2014 | Lindsay | G06F 17/276 707/722 |
| 2014/0317030 | A1* | 10/2014 | Shen | G06N 3/006 706/12 |
| 2014/0337438 | A1* | 11/2014 | Govande | H04L 51/063 709/206 |
| 2015/0032724 | A1* | 1/2015 | Thirugnanasundaram | G06F 17/30654 707/722 |
| 2015/0100537 | A1* | 4/2015 | Grieves | G06N 5/048 706/52 |
| 2015/0188861 | A1* | 7/2015 | Esplin | H04L 51/06 709/206 |
| 2015/0200878 | A1* | 7/2015 | Shih | H04L 51/046 709/206 |
| 2015/0207765 | A1* | 7/2015 | Brantingham | H04L 51/046 715/758 |
| 2015/0302301 | A1* | 10/2015 | Petersen | G06N 5/04 706/11 |
| 2015/0348002 | A1* | 12/2015 | Van Os | G06Q 20/40 705/44 |
| 2015/0350118 | A1* | 12/2015 | Yang | H04L 51/02 715/752 |
| 2016/0092432 | A1* | 3/2016 | Smadja | G06F 3/048 715/733 |
| 2016/0247068 | A1* | 8/2016 | Lin | G06F 17/28 |
| 2016/0337301 | A1* | 11/2016 | Rollins | H04L 51/02 |
| 2017/0149703 | A1* | 5/2017 | Willett | H04W 4/12 |

FOREIGN PATENT DOCUMENTS

KR 101359718 B1 * 2/2014 .......... G06F 17/279
WO WO2012154317 A1 * 11/2012

* cited by examiner

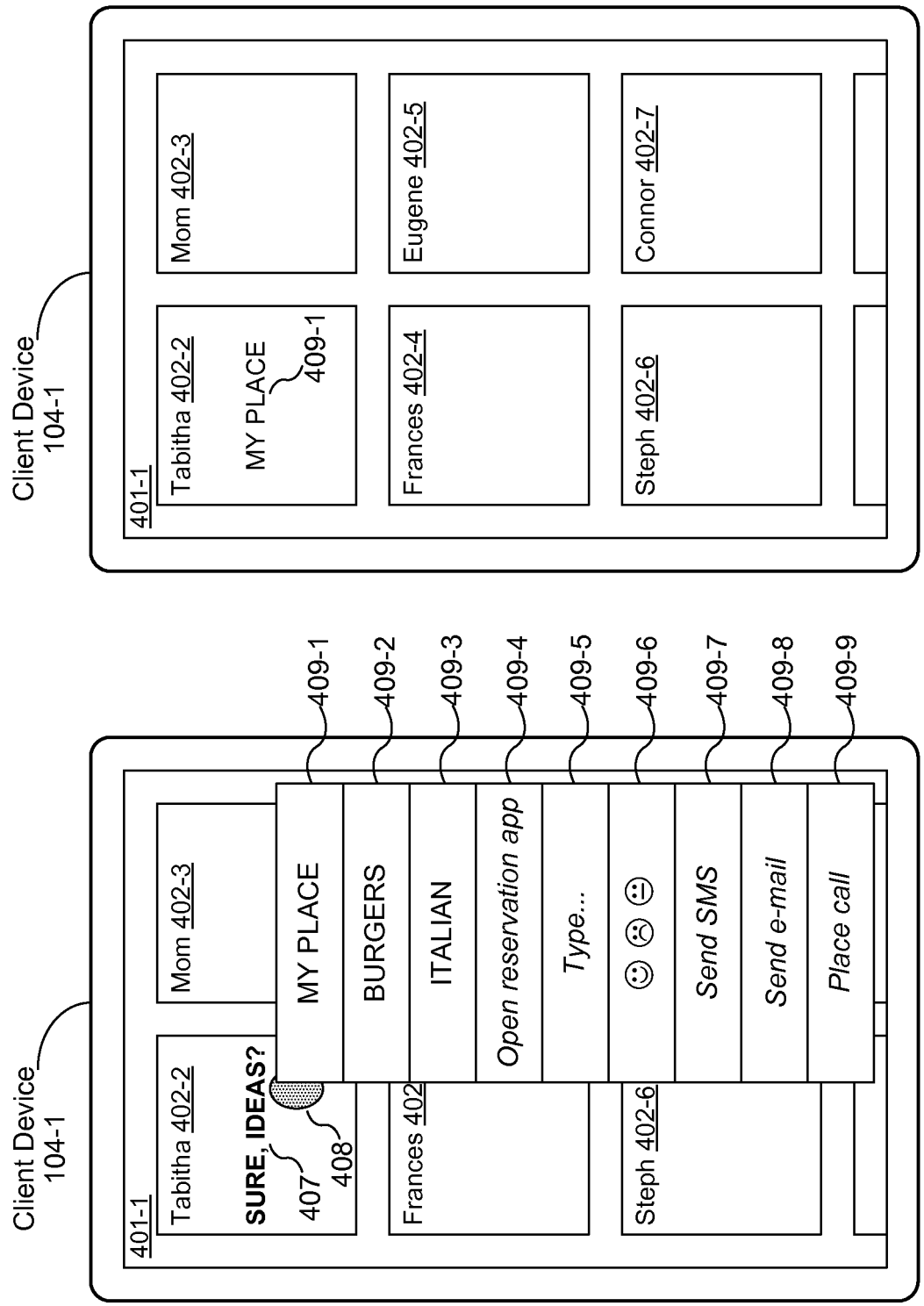

```
Subsequent to receiving, from the electronic device of the second user, the    ─1033
second message responsive to the first message received by the second
                                    user:

(C)

Receive, from the electronic device of the first user, a third message
    responsive to the second message received from the second user,          ─1034
    wherein the third message is selected by the first user from the set of
                       predefined second-reply messages Sending the third message to the electronic device of the first user  ─1035

(D)

In accordance with a determination that application-launch criteria are
    satisfied by content in the first message and/or content in the second    ─1036
    message, send instructions for activating and displaying an application,
    distinct from the messaging application, to the electronic device of the
                                  second user The first message is sent to a messaging application in the electronic
    device of the second user, the set of predefined first-reply messages     ─1037
    is sent to the messaging application, and the second message is
                       received from the messaging application
```

Figure 10D

DEVICE, METHOD, AND GRAPHICAL USER INTERFACE FOR LIGHTWEIGHT MESSAGING

TECHNICAL FIELD

This relates generally to social networking, including but not limited to messaging between users.

BACKGROUND

Social networks and instant messaging programs on electronic devices provide a convenient means of communications between individuals, where text characters and symbols are combined to compose messages.

Forming strings of text, however, typically involves the manual input and selection of characters using a physical or virtual keyboard. As such, electronic messaging is often inefficient and time-consuming, and subject to both human and machine-based inaccuracies.

SUMMARY

Accordingly, there is a need for devices with methods and interfaces for using sets of predefined messages to communicate between individuals and entities. Intelligently and automatically determining a relevant set of predefined messages, based on a variety of factors, can greatly improve messaging efficiency. Such methods and interfaces optionally complement or replace conventional methods of electronic messaging.

In accordance with some embodiments, a method is performed at an electronic device of a second user, the electronic device having a processor and memory storing instructions for execution by the processor. The method includes: receiving, from a first user, a first message. Subsequent to receiving the first message, the method includes sending to the first user, a second message responsive to the first message received by the second user, wherein the second message from the second user is selected by the second user from a set of predefined first-reply messages. Furthermore, the set of predefined first-reply messages is based on a plurality of first-reply factors for the second user, where the first-reply factors for the second user include content from one or more messages between the first user and the second user, and include one or more of: relationship characteristics between the first user and the second user; information provided by the first user and/or the second user to a social network; profile characteristics of the first user and/or the second user; environmental characteristics of the first user and/or the second user; and/or technical characteristics of the electronic device of the first user and/or the second user.

Furthermore, in accordance with some embodiments, a method is performed at a server system with a processor and memory storing instructions for execution by the processor. The method includes: receiving a first message from an electronic device of a first user. After receiving the first message from the electronic device of the first user, the method includes sending the first message to an electronic device of a second user, and producing, for the second user, a set of predefined first-reply messages, wherein the set of predefined first-reply messages is based on a plurality of first-reply factors for the second user. The first-reply factors for the second user include content from one or more messages between the first user and the second user. Furthermore, the first-reply factors for the second user include one or more of: relationship characteristics between the first user and the second user; information provided by the first user and/or the second user to a social network; profile characteristics of the first user and/or the second user; environmental characteristics of the first user and/or the second user; and/or technical characteristics of the electronic device of the first user and/or the second user. The method further includes sending, to the electronic device of the second user, the set of predefined first-reply messages, and receiving, from the electronic device of the second user, a second message responsive to the first message received from the first user, wherein the second message is selected by the second user from the set of predefined first-reply messages. The second message is then sent to the electronic device of the first user.

Additionally, in accordance with some embodiments, a method is performed at a server system with a processor and memory storing instructions for execution by the processor. The method includes: sending, to an electronic device of a first user, a data structure that includes a hierarchical interaction tree having a plurality of interaction nodes. Furthermore, the method includes receiving, from the electronic device of the first user, a first message, wherein the first message from the electronic device of the first user is selected from a set of predefined first-reply messages, and each first-reply message of the set of predefined first-reply messages corresponds to a distinct interaction node of the hierarchical interaction tree.

In accordance with some embodiments, an electronic device includes an optional display, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a display, a memory, and one or more processors to execute one or more programs stored in the memory includes one or more of the elements displayed in the method described above, which are updated in response to inputs, as described in the method described above. In accordance with some embodiments, a computer readable storage medium has stored therein instructions which when executed by an electronic device with an optional display, and one or more processors, cause the device to perform the operations of the method described above. In accordance with some embodiments, an electronic device includes an optional display and means for performing the operations of the method described above. Thus, electronic devices are provided with methods and interfaces for messaging.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 4A-4F, 5A-5E, and 6A-6F illustrate exemplary user interfaces for messaging, in accordance with some embodiments.

FIGS. 9A-9G, 10A-10I, and 11A-11C are flow diagrams illustrating a method of messaging, in accordance with some embodiments.

DESCRIPTION OF EMBODIMENTS

As noted above, because the manual entry of characters and symbols to form strings of text is inefficient and time-consuming, it would be beneficial to use relevant sets of predefined messages as a means for communicating with other users. Identifying and selecting relevant predefined messages by considering, for example, a variety of factors relating to the context of a conversation, or the observed messaging behavior of individuals in the conversation, allows users to communicate in a more efficient manner.

Accordingly, the present application describes devices, methods, and interfaces for using sets of predefined messages to communicate with users. These devices and methods send and receive messages that are selected by users from sets of predefined reply messages.

Reply factors are relied upon to determine a relevant set of predefined reply messages, including, for example, previous messages between users in a conversation. For example, if a first user sends a message to a second user inquiring about his plans for the day (e.g., "WHAT R U UP TO?"), a relevant set of predefined reply messages should include reply messages directed towards answering the question of that previous message.

Other reply factors relate to information about users in the conversation, such as a current location of users (e.g., GPS coordinates of the device), profile information (e.g., hobbies), and technical characteristics of the device (e.g., mobile device). Response statistics of the user (e.g., which predefined messages are most frequently chosen) are also used to determine a relevant set of predefined reply messages.

Figure 5B:
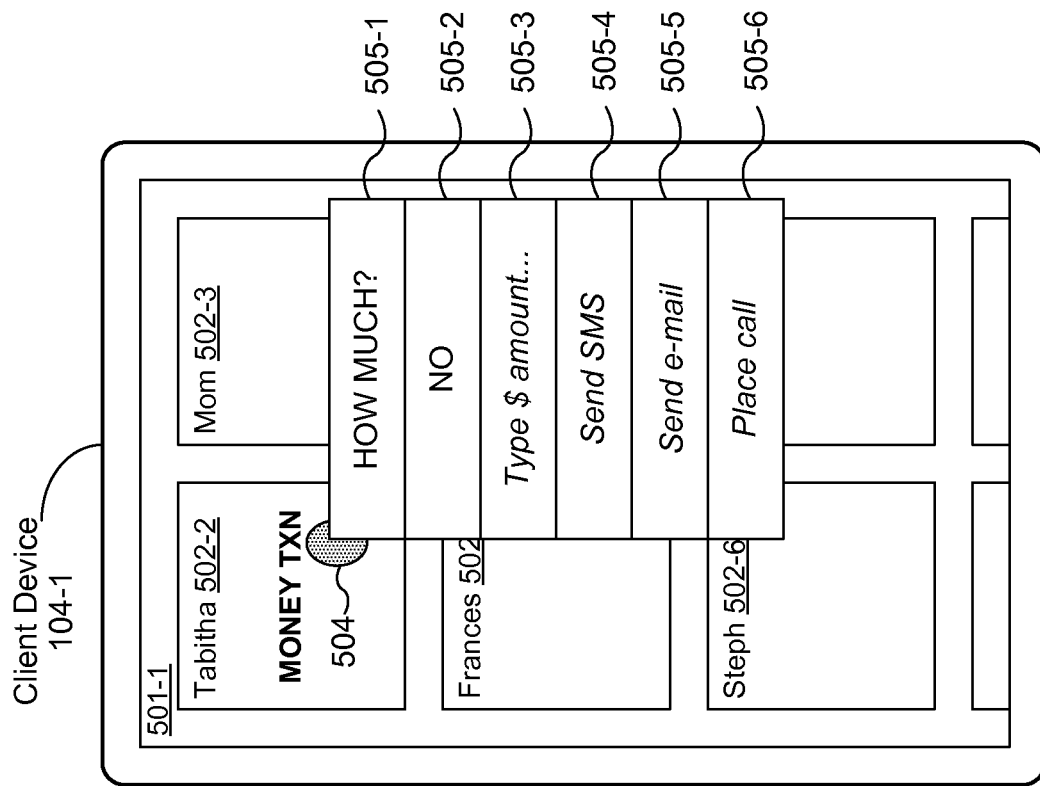
Figure 6B:
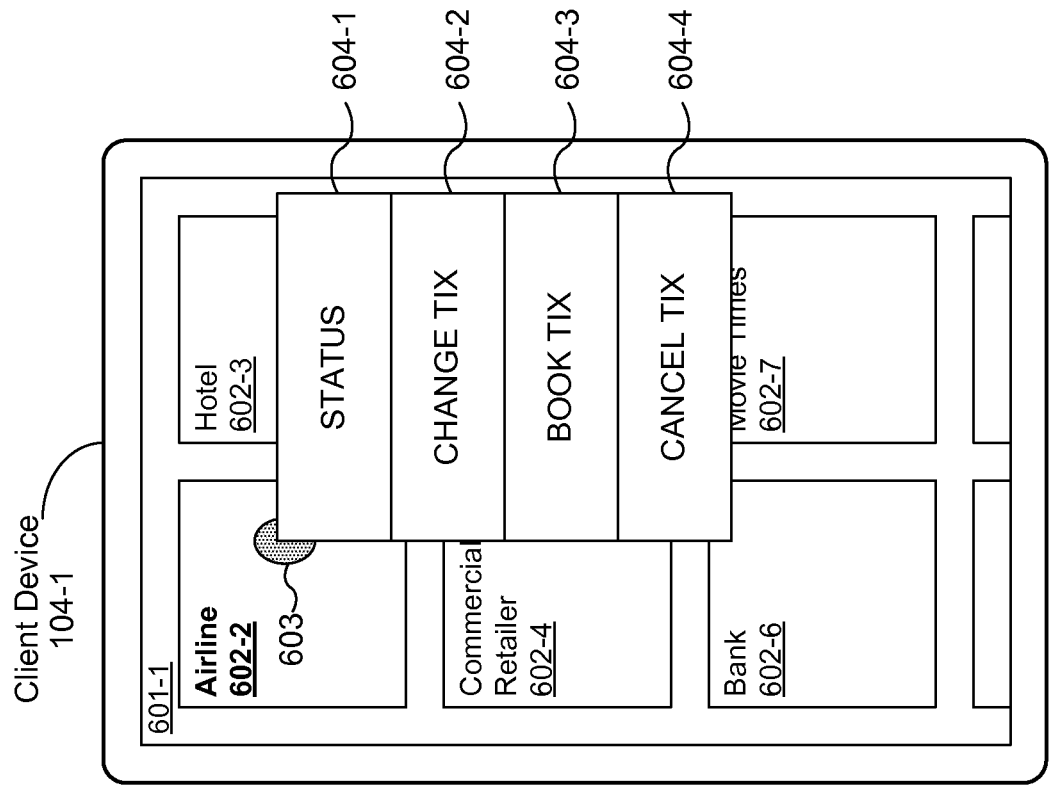
Figure 7:
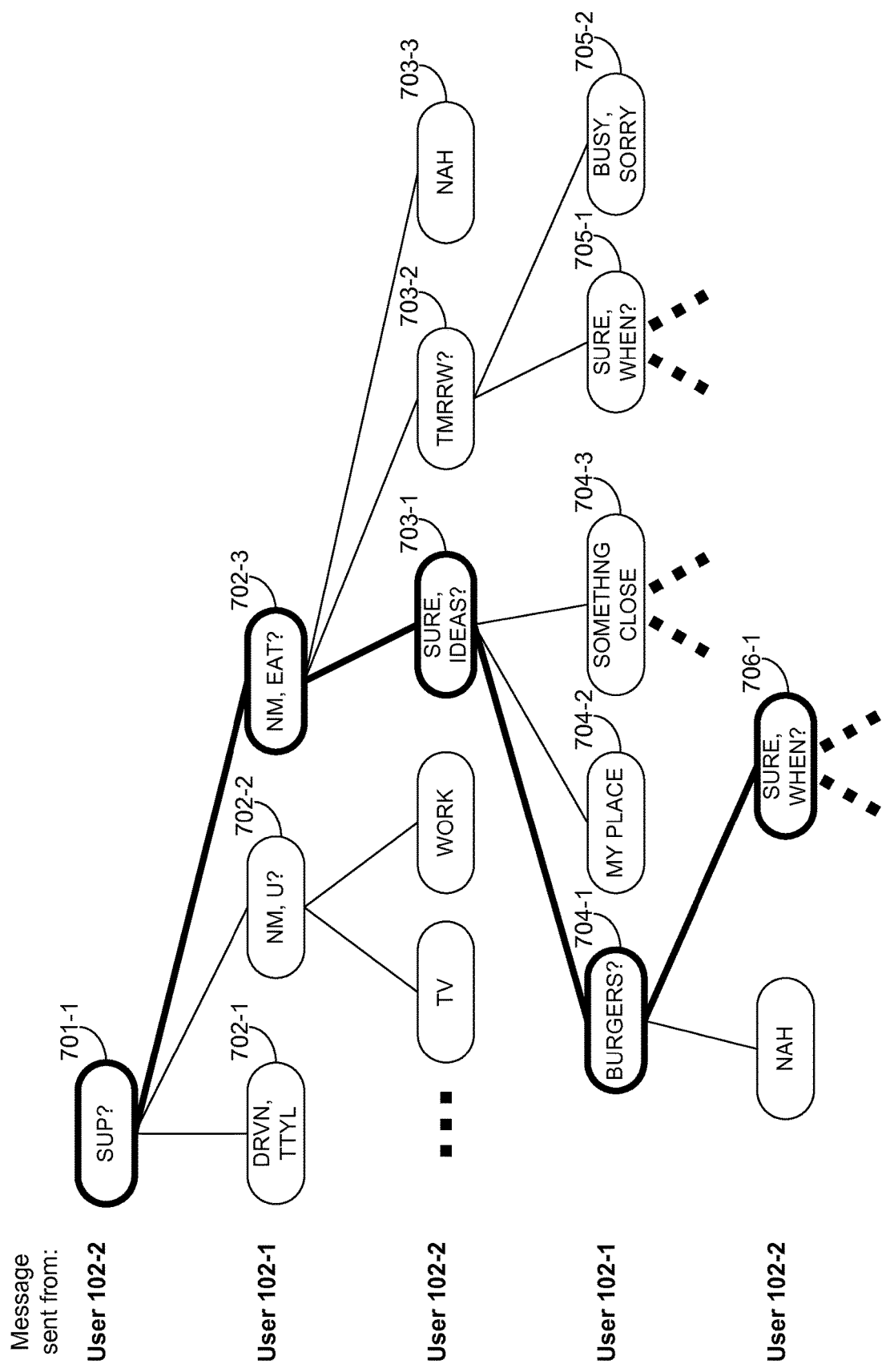
FIG. 7 illustrates predefined reply messages, in accordance with some embodiments.
Figure 8:
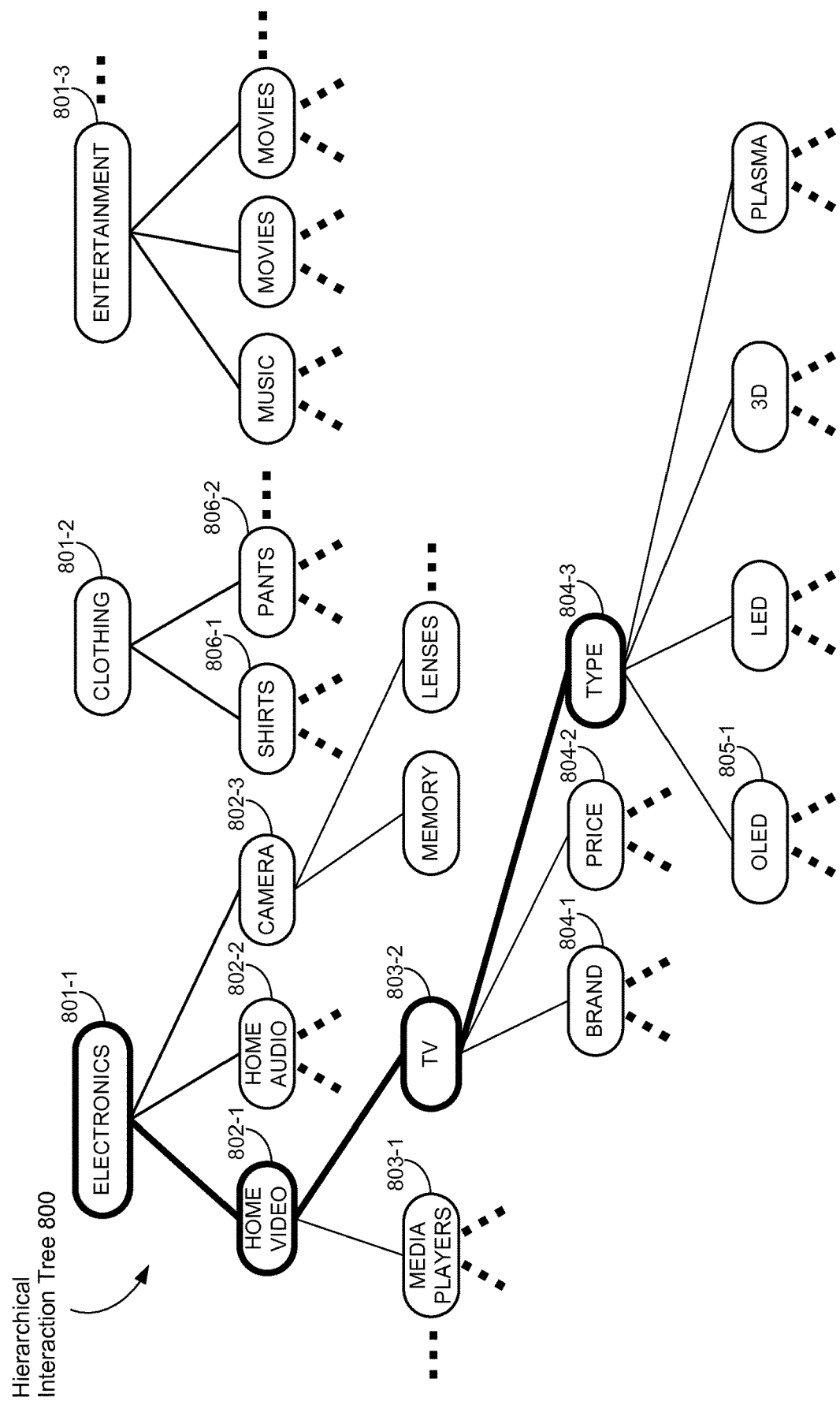
FIG. 8 illustrates a hierarchical interaction tree, in accordance with some embodiments.

Below, FIGS. 4A-4F, 5A-5E, and 6A-6F illustrate exemplary user interfaces for messaging. FIG. 7 illustrates predefined reply messages and FIG. 8 illustrates a hierarchical interaction tree. FIGS. 9A-9G, 10A-10I, and 11A-11C are flow diagrams illustrating a method of messaging. The user interfaces in FIGS. 4A-4F, 5A-5E, and 6A-6F are used to illustrate the processes in FIGS. 9A-9G, 10A-10I, and 11A-11C.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user interface could be termed a second user interface, and, similarly, a second user interface could be termed a first user interface, without departing from the scope of the various described embodiments. The first user interface and the second user interface are both user interfaces, but they are not the same user interface.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
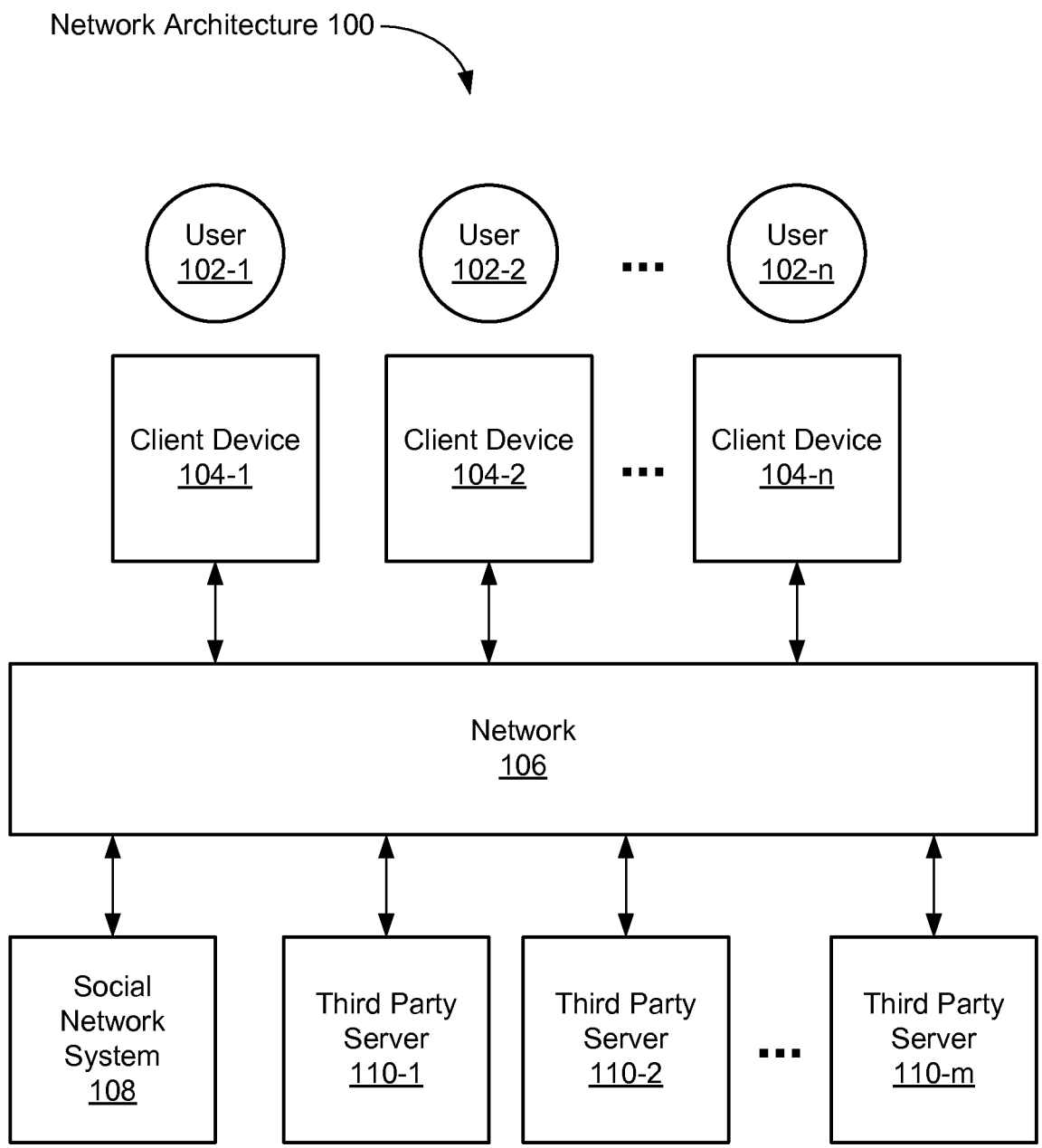
FIG. 1 is a block diagram illustrating an exemplary network architecture of a social network in accordance with some embodiments.

FIG. 1 is a block diagram illustrating an exemplary network architecture of a social network in accordance with some embodiments. The network architecture 100 includes a number of client devices (also called "client systems," "client computers," or "clients") 104-1, 104-2, . . . 104-n communicably connected to a social network system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social network system and other computing devices (e.g., via the electronic social network system). In some embodiments, the social network system 108 is a single computing device such as a computer server, while in other embodiments, the social network system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to access the social network system 108 and to participate in a social networking service. For example, one or more of the client devices 104-1, 104-2, . .

. 104-n execute web browser applications that can be used to access the social networking service. As another example, one or more of the client devices 104-1, 104-2, . . . 104-n execute software applications that are specific to the one or more social networks (e.g., social networking "apps" running on smart phones or tablets, such as a Facebook social networking application, a messaging application, etc., running on an iPhone, Android, or Windows smart phone or tablet).

Users interacting with the client devices 104-1, 104-2, . . . 104-n can participate in the social networking service provided by the social network system 108 by providing and/or consuming (e.g., posting, writing, viewing, publishing, broadcasting, promoting, recommending, sharing) information, such as text comments (e.g., statuses, updates, announcements, replies, location "check-ins," private/group messages), digital content (e.g., photos, videos, audio files, links, documents), and/or other electronic content. In some embodiments, users provide information to a page, group, message board, feed, and/or user profile of a social networking service provided by the social network system 108. Users of the social networking service can also annotate information posted by other users of the social networking service (e.g., endorsing or "liking" a posting of another user, or commenting on a posting by another user). In some embodiments, information can be posted on a user's behalf by systems and/or services external to the social network or the social network system 108. For example, the user may post a review of a movie to a movie review website, and with proper permissions that website may cross-post the review to the social network on the user's behalf. In another example, a software application executing on a mobile client device, with proper permissions, may use global positioning system (GPS) or other geo-location capabilities (e.g., Wi-Fi or hybrid positioning systems) to determine the user's location and update the social network with the user's location (e.g., "At Home," "At Work," or "In San Francisco, Calif."), and/or update the social network with information derived from and/or based on the user's location. Users interacting with the client devices 104-1, 104-2, . . . 104-n can also use the social network provided by the social network system 108 to define groups of users. Users interacting with the client devices 104-1, 104-2, . . . 104-n can also use the social network provided by the social network system 108 to communicate (e.g., using a messaging application or built-in feature) and collaborate with each other.

In some embodiments, the network architecture 100 also includes third-party servers 110-1, 110-2, . . . 110-m. In some embodiments, a given third-party server is used to host third-party websites that provide web pages to client devices 104, either directly or in conjunction with the social network system 108. In some embodiments, the social network system 108 uses iframes to nest independent websites within a user's social network session. In some embodiments, a given third-party server is used to host third-party applications that are used by client devices 104, either directly or in conjunction with the social network system 108. In some embodiments, social network system 108 uses iframes to enable third-party developers to create applications that are hosted separately by a third-party server 110, but operate within a social networking session of a user and are accessed through the user's profile in the social network system. Exemplary third-party applications include applications for books, business, communication, contests, education, entertainment, fashion, finance, food and drink, games, health and fitness, lifestyle, local information, movies, television, music and audio, news, photos, video, productivity, reference material, reservations, scheduling, security, shopping, sports, travel, utilities, and the like. In some embodiments, a given third-party server is used to host enterprise systems, that are used by client devices 104, either directly or in conjunction with the social network system 108. In some embodiments, a given third-party server is used to provide third-party content (e.g., news articles, reviews, message feeds, etc.). In some embodiments, a given third-party server stores data structures (e.g., hierarchical interaction trees) used for facilitating customer relationship management (CRM), such as product catalogs, troubleshooting guides, directories, etc.

In some embodiments, a given third-party server 110 is a single computing device, while in other embodiments, a given third-party server 110 is implemented by multiple computing devices working together to perform the actions of a server system (e.g., cloud computing).

Figure 2:
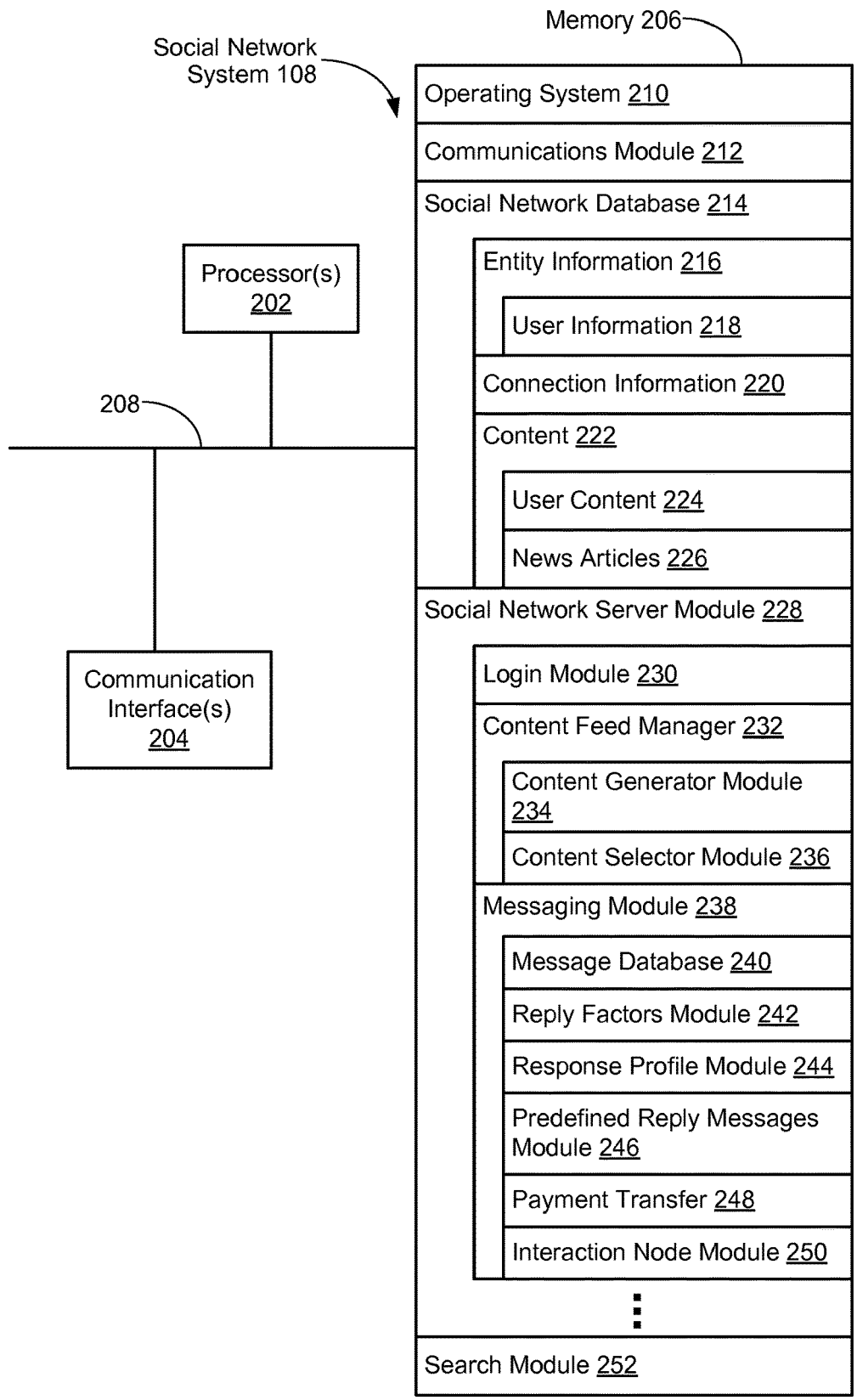
FIG. 2 is a block diagram illustrating an exemplary social network system in accordance with some embodiments.

FIG. 2 is a block diagram illustrating an exemplary social network system 108 in accordance with some embodiments. The social network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social network system 108 to other computers via the one or more communication network interfaces 204 (wired or wireless) and one or more communication networks, such as the Internet, cellular telephone networks, mobile data networks, other wide area networks, local area networks, metropolitan area networks, and so on;
- a social network database 214 for storing data associated with the social network, such as:
  - entity information 216, such as user information 218;
  - connection information 220; and
  - content 222, such as user content 224 and/or news articles 226;
- a social network server module 228 for providing social networking services and related features, in conjunction with browser module 338 or social network client module 340 on the client device 104, which includes:
- a login module 230 for logging a user 102 at a client 104 into the social network system 108; and
- a content feed manager 232 for providing content to be sent to clients 104 for display, which includes:
  - a content generator module 234 for describing objects in the social network database 214, such as messages, images, videos, audio files, comments, status messages, links, applications, and/or other entity information 216, connection information 220, or content 222; and
  - a content selector module 236 for choosing the information/content to be sent to clients 104 for display;
- a messaging module 238 for sending, receiving, and/or sending instructions for displaying messages to entities of a network (e.g., network 106, a social network provided by social network system 108, etc.), which includes:
  - a message database 240 for storing sent and/or received messages from entities of a network;
  - a reply factors module 242 for retrieving and/or storing information regarding one or more reply factors for a respective user of client device 104 (e.g., from memory 206 of social network system 108 and/or memory 306 of client device 104, etc.);
  - a response profile module 244 for updating, managing, retrieving, and/or storing response statistics for, a user response profile of the respective user of client device 104, and/or a generic response profile of a group of users (e.g., multiple users 102);
  - a predefined reply messages module 246 for determining, sending instructions for displaying, and/or detecting a selection of a message from, a set of predefined reply messages based on retrieved reply factors and/or response profiles;
  - a payment transfer 248 module for creating and/or processing requests for payments, including providing an interface and/or establishing connectivity with financial sources of users and/or entities (e.g., businesses) of a network (e.g., social network provided by social network system 108); and
  - an interaction node module 250 for creating data structures that include a hierarchical interaction tree having a plurality of interaction nodes, detecting selection (by a respective user of client device 104) of one or more interaction nodes, and/or accordingly sending instructions for navigating the hierarchical interaction tree (i.e., instructions for displaying, and presenting for selection, one or more branching interaction nodes); and
- a search module 252 for enabling users of the social network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

See U.S. Patent Application Publication Number US 2013/0124538 for an exemplary graph database for a social network.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social network system 108 transmits a "friend request" to the second user. If the second user confirms the "friend request," the social network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like," "attended," "played," "listened," "cooked," "worked at," or "watched" the entity at the other node. The page in the social networking service that corresponds to the entity at the other node may include, for example, a selectable "like," "check in," or "add to favorites" icon. After the user clicks one of these icons, the social network system 108 may create a "like" edge, "check in" edge, or a "favorites" edge in response to the corresponding user action. As another example, the user may listen to a particular song using a particular application (e.g., an online music application). In this case, the social network system 108 may create a "listened" edge and a "used" edge between the user node that corresponds to the user and the entity nodes that correspond to the song and the application, respectively, to indicate that the user listened to the song and used the application. In addition, the social network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Figure 3:
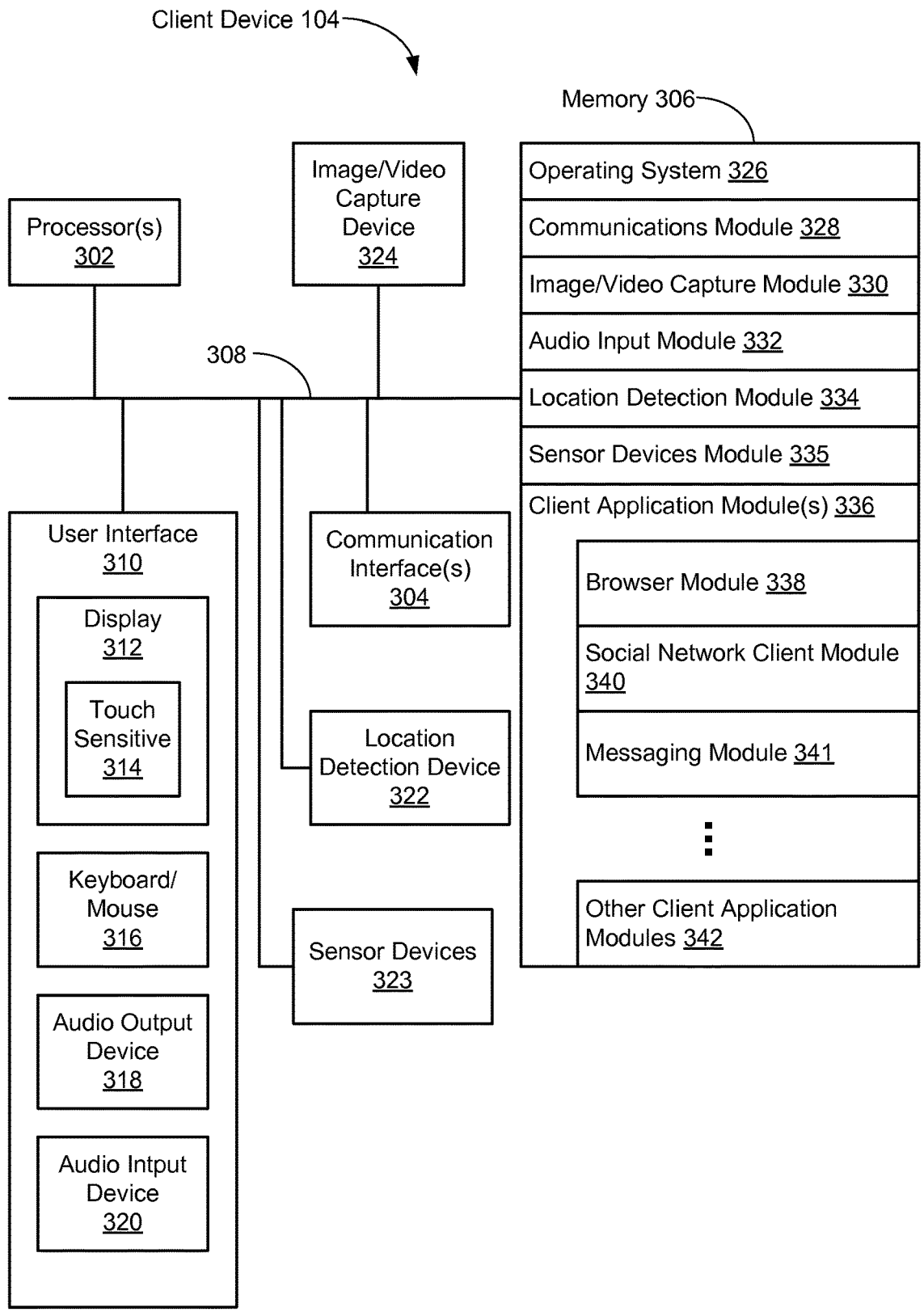
FIG. 3 is a block diagram illustrating an exemplary client device in accordance with some embodiments.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device includes inputs such as a keyboard, mouse, and/or other input buttons 316. Alternatively or in addition, in some embodiments, the display device 312 includes a touch-sensitive surface 314, in which case the display device 312 is a touch-sensitive display. In client systems that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. Furthermore, some client device 104 include optional sensor devices 323, such as a gyroscope for determining an orientation of client device 104 and/or an accelerometer for measuring non-gravitational acceleration and movement of the client device 104. The client device 104 also optionally includes an image/video capture device 324, such as a camera or webcam.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the processor(s) 302. Memory 306, or alternately the non-volatile memory device(s) within memory 306, includes a non-transitory computer readable storage medium. In some embodiments, memory 306 or the computer readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social network system 108;
- an audio input module 332 (e.g., a microphone module) for processing audio captured by the audio input device 320, where the respective audio may be sent or streamed (e.g., by a client application module 336) to the social network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340);
- a sensor device module 335 (e.g., gyroscope and/or accelerometer module) for determining an orientation of client device 104 (e.g., using a gyroscope of sensor devices 323) and/or for measuring non-gravitational acceleration and movement of the client device 104 (e.g., using an accelerometer of sensor devices 323);
- one or more client application modules 336, including the following modules (or sets of instructions), or a subset or superset thereof:
    - a web browser module 338 (e.g., Internet Explorer by Microsoft, Firefox by Mozilla, Safari by Apple, or Chrome by Google) for accessing, viewing, and interacting with web sites (e.g., a social networking web site such as www.facebook.com),
    - a social network module 340 for providing an interface to a social network (e.g., a social network provided by social network system 108) and related features;
    - a messaging module 341 for sending, receiving, composing, and/or displaying messages for transmission between entities of a network (e.g., network 106, a social network provided by social network system 108, etc.); and
    - other optional client application modules 342, such as applications for word processing, calendaring, reservation booking, transferring payment, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, messaging module 341 includes a database for storing sent and/or received messages. In some embodiments, messaging module 341 retrieves information regarding one or more reply factors for a respective user of client device 104 (e.g., from memory 206 of social network system 108 and/or memory 306 of client device 104, etc.). Optionally, messaging module 341 updates, manages, and/or stores response statistics for a user response profile of the respective user of client device 104 and/or a generic response profile. In some embodiments, based on retrieved information regarding one or more reply factors, and/or a user/generic response profile, messaging module 341 determines a set of predefined reply messages based on the retrieved reply factors and/or response profiles. Optionally, an analogous module of social network system 108 (e.g., predefined reply message module 246) determines the set of predefined reply messages. In some embodiments, messaging module 341 provides an interface to a messaging application. In some embodiments, messaging module 341 processes the content of sent or received messages (e.g., detection of keywords for application—launch criteria), and in some cases provides the content (or a portion thereof) or a content identifier to a module of client device 140, a network device (e.g., third party servers 110), or an entity (e.g., business and/or user of a social network provided by social network system 108). Furthermore, in some implementations, messaging module 341 creates and/or processes requests for payments, which includes providing an interface and/or establishing connectivity with financial sources of users and/or entities (e.g., businesses) of a network (e.g., social network provided by social network system 108). In some embodiments, messaging module 341 receives data structures that include a hierarchical interaction tree having a plurality of interaction nodes, detects the selection of interaction nodes, and navigates the hierarchical interaction tree (i.e., displays and presents for selection one or more branching interaction nodes). Messaging module 341 is sometimes implemented as a sub-module of social network module 340, and provides messaging functionality between users and/or entities (e.g., businesses) of a network (e.g., social network provided by social network system 108).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of user interfaces ("UI") and associated processes that may be implemented on a client device (e.g., the client device 104 in FIG. 3).

FIGS. 4A-4F, 5A-5E, and 6A-6F illustrate exemplary user interfaces for messaging, in accordance with some embodiments. The user interfaces in these figures are used to illustrate the processes described below, including the processes in FIGS. 9A-9G, 10A-10I, and 11A-11C. While FIGS. 4A-4F, 5A-5E, and 6A-6F illustrate examples of a user interfaces for messaging (e.g., 401-1, 501-1, 601-1), other embodiments of such user interfaces display user interface elements (e.g., user interface elements 402, and/or other user interface elements not shown) in an arrangement distinct from the embodiments of FIGS. 4A-4F, 5A-5E, and 6A-6F.

Furthermore, while the operations of the examples illustrated in FIGS. 4A-4F, 5A-5E, and 6A-6F are described with respect to particular devices (e.g., in describing actions performed with respect to messages, such as sending messages to and receiving messages from a device), it will be understood that in some embodiments, the following operation is with respect to users of those particular device (e.g., sending messages to and receiving messages from a user of, or otherwise associated with, an electronic device). Similarly, operations described with reference to users of particular devices are also understood to be with respect to the particular devices themselves. For ease of reference in describing the following examples of FIGS. 4A-4F, 5A-5E, and 6A-6F, the user of client device 104-1 (e.g., user 102-1) will be referred to simply as "the user." Moreover, the users of corresponding user interface elements are distinct users of a network (although in some implementations, two or more distinct user interface elements correspond to a single user), and for the purposes of describing the following examples, will be referred to by their displayed titles (e.g., user 102-2 corresponding to user interface element 402-2 will be referred to as "Tabitha").

In particular, FIGS. 4A-4F illustrate an example in which users of a network (e.g., a social network provided by social network system 108) communicate by utilizing a messaging application.

Figure 4B:
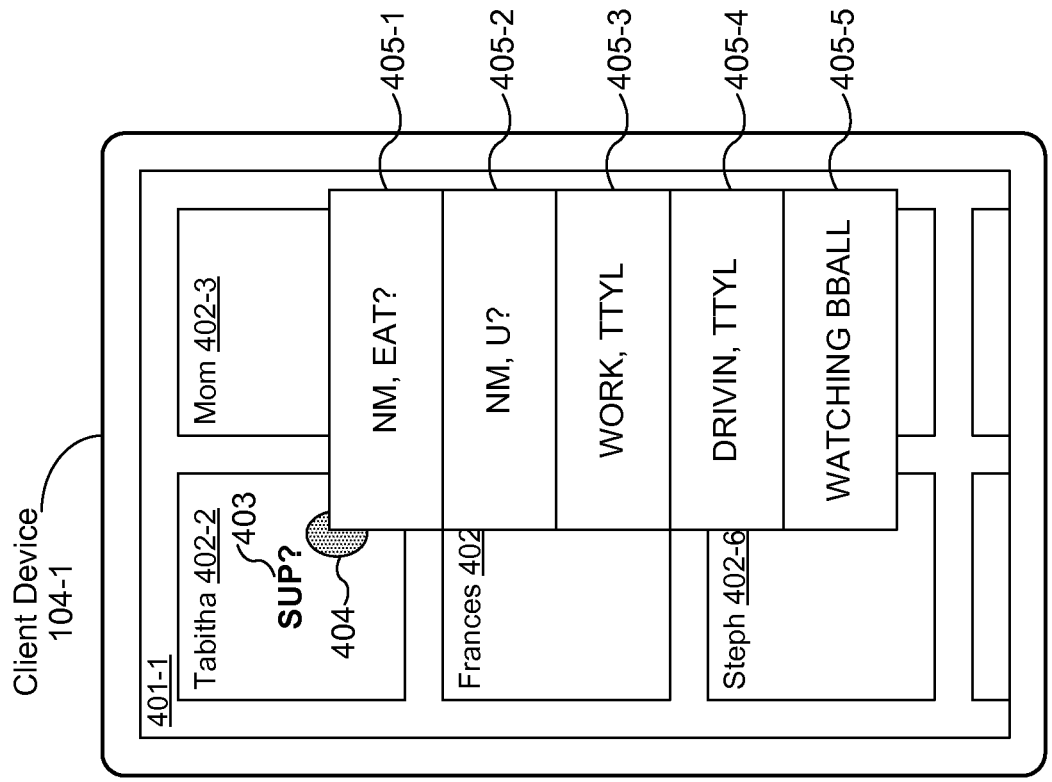
Figure 4A:
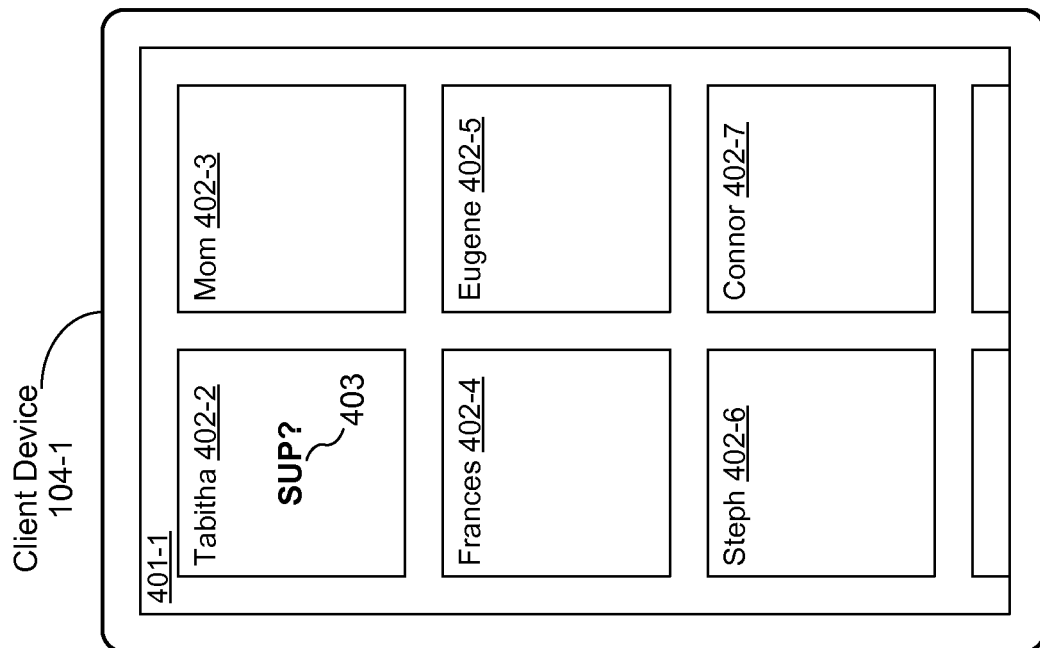

With reference to FIG. 4A, user interface 401-1 displays messages between the user of client device 104-1 (e.g., user 102-1, referred to as "the user") and other users of a network (e.g., a social network provided by social network system 108). In some embodiments, user interface 401-1 is a user interface which corresponds to, and allows the user to interact with and use, a messaging application (e.g., stored in memory 306 of client device 104). Specifically, user interface 401-1 displays multiple user interface elements 402 which correspond to users of a network (e.g., user interface elements 402-2 through 402-7 correspond to users 102-2 through 102-7 of social network system 108, respectively). In some embodiments, user interface elements 402 display the names of the associated users (e.g., user interface elements 402-2 corresponding to user 102-2, whose name is "Tabitha") or labels designated to associated users (e.g., user interface elements 402-3 corresponding to user 102-3, labeled "Mom"). In some embodiments, user interface elements 402 include pictures (not shown) of the associated users.

In some embodiments, user interface elements 402 display messages received from users corresponding to the particular user interface element. For example, as shown in FIG. 4A, user interface element 402-2 displays message 403 ("SUP?") received from "Tabitha." In this example, message 403 is an initiation message that begins a conversation between the user and "Tabitha."

As shown in FIG. 4B, subsequent to receiving the message 4B in FIG. 4A, a set of predefined reply messages (e.g., 405-1 through 405-5) is displayed on user interface 401-1 of client device 104-1. In this example, predefined reply messages 405-1 through 405-5 are displayed in response to a detected user input (e.g., touch input 404). Furthermore, the set of predefined reply messages 405 is based on a plurality of reply factors for the user of client device 104-1. Reply factors include, but are not limited to: content from one or more messages between users (e.g., content from message 403), relationship characteristics between users (e.g., a parent and child), messages published by users on a social network (e.g., social network posts), profile characteristics of users (e.g., age of users), environmental characteristics of users or associated devices (e.g., geographical location of user), and technical characteristics of user devices (e.g., mobile phone). Moreover, in some embodiments, the set of predefined reply messages 405 is further based on a user response profile of the user (e.g., response statistics of messages previously selected and sent by a user), and/or a generic response profile of a group of users, including the user (e.g., response statistics of messages previously selected and sent by a group of users). Reply factors, and the user/generic response profiles, are described in greater detail with respect to FIGS. 9A-9G.

Referring to the example illustrated in FIG. 4B, the set of predefined reply messages 405 is based on the content of message 403, sent by "Tabitha." In particular, predefined reply messages 405 are responsive to message 403 ("SUP?," which is a colloquial abbreviation for the question, "What's up?"). In some cases, predefined reply messages 405 also include an additional question soliciting a reply from the corresponding user (e.g., predefined reply message 405-1, "NM, EAT?," which is a colloquial abbreviation and short-form for the question, "Nothing much. Would you be interested in dining with me?"). As mentioned above, in some embodiments, predefined reply messages are also based on other reply factors. For example, as shown in FIG. 4B, predefined reply message 405-4 is based on environmental characteristics of client device 104-1 (associated with the user). In this example, client device 104-1 detects (e.g., using location detection module 334 of client device 104-1) that the user is in an automobile, reflected by predefined reply message 405-4, "DRIVIN, TTYL," which is a colloquial abbreviation for, "Driving, talk to you later."

Figure 4D:
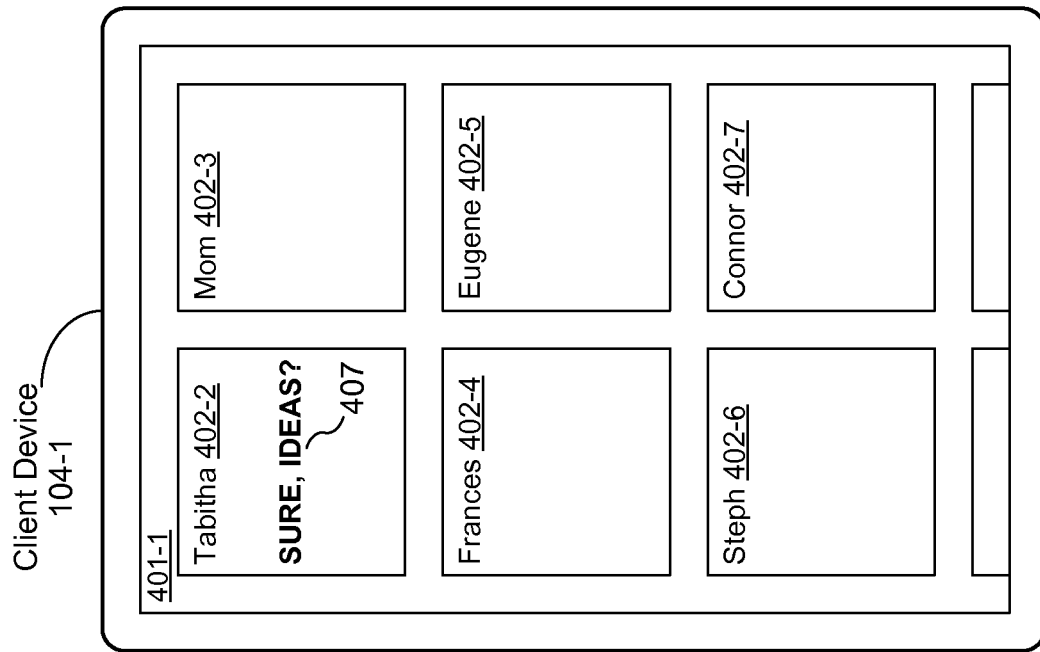
Figure 4C:
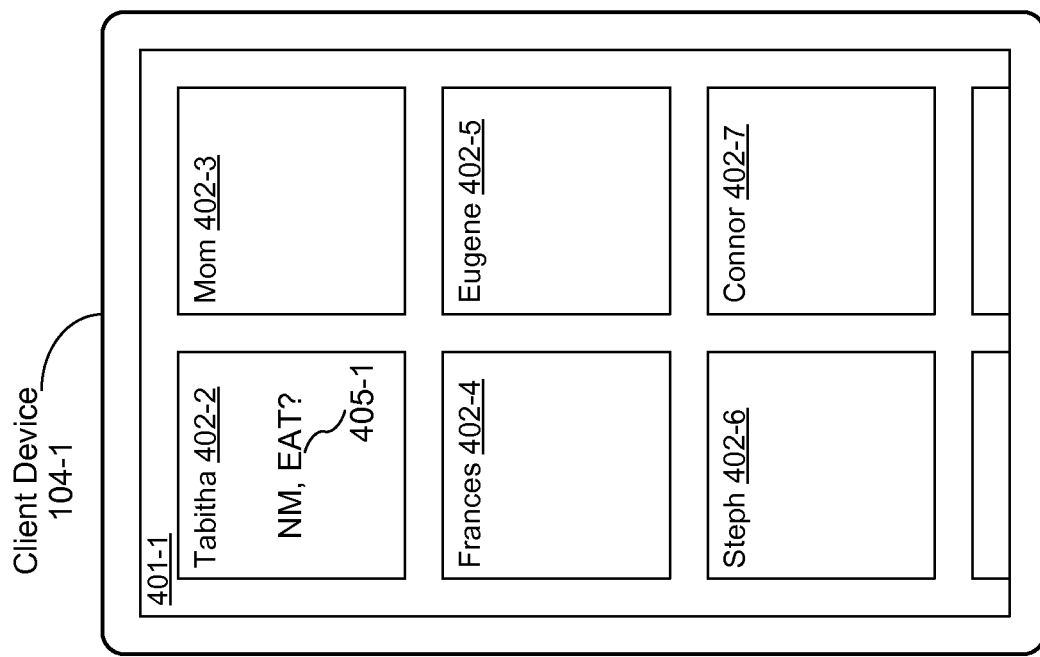

With reference to FIG. 4C, user interface element 402-2 displays predefined reply message 405-1 ("NM, EAT?") from the set of predefined reply messages 405 in FIG. 4B, which is selected by the user and sent to "Tabitha." Although not shown, in some embodiments, predefined reply message 405-1 is displayed on the user interface of the client device of "Tabitha" (e.g., client device 104-2), specifically in the user interface element corresponding to the user. In some embodiments, after predefined reply message 405-1 is sent, a set of predefined reply messages (not shown) is displayed on the client device of "Tabitha" (e.g., in response to a detected touch input on the user interface element corresponding to user 102-1), where the set of predefined reply messages is based on reply factors (as described above) for "Tabitha." As shown in FIG. 4D, "Tabitha" responds to predefined reply message 405-1 by sending message 407 ("SURE, IDEAS?").

Referring to FIG. 4E, after receiving message 407 and in response to touch input 408, a set of predefined reply messages (e.g., 409-1 through 409-3) based on reply factors for the user is displayed. Here, the predefined reply messages are based on the content of message 407 ("SURE, IDEAS?"), reflected by responses which indicate suggestions of dining locations (e.g., predefined reply message 409-1, "MY PLACE"), and types of food (e.g., predefined reply message 409-2, "BURGERS"). In addition to the set of predefined reply messages, in some embodiments, optional user interface element 409-4 is displayed, which, when selected, activates and displays an application distinct from the messaging application corresponding to user interface 401-1 (e.g., a reservation application, stored in stored in the memory 306 of client device 104). Also shown are alternative communication options (e.g., 409-5 through 409-9), which are displayed in addition to the set of predefined reply messages. Alternative communication options include, but are not limited to: custom reply messages (e.g., 409-5), emoticons (e.g., 409-6), SMS messages (409-7), e-mail (e.g., 409-8), and telephone communication (e.g., 409-9). Various applications and alternative communication options are described in greater detail with respect to FIGS. 9A-9G.

In the example shown in FIG. 4F, the user selects and sends predefined reply message 409-1 ("MY PLACE") to "Tabitha."

FIGS. 5A-5E illustrate an example in which users of a network request and initiate a payment transfer by utilizing a messaging application.

Figure 5A:
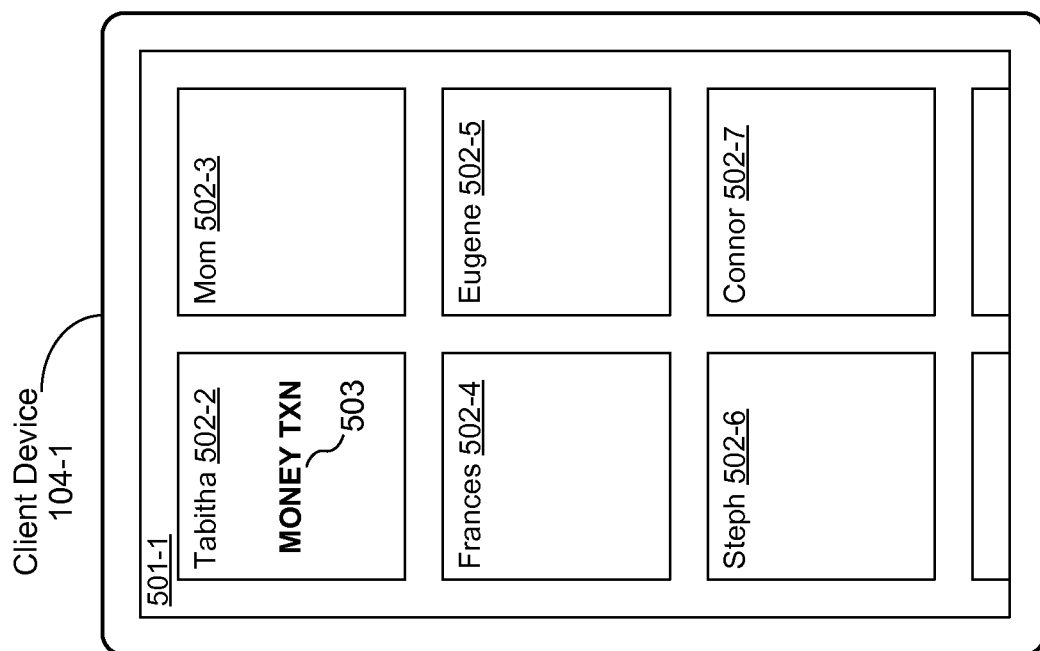

Similar to the examples described above in FIGS. 4A-4F, user interface 501-1 of FIG. 5A is an example of a user interface for a messaging application which displays messages between the user associated client device 104-1 and other users of social network system 108. In this particular example, message 503 ("MONEY TXN" an abbreviation of "Money Transaction") is received from "Tabitha" and displayed in user interface element 502-2. Here, message 503 initiates a request for payment from the user of client device 104-1.

As shown in FIG. 5B, subsequent to receiving message 503 and in response to touch input 504, a set of predefined reply messages (e.g., 505-1 and 505-2) and optional alternative communication options (e.g., 505-3 through 505-6) are displayed, where the predefined reply messages are based on reply factors for the user (e.g., content from previous messages between the user and "Tabitha," such as message 503). In this example, the user has the option of requesting additional payment details from the requesting user (e.g., "HOW MUCH?," 505-1), declining the payment request (e.g., "NO," 505-2), or entering a custom amount to transfer (e.g., by typing in a custom amount in the text field of 505-3). As shown in FIG. 5C, the user selects and sends predefined reply message 505-1 to "Tabitha," requesting additional details regarding the payment transfer request.

Figure 5D:
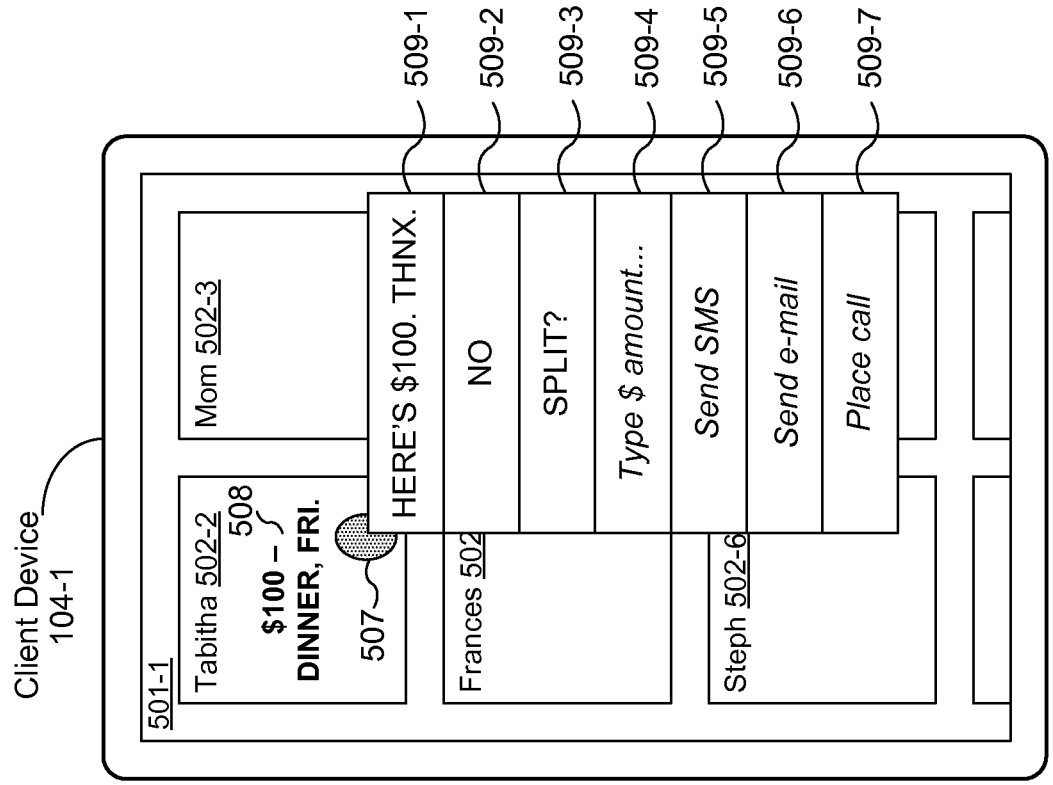
Figure 5C:
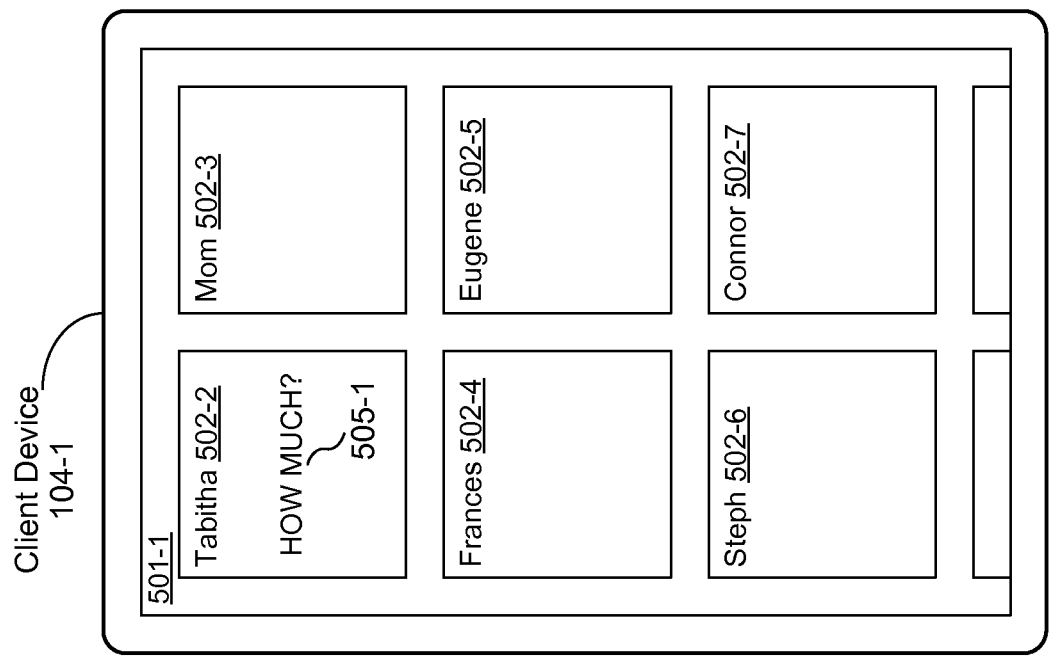

Referring now to FIG. 5D, "Tabitha" sends a message responsive to predefined reply message 505-1, specifying the amount and additional details of the payment transfer request (e.g., message 508, "$100—DINNER, FRI," specifying a payment transfer request for $100 as reimbursement for dinner on Friday). After receiving message 508 and in response to touch input 507, a set of predefined reply messages (e.g., 509-1 and 509-3) is displayed, in addition to optional alternative communication options (e.g., 509-4 through 509-7). As shown, the user has the option of initiating a payment transfer in accordance with the requested amount (e.g., "HERE'S $100. THNX.," 509-1), declining the payment request (e.g., "NO," 509-2), requesting to pay a portion of the requested amount (e.g., "SPLIT?" 509-3), or entering a custom amount to transfer (e.g., by typing in a custom amount in the text field of 509-3). In some embodiments, in response to requesting to pay a portion of the requested amount (e.g., selecting predefined reply message 509-3, "SPLIT?"), the user indicates a portion of the requested amount that the user wishes to request from "Tabitha," or alternatively, from one or more other users (e.g., requesting that $20 of the requested $100 be transferred by "Frances").

Figure 5E:
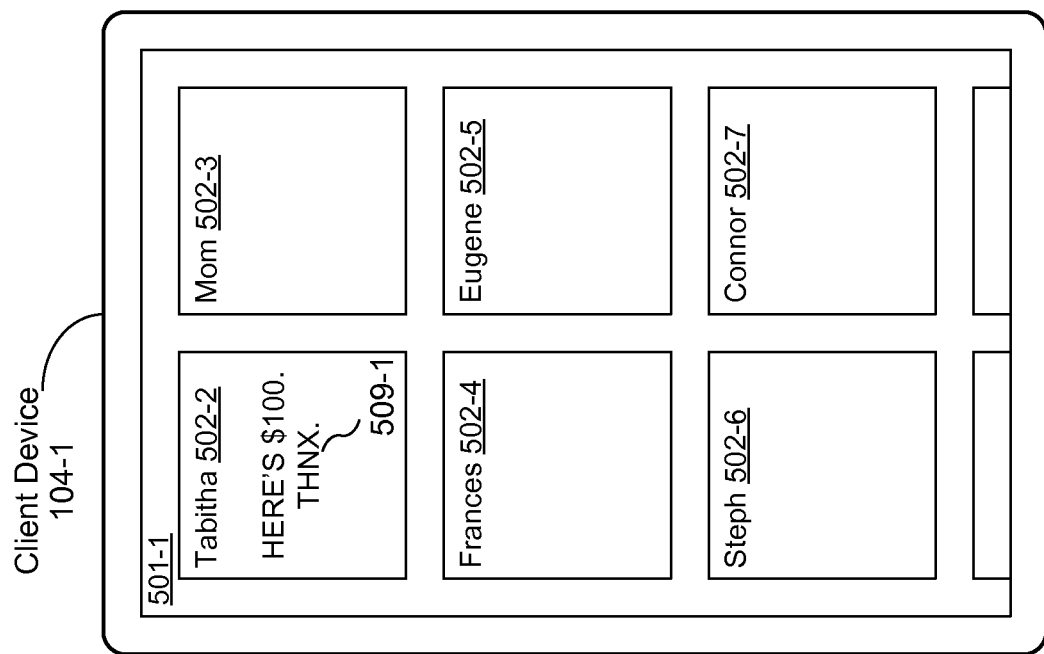

In this example, as shown in FIG. 5E, the user selects and sends predefined reply message 509-1 to "Tabitha" ("HERE'S $100. THNX."), which, in some embodiments, is an indicia of a payment transfer (i.e., text indicating an agreement to transfer the requested payment to the requesting user).

FIGS. 6A-6F illustrate an example of users communicating with a business, where a messaging application is used for facilitating customer relationship management (CRM).

Figure 6A:
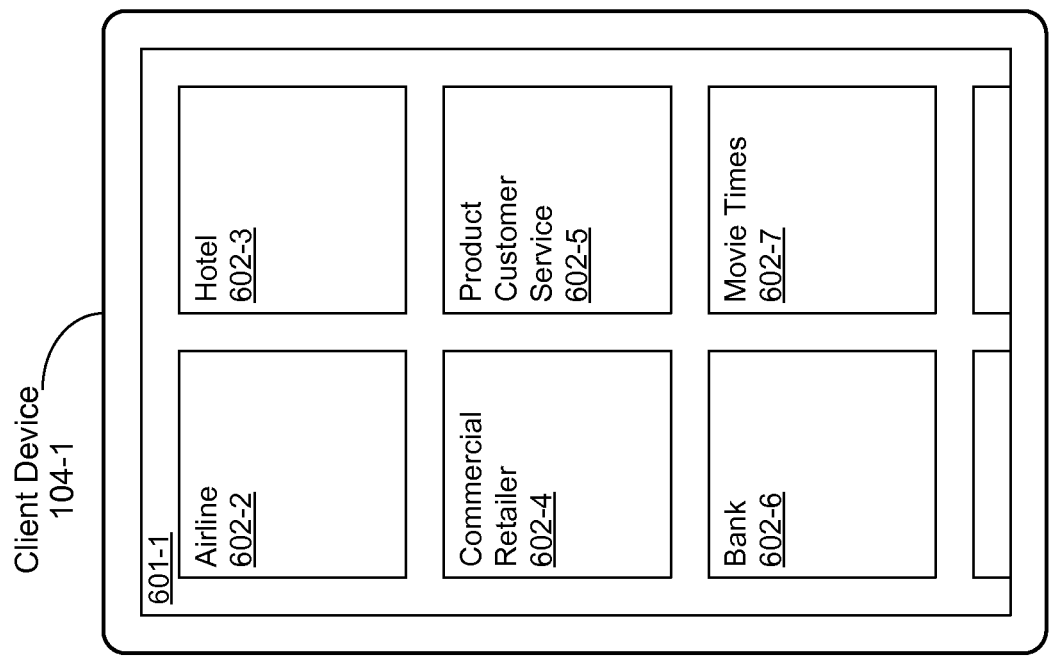

Similar to the examples described above in FIGS. 4A-4F, user interface 601-1 of FIG. 6A is an example of a user interface for a messaging application which displays messages between the user associated client device 104-1 and other users of social network system 108. In this particular example, user interface elements 602-2 through 602-7 correspond to various entities with which the user can communicate using the messaging application, such as businesses, services, and/or representatives of a business or service (e.g., 602-2 representing air travel company, "Airline," 602-3 representing hotel company, "Hotel," etc.). In some embodiments, the entities represented by user interface elements 602 are users of social network system 108 (e.g., users 102), while in other embodiments, the entities are hosted by a third party server (e.g., third party server 110-1).

FIG. 6B illustrates an example in which communication is initiated between the user and an airline company ("Airline," user interface element 602-2). In response to touch input 603, a set of predefined reply messages (e.g., 604-1 through 604-4) is displayed, where the predefined reply messages are based on reply factors for the user. Although not illustrated, each of the predefined reply messages corresponds to a distinct interaction node of a hierarchical interaction tree sent by "Airline" to the user. FIG. 8 provides an example which illustrates the correspondence between predefined reply messages and the interaction nodes of a hierarchical interaction tree.

In this example, the set of predefined reply messages is based on profile characteristics of the user and "Airline." In particular, the user is a customer of "Airline," and thus the predefined reply messages correspond to different categories of customer service provided by "Airline." As a non-limiting example, the user has the option of checking the status of a flight (e.g., "STATUS," 604-1), changing a flight reservation (e.g., "CHANGE TIX," 604-2), scheduling a flight reservation (e.g., "BOOK TIX," 604-3), or cancelling a flight reservation (e.g., "CANCEL TIX," 604-4).

Figures 6C, 6D:
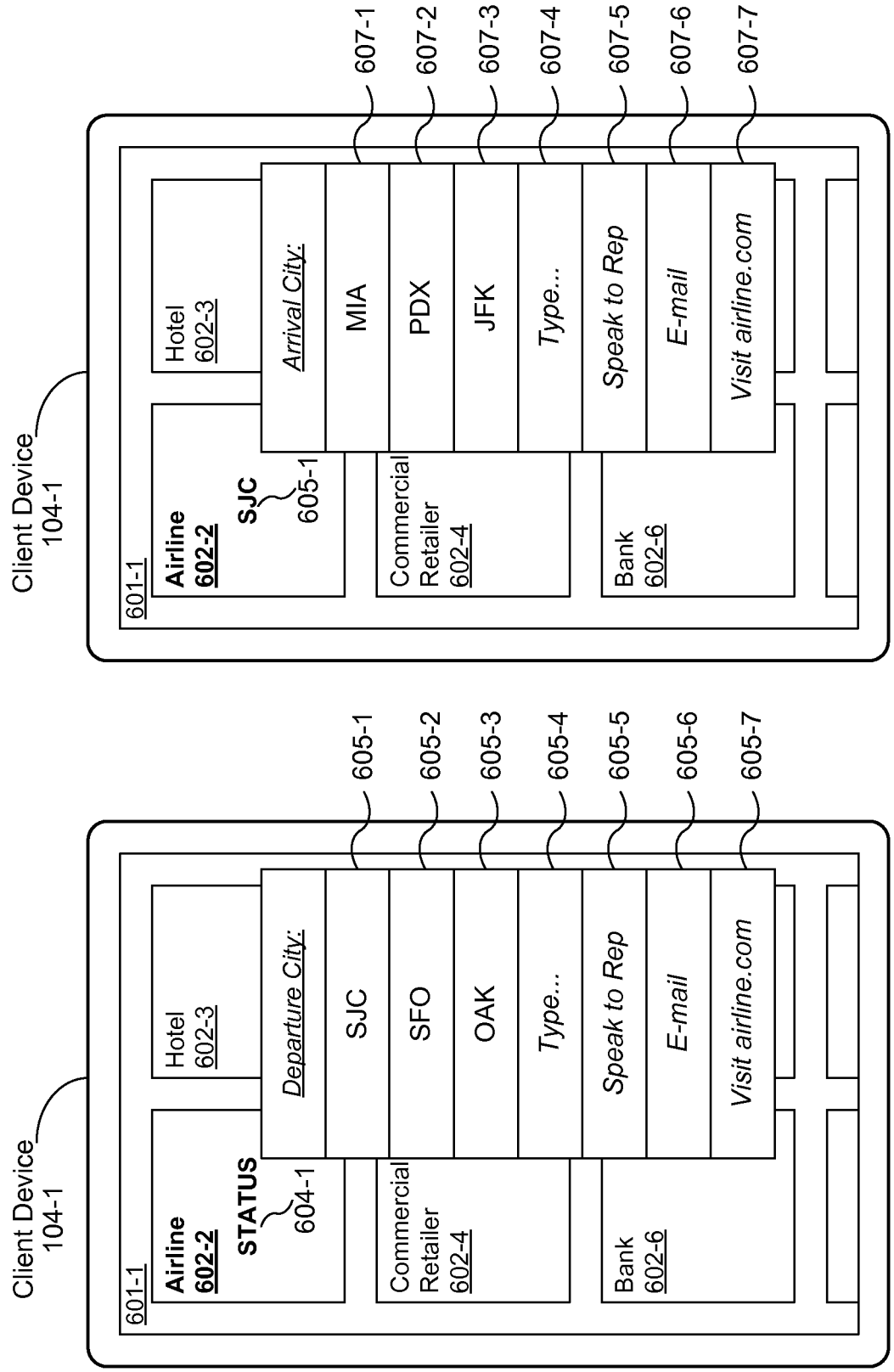

As shown in FIG. 6C, the user selects and sends (e.g., to "Airline") predefined reply message 604-1 ("STATUS), requesting a flight status. In response, the user is prompted to identify a departure city, and a set of predefined reply messages (e.g., 605-1 through 605-3) and optional alternative communication options (e.g., 605-4 through 605-7) are displayed. Here, the predefined reply messages are based on reply factors for the user, such as content from previous messages between the user and "Airline" (e.g., "STATUS," predefined reply message 604-1). In this example, the user has the option of selecting San Jose (e.g., "SJC," 605-1), San Francisco (e.g., "SFO," 605-2), or Oakland (e.g., "OAK," 605-3) as a departing city. Alternatively, the user may also manually enter a different departing city (e.g., by typing in the text field of 605-4), speak to a customer service representative (e.g., 605-5), e-mail a customer service representative (e.g., 605-6), or visit a company website for "Airline" (e.g., 605-7).

Referring now to FIG. 6D, the user selects and sends predefined reply message 605-1 ("SJC"), indicating San Jose, Calif., as the departing city. In response, the user is prompted to identify an arrival city, and a set of predefined reply messages (e.g., 607-1 through 607-3) and optional alternative communication options (e.g., 607-4 through 607-7) are displayed. As before, the predefined reply messages are based on reply factors for the user. For example, predefined reply messages 607-1 through 607-3 ("MIA," "PDX," "JFK") are based on predefined reply message 607-1 ("SJC"), where the predefined reply messages represent the arrival cities of several flights departing from San Jose.

Figures 6E, 6F:
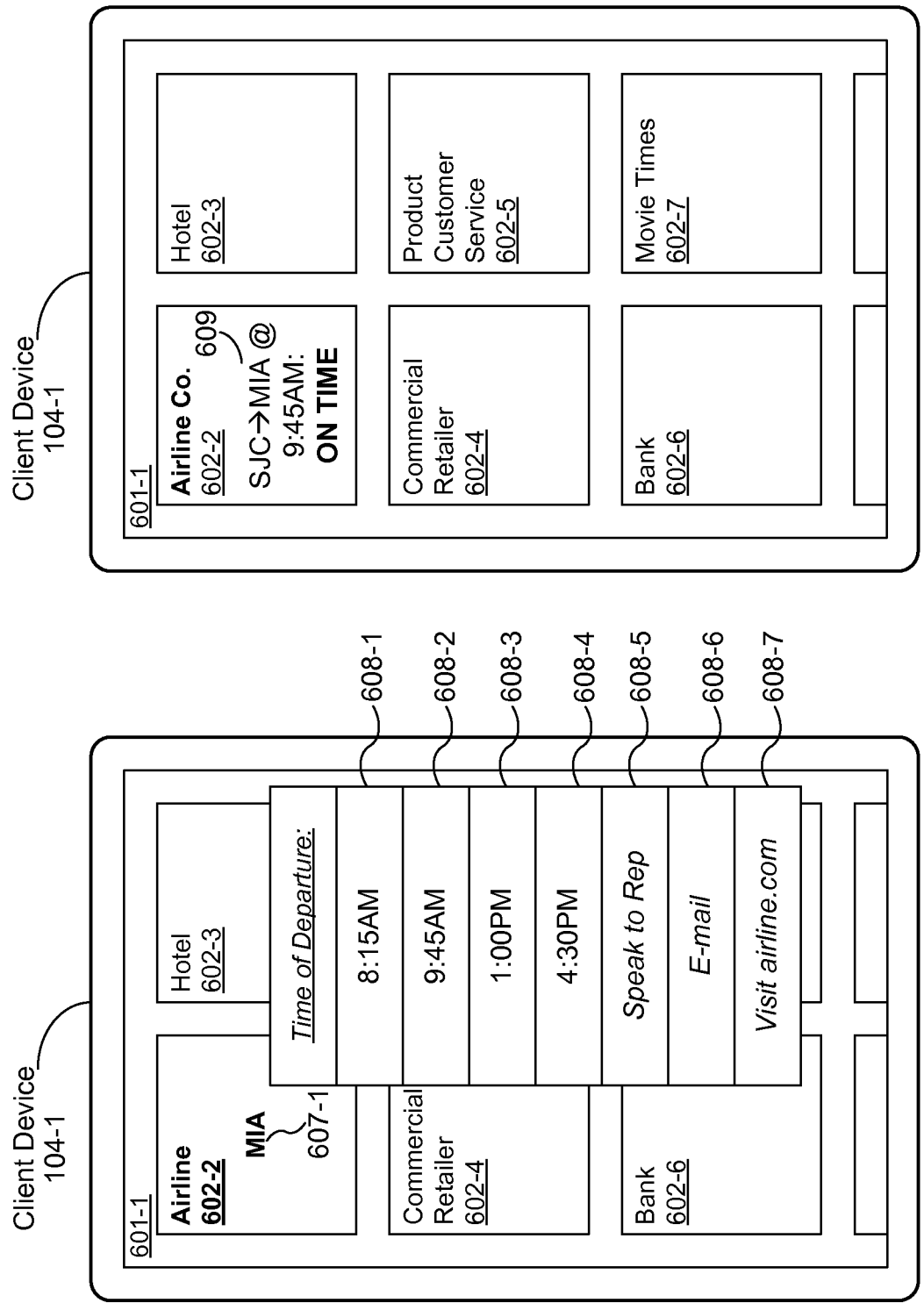

As shown in FIG. 6E, the user selects and sends predefined reply message 607-1 ("MIA"), indicating Miami, Fla., as the departing city. In response, the user is prompted to identify a departure time of the flight for which the user is ascertaining a flight status, and a set of predefined reply messages (e.g., 608-1 through 608-4) and optional alternative communication options (e.g., 608-5 through 608-7) are displayed. Predefined reply messages 608-1 through 608-4 are based on reply factors for the user. For instance, predefined reply messages 608-1 through 608-4 are based on both predefined reply message 605-1 ("SJC") and predefined reply message 607-1 ("MIA"), where the predefined reply messages represent the departure times of several flights departing from San Jose and arriving in Miami for that particular date.

As seen in FIG. 6F, the user selects and sends predefined reply message 608-2 ("9:45 AM"). Based on the information sent by the user, the airline company sends message 609, which provides the requested flight status information (e.g., 9:45 AM flight from San Jose, Calif., to Miami, Fla., is on-time).

FIG. 7 illustrates predefined reply messages, in accordance with some embodiments. In particular, FIG. 7 is an example illustrating the relationship between predefined reply messages determined for two users of a social network communicating using a messaging application.

FIG. 7 illustrates a chain of messages sent from one user to another (e.g., message 701-1, sent from user 102-2 to user 102-1), and the sets of predefined reply messages determined based on the previous messages (e.g., predefined reply messages 702-1 through 702-3, for selection by user 102-1). Furthermore, as discussed in greater detail with respect to FIGS. 9A-9G, a set of predefined reply messages for a user is also based on a plurality of additional reply factors for that user (e.g., profile characteristics, environmental characteristics, etc.).

The example of FIG. 7 illustrates how a set of predefined reply messages is determined based on content from one or more messages exchanged between users as a reply factor. That is, depending on a message sent by one user, a particular set of predefined reply messages will be determined. For example, as shown in FIG. 7, the set of predefined reply messages 704 determined in response to receiving predefined reply message 703-1, is distinct from the set of predefined reply messages 705 determined in response to receiving predefined reply message 703-2.

Predefined reply messages and reply factors are described in greater detail with respect to FIGS. 9A-9G.

FIG. 8 illustrates a hierarchical interaction tree, in accordance with some embodiments. In particular, FIG. 8 is a specific example illustrating nodes of a hierarchical interaction tree used in a messaging application for customer relationship management.

Hierarchical interaction trees represent structured flows for assisting customers of a business. FIG. 8 illustrates various interaction nodes (e.g., 801-1, 805-1, etc.) comprising a hierarchical interaction tree. In this example, the hierarchical interaction tree is that of a retail business which has product categories 801-1 through 801-3 (e.g., "Electronics," "Clothing," and "Entertainment," respectively), where the interaction nodes branching from a respective node represent sub-product categories and/or specific products of the respective product category (e.g., interaction nodes 802-1 through 802-3 corresponding to "Home Video," "Home Audio," and "Camera," respectively, are sub-product categories of "Electronics").

In communicating with its customers (e.g., users 102, FIG. 1), a business (e.g., third party server 110-1) receives messages selected from a set of predefined first-reply messages by a customer, where the predefined first-reply messages correspond to interaction nodes of a hierarchical interaction tree. In this example, selected predefined reply messages (corresponding to interaction nodes) represent how the customer wishes to navigate the product catalog given by hierarchical interaction tree 800.

FIG. 8 illustrates sets of predefined reply messages determined based on previous messages (e.g., predefined reply messages 802-1 through 802-3 comprising one set, predefined reply messages 804-1 through 804-3 comprising another set, etc.). Furthermore, as discussed in greater detail with respect to FIGS. 9A-9G, a set of predefined reply messages for a user is also based on a plurality of additional reply factors for that user.

The example of FIG. 8 also illustrates how a set of predefined reply messages is determined based on content from one or more previous messages as a reply factor. That is, depending on a message sent by the user, a particular set of predefined reply messages will be determined. For example, as shown in FIG. 8, the set of predefined reply messages 802 determined in response to selecting and sending predefined reply message 801-1 ("ELECTRONICS"), is distinct from the set of predefined reply messages 806 determined in response to selecting predefined reply message 801-2 ("CLOTHING").

Hierarchical interaction trees, predefined reply messages, and reply factors are described in greater detail with respect to FIGS. 9A-9G and 11A-11C.

FIGS. 9A-9G are flow diagrams illustrating a method of messaging, in accordance with some embodiments. In some embodiments, the method 900 is performed on a standalone device (e.g., client 104, where client 104 is acting as a standalone device). In some embodiments, the method 900 is performed by instructions for an application (e.g., a messaging application) stored in the memory of a standalone device (e.g., messaging module 341, stored in memory 306 of client device 104, FIG. 3). In some embodiments, the method 900 is performed by a server device (e.g., social network system 108) that sends information to a client for display. In some embodiments, the method 900 is performed in part by a client device (e.g., client 104) and in part by a server device (e.g., social network system 108). For ease of reference, the method 900 will be described below as being performed simply by a device, where the device is associated with a respective user. It will be understood that, in various embodiments, steps of the method 900 are performed by any of the aforementioned devices or combination of devices. FIGS. 9A-9G correspond to instructions stored in a computer memory or computer readable storage medium (e.g., memory 206 of the social network system 108 and/or memory 306 of the client device 104).

Furthermore, while various steps of method 900 refer to particular users (e.g., in describing actions performed with respect to messages, such as sending messages to and receiving messages from a user), it will be understood that in some embodiments, the various steps of method 900 are with respect to electronic devices of those particular users (e.g., sending messages to and receiving messages from an electronic device of, belonging to, or otherwise associated with a particular user). Similarly, various steps of method 900 referring to the electronic devices of particular users are also understood to be with respect to the particular users themselves.

The device of a second user (e.g., client device 104-1 of user 102-1), receives (902), from a first user, a first message. For example, as shown in FIG. 4A, client device 104-1 receives message 403 from "Tabitha" (e.g., the user corresponding to user interface element 402-2 and associated with client device 104-2). In some embodiments, the first message is an initiation message, where in some embodiments, the initiation message begins a conversation between two users, and is the first message on which a set of predefined reply messages is based (e.g., in FIG. 7, predefined reply messages 702-1 through 702-3 are based on initiation message 701-1).

Subsequent to receiving the first message, the device sends (906) to the first user, a second message responsive to the first message received by the second user, wherein the second message from the second user is selected (907) by the second user from a set of predefined first-reply messages (e.g., predefined reply messages 405-1 through 405-5, FIG. 4B). In some embodiments, the second message corresponds to and is a representation of a predefined reply messages selected by the second user (e.g., user selects predefined reply message "SUP?," which sends a corresponding message, "What's up?").

In some embodiments, the set of predefined first-reply messages is selectable by the second user only for a predefined time (e.g., 5 hours). In these embodiments, after the predefined time has lapsed without the second user sending a responsive message (e.g., by selecting a predefined first-reply message, application, alternative communication option, etc.), the first message to which the predefined first-reply messages are responsive no longer displays on the electronic device of the second user (e.g., "SUP?" message is not displayed in user interface element 402, FIG. 4B), and the set of predefined first-reply messages is no longer selectable (e.g., predefined reply messages 405-1 through 405-5 are "reset," and are not displayed in user interface 401-1 of client device 104-1). In other embodiments, a set of predefined first-reply messages is not selectable (or generated) if there is an indication that the conversation has naturally terminated (e.g., inferred from the content of messages between users), thus obviating the need for generating and sending any subsequent messages (e.g., a first user sends message, "R U COMING?," asking if the second user is planning or is on the way to meet the first user, and the second user replies, "OMW," indicating that the first user is on his way to meeting the first user). In some embodiments, prior to sending the second message, the device receives (904), from a remote server (e.g., social network system 108), the set of predefined first-reply messages.

The set of predefined first-reply messages is based (908) on a plurality of first-reply factors for the second user, which include (909) content from one or more messages (e.g., previous messages) between the first user and the second user. For example, as shown in FIG. 7, the set of predefined reply messages 703-1 through 703-3 is based on message 702-3 ("NM, EAT?"). Specifically, in this example, the predefined reply messages based on message 702-3 include a message soliciting ideas for dining (e.g., "SURE, IDEAS?," 703-1), a message offering a counter-proposal to dine at another time (e.g., "TMRRW?," 703-2), and a message declining the offer to dine (e.g., "NAH," 703-3). In some embodiments, content from one or more messages between the first user and the second user includes content from predefined reply messages selected by the user, and/or content or data from previously selected alternative communication options (e.g., custom reply messages, emoticons, SMS text, telephone communication, audio/visual multimedia, etc.).

In some embodiments, the set of predefined first-reply messages is based on content from multiple messages between the first user and the second user. Continuing the example of FIG. 7, after user 102-2 confirms the proposal for burgers ("SURE, WHEN?," message 706-1), user 102-1 sends a subsequent predefined reply message indicating a preference for a time to dine (e.g., "10:00 PM," not illustrated in FIG. 7). After messages have been sent indicating a preference for what to eat (e.g., "BURGERS?," 704-1) and a time for dining (e.g., responsive message "10:00 PM"), predefined reply messages presented for selection by user 102-1 or user 102-2 correspond to dining options that meet the criteria determined by the content of the exchanged messages (e.g., a set of predefined reply messages corresponding to restaurants serving burgers that are open at 10:00 PM). In other words, in some embodiments, a set of predefined reply messages is based on content from multiple messages, in addition to and/or including a most recently received message.

In some embodiments, the set of predefined first-reply messages for the second user is based on content from one or more messages between the first user and the second user, where the set of predefined first-reply messages includes one or more previous messages sent and/or selected by the second user. For example, referring to FIG. 4E, the set of predefined reply messages includes predefined reply message 409-2 ("BURGERS") based on the conversation history between the user and "Tabitha," where the user previously selected and sent the same predefined reply message 409-2 to "Tabitha."

In some embodiments, in addition to content from messages between the first user and second user, the set of predefined first-reply messages is further based on content from messages between the second user and other users, not including the first user. Referring to the example of FIG. 4E, while the predefined reply messages are based on content from messages between the user and "Tabitha," predefined reply message 409-3 ("ITALIAN") is included in the set of predefined reply messages based on previous messages between the second user and a different user (who is not the first user). For example, predefined reply message 409-3 is based on previous messages between the second user and "Steph" (e.g., the user corresponding to user interface element 402-6), where the second user previously selected and sent a message suggesting Italian food as a dining option to "Steph."

In some embodiments, the set of predefined first-reply messages for a respective user is based on content from a predefined number of previous messages received from and/or sent to another user (e.g., 5 most recent messages exchanged between a first user and second user).

In some embodiments, respective sets of predefined reply messages based on content from different messages are distinct at least with respect to one predefined reply message, while in other embodiments, the respective sets of predefined reply messages are identical.

Furthermore, the first-reply factors for the second user include (910) one or more of: relationship characteristics (912) between the first user and the second user, information provided (914) by the first user to a social network and/or information provided by the second user to the social network, profile characteristics (916) of the first user and/or profile characteristics of the second user, environmental characteristics (918) of the first user and/or environmental characteristics of the second user, and technical characteristics (920) of the electronic device of the first user and/or technical characteristics of an electronic device of the second user.

In some embodiments, relationship characteristics between users identify a personal relationship between a user with respect to another user. Examples include, but are not limited to, relationships between friends, parents and their children, significant others, spouses, siblings, teachers and students, employers and employees, and corporate representatives and customers. In some embodiments, a respective set of predefined reply messages for a first user based on relationship characteristics between a first user and a second user are distinct from a set of predefined reply messages for the first user based on relationship characteristics between the first user and a third user, when the relationship characteristics between the first user and the second user are distinct from the relationship characteristics between the first user and the third user. For example, a set of predefined reply messages for sending to a friend of the first user (e.g., predefined reply messages "NM, U?" and "BUSY TTYL," in response to a "SUP?" initiation message) is distinct from a set of predefined reply messages for sending to the mother of the first user (e.g., predefined reply messages "I'm doing well—how are you?" and "I'm busy, can we chat later?," in response to a "How are you?" initiation message).

In some embodiments, information provided by a user to a social network (e.g., a social network provided by social network system 108) includes: text comments (e.g., statuses, updates, announcements, replies, location "check-ins," private/group messages), digital content (e.g., photos, videos, audio files, links, documents), and/or other electronic content, where such information is provided (e.g., by posting, writing, viewing, publishing, broadcasting, promoting, recommending, sharing) to a page, group, message board, feed, and/or user profile of the social network. In some embodiments, information provided by the user to a social network is with respect to a social network distinct from the social network through which the user is sending and receiving messages (e.g., a set of predefined reply messages for a first user for sending to a second user on a social networking website, are based on messages posted by the first user and/or second user on a different social networking website).

As an example, referring to FIG. 4B, if a user receives a message inquiring about an activity that the user is currently engaged in (e.g., "SUP?," message 403), and the first user has recently posted a status update on a social network indicating that he is watching a televised sports broadcast (e.g., status update stating "Crazy basketball game!"), a set of predefined reply messages for the user includes a predefined reply message related to the first user's status update (e.g., "WATCHING BBALL," predefined reply message 405-5). In another example, a set of predefined reply messages is based on articles shared by a second user to whom a reply message will be sent. For example, if the second user has recently posted an article reviewing several local restaurants, the set of predefined reply messages for the first user includes a predefined reply message related to the second user's shared article (e.g., a dinner invitation to the second user at a restaurant reviewed in the article shared by the second user).

In some embodiments, profile characteristics of a user include personal information regarding a profile of the user (e.g., on a social network), such as: demographic information (e.g., the user's age, gender, ethnicity, nationality, sexuality, language preference, etc.), interests (e.g., activities, movies, music, groups, organizations, etc.), and/or other user information related to the user's profile with respect to a social network.

In one example, a set of predefined reply messages for a first user is based on a language preference of the first user (e.g., Spanish), and thus the set of predefined reply messages for the first user (e.g., "TMRRW," "NOW") is displayed in Spanish (e.g., "MANANA" (tomorrow), "AHORA" (now)). In some embodiments, a language preference with respect to a second user (e.g., Chinese for a Chinese-speaking friend) is distinct from a language preference with respect to a third user (e.g., Spanish for a Spanish-speaking friend).

In another example, a set of predefined reply messages for a first user is based on an interest identified by the first user's profile in a social network (e.g., a user's hobbies include "Movies"). Thus, in response to a message inquiring about a preferred activity of the first user (e.g., a second user asks the first user, "WANNA DO SOMETHING?"), the set of predefined reply messages for the first user includes a predefined reply message related to the identified interest (e.g., "SURE, MOVIE?").

In some embodiments, environmental characteristics of a user relate to or describe a state of the user and/or the electronic device of the user. In some embodiments, environmental characteristics include a current location of the user or electronic device of the user (e.g., GPS coordinates, IP address, etc.), and/or a place associated with the current location (e.g., work, home, school, etc.). For example, if a first user and a second user exchange messages to coordinate dinner plans nearby, a set of predefined reply messages for the first user includes local dining options based on the first user's location. Specifically, in one implementation, client device 104-1 determines GPS coordinates for the client device 104-1, and sends the GPS coordinates to social network system 108 and/or a third party server (e.g., third party server 110-1), which locates restaurants in proximity to the GPS coordinates and includes those restaurants in the set of predefined reply messages. In another example, if a second user sends a message inquiring about a current location of a first user (e.g., "WHERE U AT?"), GPS coordinates of the first user's electronic device are detected, and a set of predefined reply messages based on the GPS coordinates includes candidate local business or attractions associated with the second user's location. In yet another example, if the current location of a user (based on detected GPS coordinates) corresponds to the user's work place, a set of predefined reply messages for the user includes a message indicating that the user is at work (e.g., "IN A MEETING, TTYL").

In some embodiments, environmental characteristics include a mode of motion (e.g., driving, in transit, walking, jogging, etc.), or any other detectable state using one or more sensors of an associated electronic device (e.g., optional sensor devices 323, such as a gyroscope, accelerometer, GPS, clock, etc.). For example, if it is detected that a user is in transit (e.g., using GPS tracking capabilities of an electronic device of the user), a set of predefined reply messages for the user includes a message indicating that the user is in transit (e.g., "DRYING, TTYL"). In another example, a set of predefined reply messages for the user is based on a time at which a message is received (e.g., in response receiving a message at 11:00 PM, a set of predefined reply messages includes a predefined reply message, "GUNNA SLEEP, GNITE"). In some embodiments, a predefined reply message is automatically sent by an electronic device of a user based on a detected environmental characteristic of the electronic device (e.g., in response to receiving a message while a user is driving, a predefined reply message is automatically sent, indicating that the user is in transit).

In some embodiments, technical characteristics of an electronic device of a user include: a device type (e.g., mobile phone, desktop computer, tablet, etc.), hardware specifications (e.g., processor speed, storage capacity of volatile/non-volatile memory, sensors, screen size, battery capacity), an operating system, applications installed on the electronic device, and/or a version of a messaging application. In some embodiments, technical characteristics of the electronic device determine a character limit for predefined reply messages (e.g., if the electronic device is a mobile device, predefined reply messages have a 10-character limit, whereas computer devices have a 30-character limit). In some embodiments, technical characteristics of the electronic device determine a displayed language of predefined reply messages (e.g., if user indicates a Chinese language preference and software for Chinese fonts is installed, predefined reply messages are displayed in Chinese).

Figure 9A:
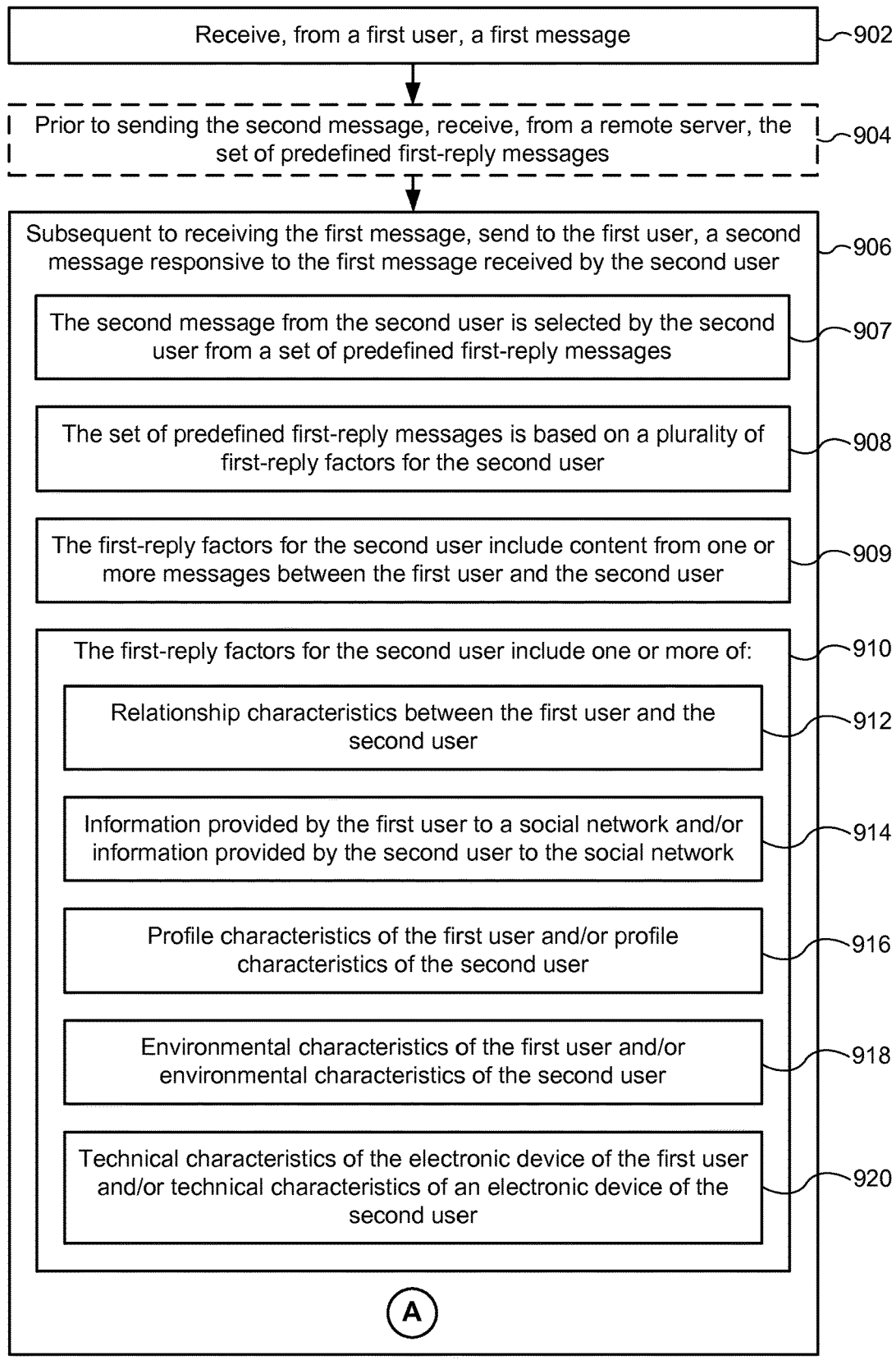
Figure 9B:
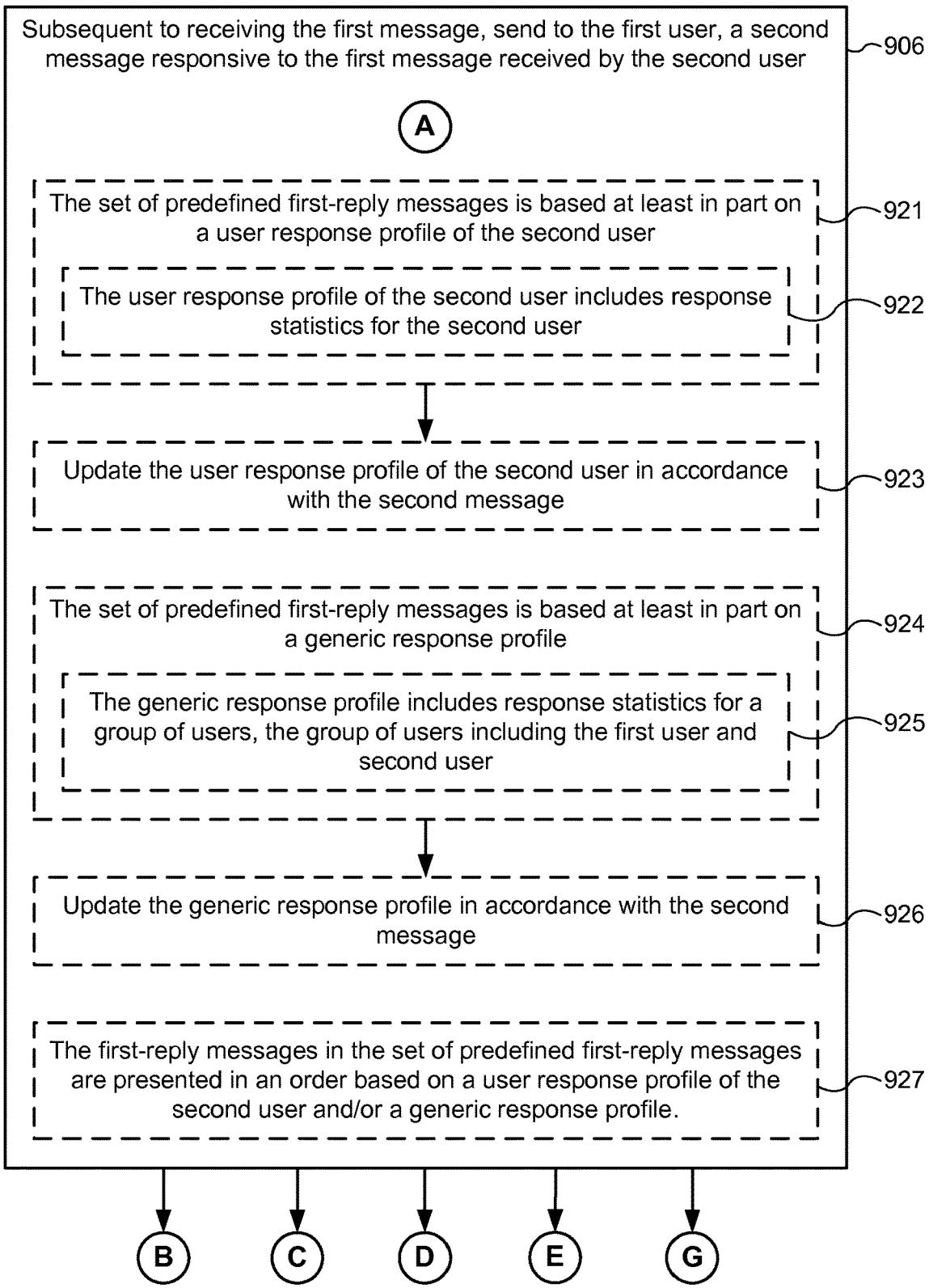

Referring now to FIG. 9B, in some embodiments, the set of predefined first-reply messages is based (921) at least in part on a user response profile of the second user. Generally, the user response profile of a user serves as an indication of a user's preferred responses. In some embodiments, such user preferences are manually set (e.g., preferences manually set in a messaging application). Additionally and/or alternatively, user preferences are automatically determined (e.g., using machine learning techniques, where known machine learning techniques are not described in detail for the sake of brevity).

In some embodiments, the user response profile of the second user includes (922) response statistics for the second user. Response statistics for a user track the messaging behavior of a respective user, such as the frequency with which certain predefined reply messages are selected by the user. In some embodiments, response statistics also track the frequency with which custom reply messages are sent (as described below). Therefore, in some embodiments, a user response profile of the second user is updated (923) in accordance with the second message. In some embodiments, response statistics for a user track the selection of alternative communication options (e.g., emoticons, SMS text, voice calls, etc., as described in greater detail below), and/or activation of applications distinct from the messaging application (e.g., a third party restaurant reservation application, as described in greater detail below). In some embodiments, response statistics for a user are calculated as an average statistic (e.g., the user selects a predefined reply message in 50% of all sent messages). Additionally and/or alternatively, response statistics for a user are calculated as a total, measured over a predefined range of time (e.g., in the past year, the user has selected a particular predefined reply message 500 times). In some embodiments, a set of predefined reply messages based on a user response profile includes a particular predefined reply message, if the frequency with which the particular predefined reply message is selected by a respective user exceeds a predefined threshold (e.g., a predefined threshold of selecting a predefined reply message in more than 10% of all communications).

In some embodiments, response statistics also include contextual information describing the context in which a predefined reply message is selected by a user. In some embodiments, contextual information includes any reply factors upon which a selected predefined reply message is based (e.g., previous messages, relationship characteristics, information provided by the user to a social network, profile characteristics, environmental characteristics, and/or technical characteristics). As an example, if response statistics for a user indicate that a particular predefined reply message is frequently selected in response to a particular message received from another user (e.g., in response to messages asking the user "WUT U DOING?," the user frequently selects "BBALL"), a set of predefined reply messages includes the predefined reply message at times when the user receives that particular message ("WUT U DOING?"). In another example, if response statistics indicate that a particular predefined reply message is frequently selected, but only when the user is at a particular location (e.g., predefined reply message "BUSY EATING" is frequently selected when a user is nearby a particular restaurant location, determined by GPS coordinates of the user), a set of predefined reply messages includes the predefined reply message at times when it is determined that the user is at that particular location, but not at other locations. As another example, if response statistics indicate that a particular predefined reply message is frequently selected at a particular time on a particular day (e.g., selection of predefined reply message, "OFF WORK SOON," at 6:00 PM on Mondays), a set of predefined reply messages includes the predefined reply message in response to receiving a message at that particular time on that particular day.

In some embodiments, contextual information includes the user to whom a predefined reply message is sent. For example, if a first user frequently selects and sends a particular predefined reply message to a second user, that particular predefined reply message is included in a set of predefined reply messages for the first user for sending to the second user. Furthermore, in some embodiments, contextual information is in relation to the other predefined reply messages in the respective set of predefined reply messages. For example, referring to FIG. 4E, if a user response profile for the user of client device 104-1 indicates that predefined reply message 409-2 ("BURGERS") is selected more frequently than predefined reply message 409-3 ("ITALIAN"), it is inferred that the user prefers eating burgers to Italian food. Thus, in response to similar inquires from other users (e.g., messages asking for ideas/a preference of where to eat), a set of predefined reply messages based on the user response profile for the user will include predefined reply message 409-2 ("BURGERS"), but exclude predefined reply message 409-3 ("ITALIAN").

In some embodiments, the set of predefined first-reply messages is based (924) at least in part on the generic response profile. In contrast to a user response profile, the generic response profile serves as an indication of preferred responses of a group of users (e.g., all or a subset of all users in a social network). In some embodiments, a group of users with which a generic response profile is associated includes, but is not limited to: friends (e.g., each user is a friend of every other user in the group, each user is a friend of at least one other user in the group, etc.); users who share common relationship characteristics (e.g., users are siblings), profile characteristics (e.g., users with same demographic information, interests, etc.), environmental characteristics (e.g., users currently at the same location), and/or technical characteristics (e.g., users sending messages with a mobile device); and/or users who have provided the same or similar information to a social network (e.g., users who have published similar comments regarding a particular topic in a social network). In some embodiments, a generic response profile is automatically determined (e.g., using machine learning techniques).

In some embodiments, the generic response profile includes (925) response statistics for a group of users (e.g., of a social network), the group of users including the first user and second user. Response statistics for a group of users track the messaging behavior of a group of users, such as the frequency with which certain predefined reply messages are selected. In some embodiments, response statistics for a group of users also track the frequency with which custom reply messages are sent by the group of users. Therefore, in some embodiments, the generic response profile is updated (926) in accordance with the second message. In some embodiments, response statistics for a group of users are calculated as an average statistic (e.g., on average, each user of a group of users has selected a particular predefined reply message 5 times). Additionally and/or alternatively, response statistics for a group of users are calculated as a group total, measured over a predefined range of time (e.g., in the past year, the entire group of users has selected a particular predefined reply message 500 times). Analogous embodiments and examples of response statistics are described above with respect to a user response profile.

In some embodiments, response statistics also include contextual information describing the context in which a predefined reply message is selected by a user in a group of users. Analogous embodiments and examples of contextual information are described above with respect to a user response profile.

In some embodiments, the first-reply messages in the set of predefined first-reply messages are presented (927) in an order based on a user response profile of the second user and/or a generic response profile. More specifically, in some embodiments, the order in which a set of predefined reply messages is presented is based on respective response statistics for a respective user and/or response statistics for a respective group of users. For example, referring to the example of FIG. 4E, the set of predefined reply messages is presented with predefined reply message 409-1 ("MY PLACE") at the top, since it has the highest frequency of selection by the user relative to the other predefined reply messages (e.g., compared to 409-2 and 409-3) based on response statistics for the user of client device 104-1. Moreover, in some embodiments, the order in which a set of predefined reply messages is presented is based on respective response statistics for a respective user and/or response statistics for a respective group of users, which includes contextual information (e.g., reply factors upon which a selected predefined reply message is based, time at which predefined reply message is sent, user to whom predefined reply message is sent, etc.). Optionally, a set of predefined reply messages, alternative communication options, and/or applications (e.g., predefined reply messages 409-1 through 409-3, application 409-4, and alternative communication options 409-6 through 409-9, FIG. 4E) are presented in an order based on a user response profile and/or a generic response profile.

Figure 9C:
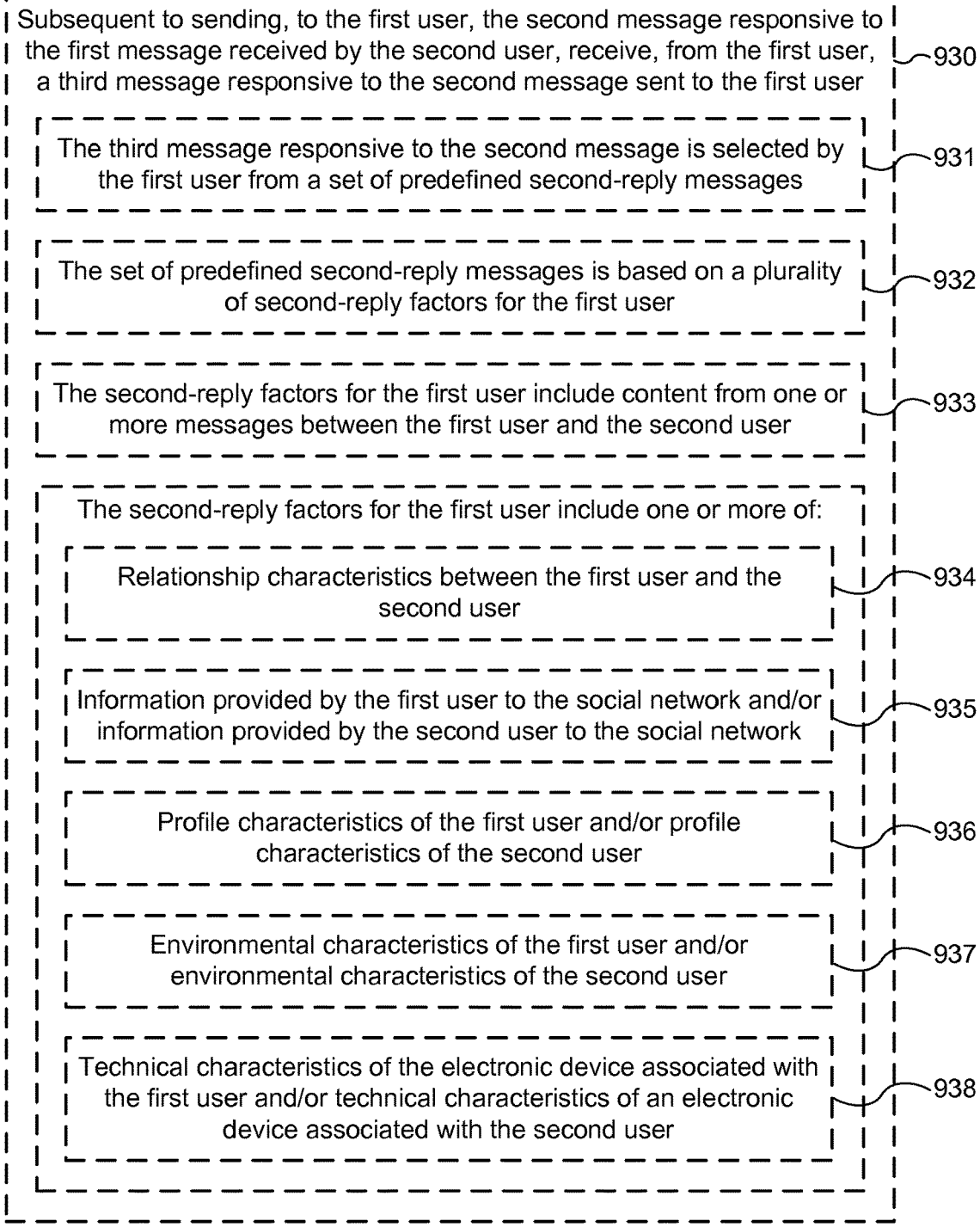

Referring now to FIG. 9C, in some embodiments, subsequent to sending, to the first user, the second message responsive to the first message received by the second user, the device receives (930), from the first user, a third message responsive to the second message sent to the first user, wherein the third message responsive to the second message is selected (931) by the first user from a set of predefined second-reply messages. The set of predefined second-reply messages is based (932) on a plurality of second-reply factors for the first user, where the second-reply factors for the first user include (933) content from one or more messages between the first user and the second user. Furthermore, the second-reply factors for the first user include one or more of: relationship characteristics (934) between the first user and the second user, information provided (935) by the first user to the social network and/or information provided by the second user to the social network, profile characteristics (936) of the first user and/or profile characteristics of the second user, environmental characteristics (937) of the first user and/or environmental characteristics of the second user, and technical characteristics (938) of the electronic device associated with the first user and/or technical characteristics of an electronic device associated with the second user. Predefined reply messages, in addition to the various reply factors and user/generic response profiles upon which they are optionally based, are described in greater detail above with respect to FIGS. 9A-9B.

Figure 9D:
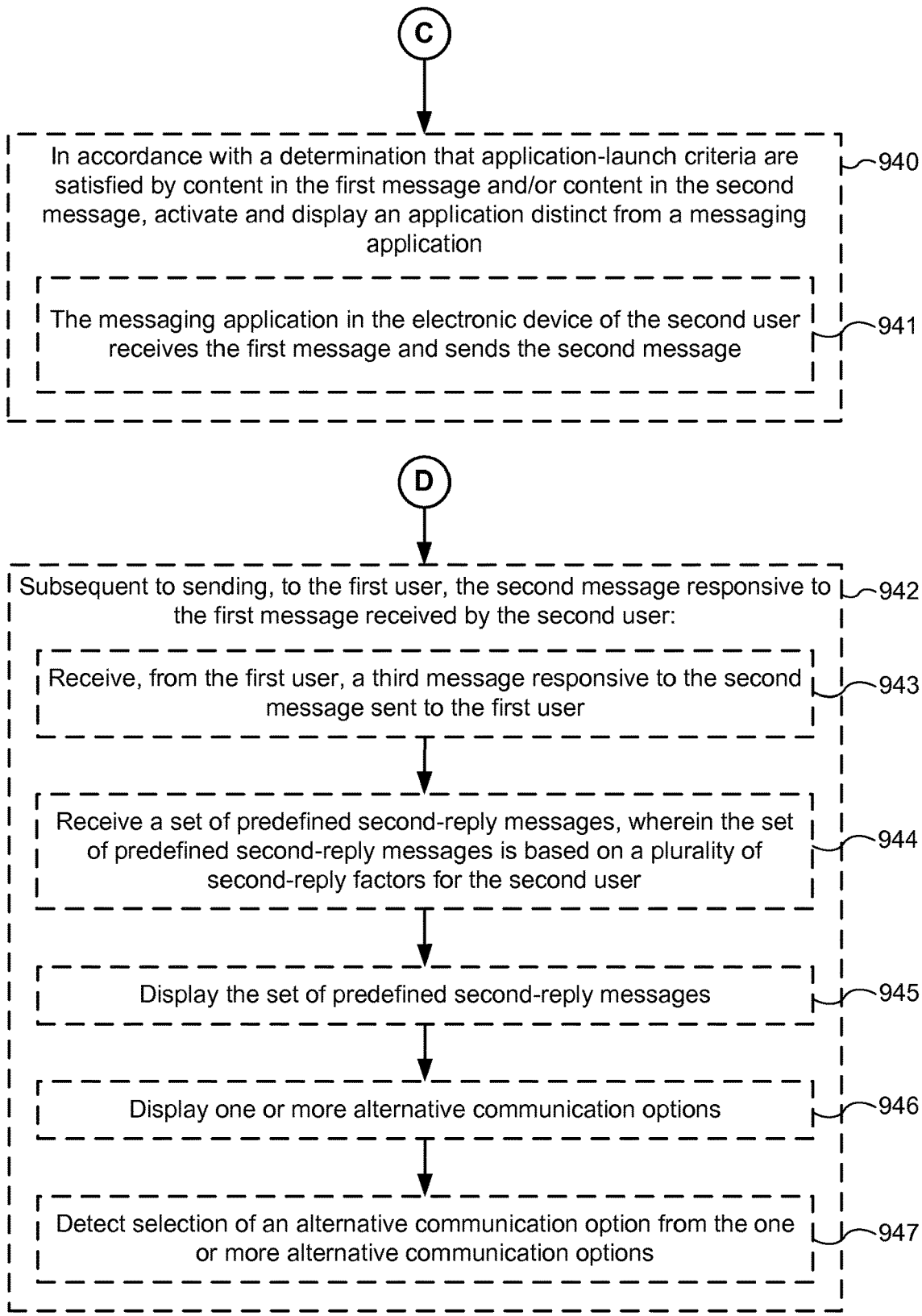

Referring now to FIG. 9D, in some embodiments, in accordance with a determination that application-launch criteria are satisfied by content in the first message and/or content in the second message, the device activates and displays (940) an application distinct from a messaging application, where in some embodiments, the messaging application in the electronic device of the second user receives (941) the first message and sends the second message. Applications distinct from the messaging application facilitate desired actions inferred by the content of messages between users (e.g., calendar application for scheduling a meeting, restaurant/hotel/air/car reservation applications for booking accommodations, e-commerce applications for purchasing goods from retailers, applications for sending money, and/or other applications designed for specific purposes, examples of which are described with respect to FIG. 3).

In other embodiments, in accordance with a determination that application-launch criteria are satisfied, the device activates and displays a plug-in (e.g., software add-on incorporating features of a third-party application) of the messaging application, and/or a webpage (e.g., switches to web browser and displays website). In some embodiments, the application distinct from the messaging application is stored in the memory of the device (e.g., memory 306 of client device 104, FIG. 3), and/or the memory of another device (e.g., social network system 108, third party server 110-1, etc., as shown in FIG. 1).

In some embodiments, application-launch criteria include verification that the application distinct from the messaging application is installed on the client device (e.g., specific version of third-party application is installed). In some embodiments, application-launch criteria include keywords, phrases, symbols, and/or audio/visual data detected in one or more messages between users. For example, if application-launch criteria include the combination of keywords "dinner," "tonight," and "yes," and two users have exchanged messages "DINNER TONIGHT?" and "YES," a restaurant reservation application is activated and displayed to allow for the users to make a dinner reservation. In some embodiments, in addition to activating and displaying the application, the application is also provided with (e.g., entry fields are populated with) information derived from the one or more messages of the conversation (e.g., in coordinating a dinner reservation, dates, location, and/or time information is extracted from one or more messages). As an example, a restaurant reservation application is provided with dates, times, and GPS coordinates of the first and second user (derived from messages between both users, and GPS tracking capabilities of their devices) to determine available reservations times at a local restaurant.

In some embodiments, the determination that application-launch criteria are satisfied is made by the device of the user (e.g., client device 104-1, FIG. 1). In some embodiments, the determination that application-launch criteria are satisfied is made by a server (e.g., a server of social network system 108, third party server 110-1, etc.), which sends to the client device (e.g., client device 104-1) instructions for activating and displaying the application distinct from the messaging application.

In some embodiments, one or more alternative communication options are selected as an alternative to (or in addition to) predefined reply messages. Specifically, in some embodiments, subsequent to sending (942), to the first user, the second message responsive to the first message received by the second user, the device receives (943), from the first user, a third message responsive to the second message sent to the first user, and receives (944) a set of predefined second-reply messages, wherein the set of predefined second-reply messages is based on a plurality of second-reply factors for the second user. In some embodiments, the device displays (945) the set of predefined second-reply messages, and also displays (946) one or more alternative communication options.

Alternative communication options include, but are not limited to: custom reply messages (e.g., text field 409-5 in FIG. 4E for entering custom reply messages, if an appropriate response is not included in the set of predefined reply messages), emoticons (e.g., 409-6), SMS text messages (e.g., 409-7 for sending an SMS text or other messaging format through a text messaging application), e-mail (e.g., 409-8 for sending e-mail through an e-mail application), telephone communication (e.g., 409-9 for placing a telephone call through a voice calling application), and/or other multimedia (e.g., picture, video, audio using appropriate recording features of a device).

In some embodiments, the one or more alternative communication options are displayed concurrently with the set of predefined reply messages. In some embodiments, the one or more alternative communication options are displayed in response to selecting an icon (e.g., selecting icon activates and displays a separate user interface including the alternative communication options). In some embodiments, the one or more alternative communication options are displayed if a predefined reply message of the set of predefined reply messages is not selected after a predefined time (e.g., after 20 seconds).

Furthermore, in some embodiments, selection of an alternative communication option from the one or more alternative communication options is detected (947). In some embodiments, in response to detecting selection of an alternative communication option, an application distinct from the messaging application is activated (e.g., switching to application on client device for placing phone calls, authoring SMS text messages, etc.). In some embodiments, alternative communication options are selectable at all times, while in other embodiments, alternative communication options are selectable when a condition has been satisfied (e.g., keywords detected in conversation). Keywords satisfying such a condition sometimes indicate that a messaging "dead-end" is encountered (i.e., a conversation between users is not being advanced, or predefined reply messages are no longer practical). For example, a messaging "dead-end" is encountered (i.e., a condition for displaying alternative communication options is satisfied) when users fall into a repetitive cycle of responses (e.g., "NM, YOU?," followed by "NM, YOU?"). As another example, alternative communication options are selectable when predefined reply messages are impractical given inherent device limitations (e.g., impractical to describe a story at length with a 10-character limit, so the user is presented with the alternative communication option of placing a telephone call). In another example, if the set of predefined reply messages does not include an appropriate message that a user wishes to send, the user is presented with the alternative communication option of entering a custom reply message (e.g., text field 409-5 for sending a custom reply message, FIG. 4E).

Figure 9E:
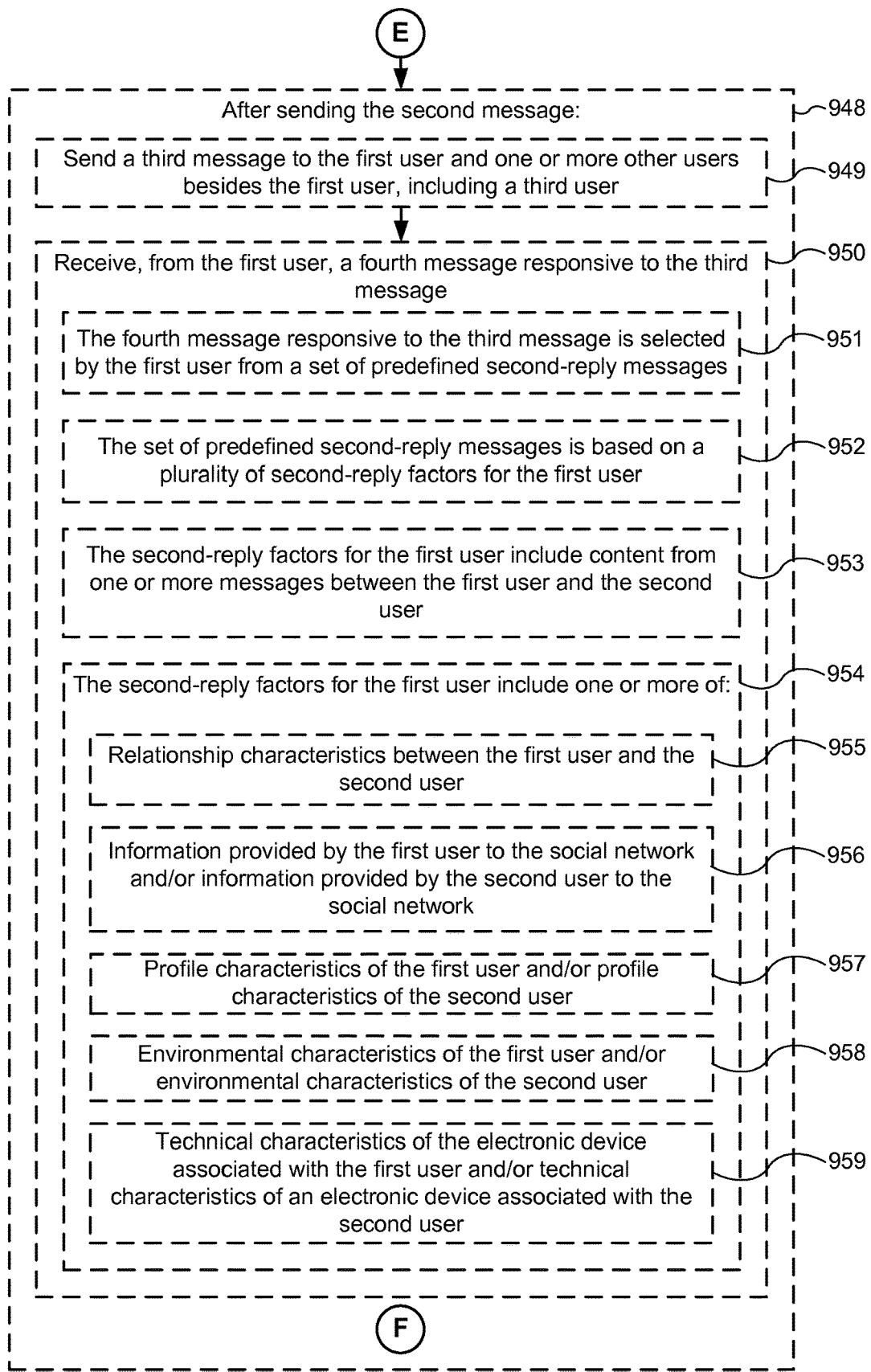
Figure 9F:
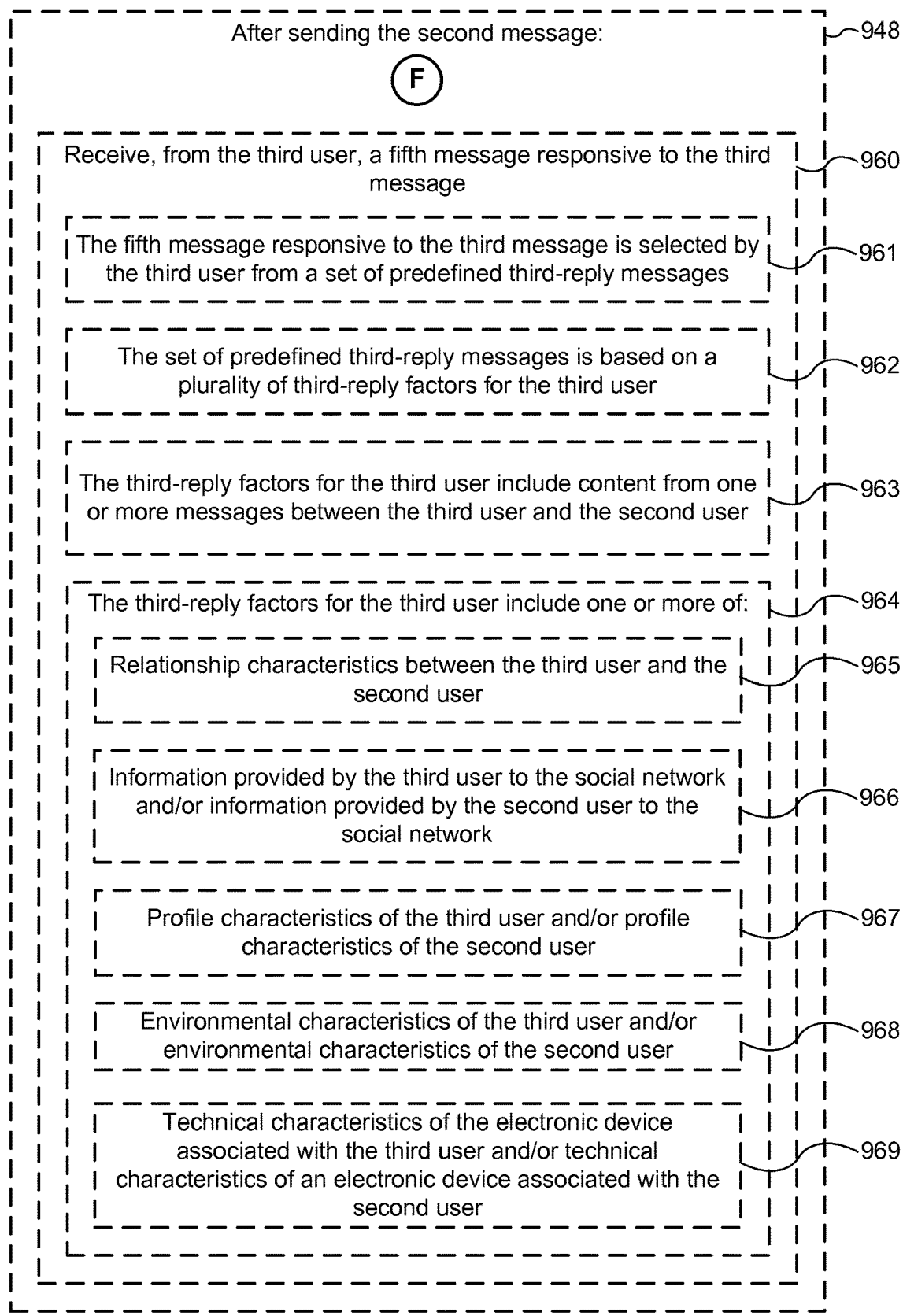

In some embodiments, a user sends messages to multiple users (e.g., group messaging) through a messaging application (e.g., client application module 336). Referring to FIG. 9E, in some embodiments, after sending the second message to the first user (948), the second user sends (949) a third message to the first user and one or more other users besides the first user, including a third user. The second user receives (950), from the first user, a fourth message responsive to the third message, wherein the fourth message responsive to the third message is selected (951) by the first user from a set of predefined second-reply messages. The set of predefined second-reply messages is based (952) on a plurality of second-reply factors for the first user, where the second-reply factors for the first user include (953) content from one or more messages between the first user and the second user. Furthermore, the second-reply factors for the second user include (954) one or more of: relationship characteristics (955) between the first user and the second user, information provided (956) by the first user to the social network and/or information provided by the second user to the social network, profile characteristics (957) of the first user and/or profile characteristics of the second user, environmental characteristics (958) of the first user and/or environmental characteristics of the second user, and technical characteristics (959) of the electronic device associated with the first user and/or technical characteristics of an electronic device associated with the second user.

Furthermore, in these embodiments (referring now to FIG. 9F), the second user receives (960), from the third user, a fifth message responsive to the third message, wherein the fifth message responsive to the third message is selected (961) by the third user from a set of predefined third-reply messages. The set of predefined third-reply messages is based (962) on a plurality of third-reply factors for the third user, where the third-reply factors for the third user include (963) content from one or more messages between the third user and the second user. Furthermore, the third-reply factors for the third user include (964) one or more of: relationship characteristics (965) between the third user and the second user, information provided (966) by the third user to the social network and/or information provided by the second user to the social network, profile characteristics (967) of the third user and/or profile characteristics of the second user, environmental characteristics (968) of the third user and/or environmental characteristics of the second user, and technical characteristics (969) of the electronic device associated with the third user and/or technical characteristics of an electronic device associated with the second user. Predefined reply messages, in addition to the various reply factors and user/generic response profiles upon which they are optionally based, are described in greater detail above with respect to FIGS. 9A-9B.

In some embodiments, the set of predefined second-reply messages based on a plurality of second-reply factors for the first user (step 952) and the set of predefined third-reply messages based on a plurality of third-reply factors for the third user (step 962) are distinct, while in other embodiments, the sets predefined reply messages are the same, thereby creating a simple polling mechanism for a group of users. For example, a first user sends the same initiation message to both a second user and a third user to inquire about their availability for dinner. In response, both the second user and third user indicate their availability by sending messages selected from an identical set of predefined reply messages (e.g., the identical sets of predefined reply messages include "NOT 2NITE," and "DOWN. WHEN?"). Alternative implementations include a many-to-many group chatroom configuration, where users send messages to specific users of the chatroom, and each user is able to see conversations between other users in the chatroom.

Figure 9G:
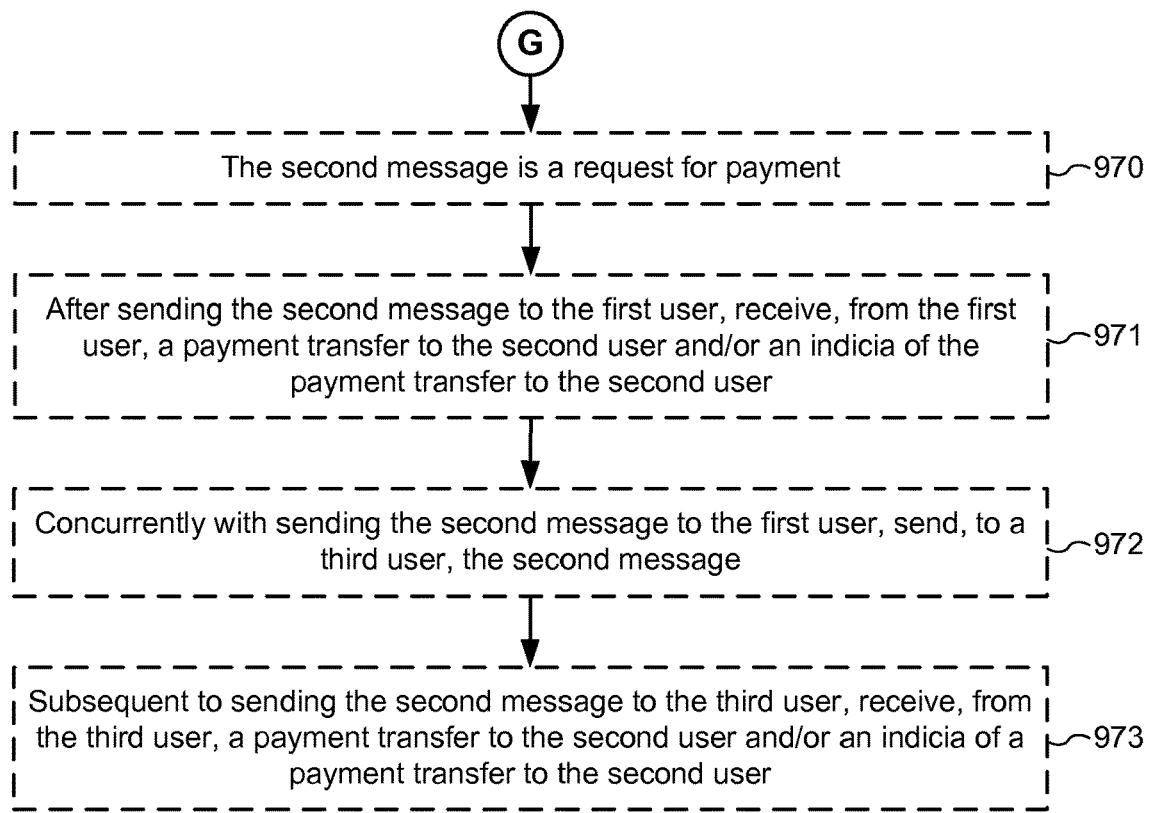

In some embodiments, messages sent and/or received by users are requests for payment, where a messaging application (e.g., client application module 336) or other appropriate application is used to facilitate transfers of payment between users. Referring now to FIG. 9G, in some embodiments, after sending the second message to the first user, wherein the second message is a request for payment (970), the second user receives (971), from the first user, a payment transfer to the second user and/or an indicia of the payment transfer to the second user. For example, referring to FIG. 5A, "Tabitha" sends message 503 to the user of client device 104-1, where message 503 is a request for payment ("MONEY TXN"). As seen in FIG. 5A, the user of client device 104-1 agrees to the payment request, as shown by message 504 (e.g., where message 504 is an indicia of the payment transfer to "Tabitha").

In some embodiments, the same request for payment sent to one user is also sent to another user, thereby facilitating transfers of payments among multiple users (e.g., collection of individual amounts from multiple users, splitting payment of a single amount among multiple users, etc.). Specifically, in some embodiments, concurrently with sending the second message to the first user, the second user sends (972), to a third user, the second message (wherein the second message is a request for payment, step 970). In some embodiments, subsequent to sending the second message to the third user, the second user receives (973), from the third user, a payment transfer to the second user and/or an indicia of the payment transfer to the second user. In some embodiments, the number of users who receive a particular request for payment determines an amount of the payment request for each user (e.g., if a request is sent to four friends, the amount corresponding to the payment request is split into five equal portions).

Additional features and embodiments with respect to requests for payment are illustrated and described in greater detail with respect to FIGS. 5A-5E.

FIGS. 10A-10I are flow diagrams illustrating a method of messaging, in accordance with some embodiments. In some embodiments, the method 1000 is performed on a standalone device (e.g., client 104, where client 104 is acting as a standalone device). In some embodiments, the method 1000 is performed by instructions for an application (e.g., a messaging application) stored in the memory of a standalone device (e.g., messaging module 238, stored in memory 206 of social network system 108, FIG. 2; messaging module 341, stored in memory 306 of client device 104, FIG. 3). In some embodiments, the method 1000 is performed by a server device (e.g., social network system 108) that sends information to a client for display. In some embodiments, the method 1000 is performed in part by a client device (e.g., client 104) and in part by a server device (e.g., social network system 108). For ease of reference, the method 1000 will be described below as being performed simply by a server. It will be understood that, in various embodiments, steps of the method 1000 are performed by any of the aforementioned devices or combination of devices. FIGS. 10A-10I correspond to instructions stored in a computer memory or computer readable storage medium (e.g., memory 206 of the social network system 108 and/or memory 306 of the client device 104).

Furthermore, while various steps of method 1000 refer to particular users (e.g., in describing actions performed with respect to messages, such as sending messages to and receiving messages from a user), it will be understood that in some embodiments, the various steps of method 1000 are with respect to electronic devices of those particular users (e.g., sending messages to and receiving messages from an electronic device of, belonging to, or otherwise associated with a particular user). Similarly, various steps of method 1000 referring to the electronic devices of particular users are also understood to be with respect to the particular users themselves.

The server (e.g., social network system 108) receives (1001) a first message from an electronic device of a first user (e.g., client device 104-1 of user 102-1). After receiving the first message from the electronic device of the first user, the server sends (1002) the first message to an electronic device of a second user.

After receiving the first message from the electronic device of the first user, the server produces (1003), for the second user, a set of predefined first-reply messages, wherein the set of predefined first-reply messages is based (1004) on a plurality of first-reply factors for the second user. The first-reply factors for the second user include (1005) content from one or more messages between the first user and the second user. Furthermore, the first-reply factors for the second user include (1006) one or more of: relationship characteristics (1007) between the first user and the second user, information provided (1008) by the first user to a social network and/or information provided by the second user to the social network, profile characteristics (1009) of the first user and/or profile characteristics of the second user, environmental characteristics (1010) of the first user and/or environmental characteristics of the second user, and technical characteristics (1011) of the electronic device of the first user and/or technical characteristics of an electronic device of the second user. Predefined reply messages, and the various reply factors upon which they are based, are described in greater detail above with respect to FIGS. 9A-9G.

Figure 10A:
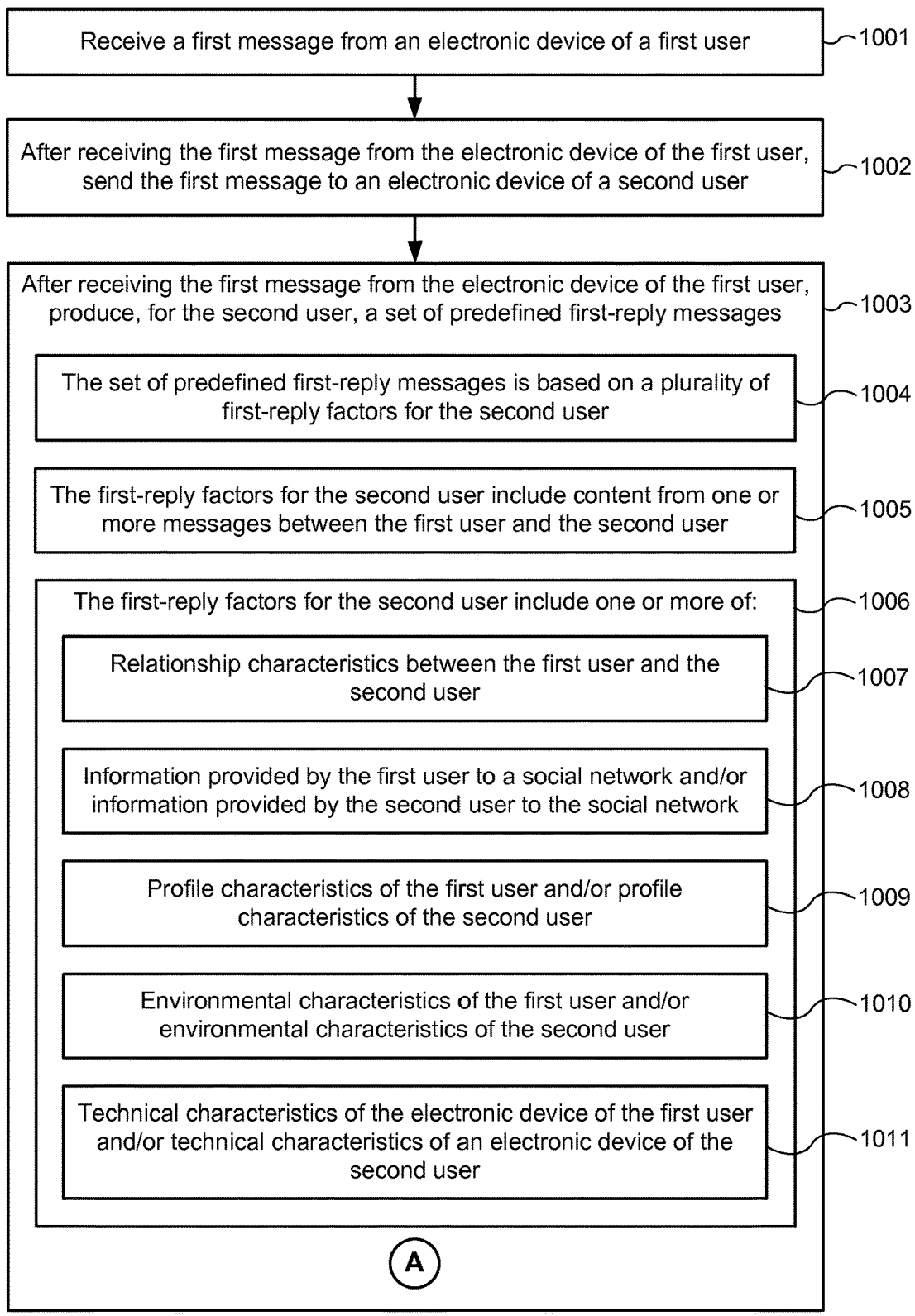
Figure 10B:
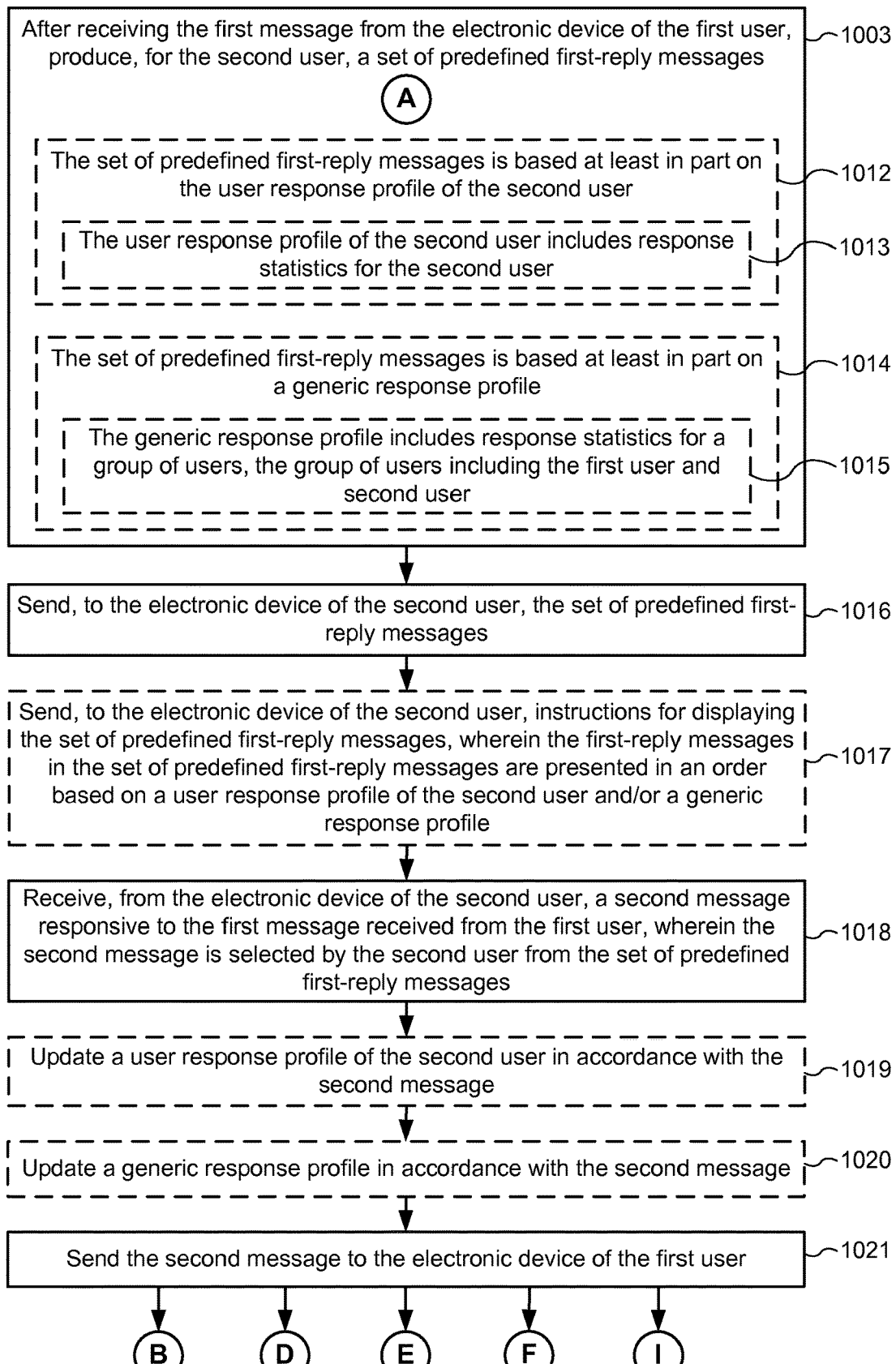

Referring now to FIG. 10B, optionally, the set of predefined first-reply messages is based (1012) at least in part on the user response profile of the second user, where in some embodiments, the user response profile of the second user includes (1013) response statistics for the second user. Furthermore, in some embodiments, the set of predefined first-reply messages is based (1014) at least in part on the generic response profile, where in some embodiments, the generic response profile includes (1015) response statistics for a group of users, the group of users including the first user and second user. User response profiles and generic response profiles are described in greater detail above with respect to FIGS. 9A-9G.

The server sends (1016), to the electronic device of the second user, the set of predefined first-reply messages. Optionally, the server sends (1017), to the electronic device of the second user, instructions for displaying the set of predefined first-reply messages, wherein the first-reply messages in the set of predefined first-reply messages are presented in an order based on a user response profile of the second user and/or a generic response profile (discussed in detail above).

The server receives (1018), from the electronic device of the second user, a second message responsive to the first message received from the first user, wherein the second message is selected by the second user from the set of predefined first-reply messages. Furthermore, in some embodiments, a user response profile of the second user is updated (1019) in accordance with the second message, and in some embodiments, a generic response profile is updated (1020) in accordance with the second message. Subsequently, the server sends (1021) the second message to the electronic device of the first user.

Figure 10C:
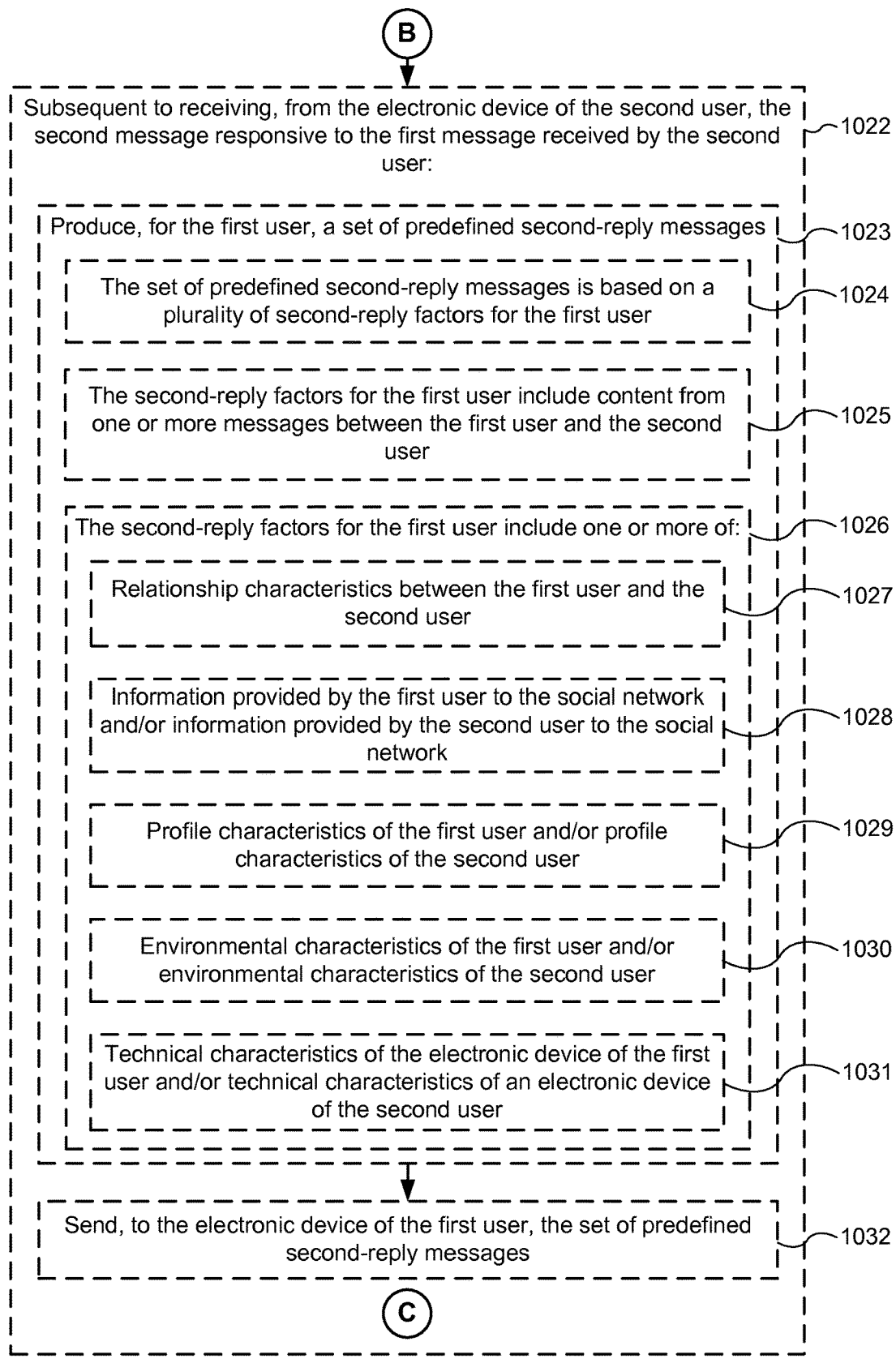

Referring now to FIG. 10C, in some embodiments, subsequent to receiving (1022), from the electronic device of the second user, the second message responsive to the first message received by the second user, the server produces (1023), for the first user, a set of predefined second-reply messages. In some embodiments, the set of predefined second-reply messages is based (1024) on a plurality of second-reply factors for the first user, where the second-reply factors for the first user include (1025) content from one or more messages between the first user and the second user. Furthermore, the second-reply factors for the first user include (1026) one or more of: relationship characteristics (1027) between the first user and the second user, information provided (1028) by the first user to the social network and/or information provided by the second user to the social network, profile characteristics (1029) of the first user and/or profile characteristics of the second user, environmental characteristics (1030) of the first user and/or environmental characteristics of the second user, and/or technical characteristics (1031) of the electronic device of the first user and/or technical characteristics of an electronic device of the second user. In some embodiments, the server sends (1032), to the electronic device of the first user, the set of predefined second-reply messages. Furthermore, referring now to FIG. 10D, the server receives (1034), from the electronic device of the first user, a third message responsive to the second message received from the second user, wherein the third message is selected by the first user from the set of predefined second-reply messages, and sends (1035) the third message to the electronic device of the first user. Predefined reply messages, in addition to the various reply factors and user/generic response profiles upon which they are optionally based, are described in greater detail above with respect to FIGS. 9A-9G.

In some embodiments, in accordance with a determination that application-launch criteria are satisfied by content in the first message and/or content in the second message, the server sends (1036) instructions for activating and displaying an application, distinct from the messaging application, to the electronic device of the second user, where in some embodiments, the first message is sent to a messaging application (1037) in the electronic device of the second user, the set of predefined first-reply messages is sent to the messaging application, and the second message is received from the messaging application. Applications and application-launch criteria are described in greater detail above with respect to FIGS. 9A-9G.

Figure 10E:
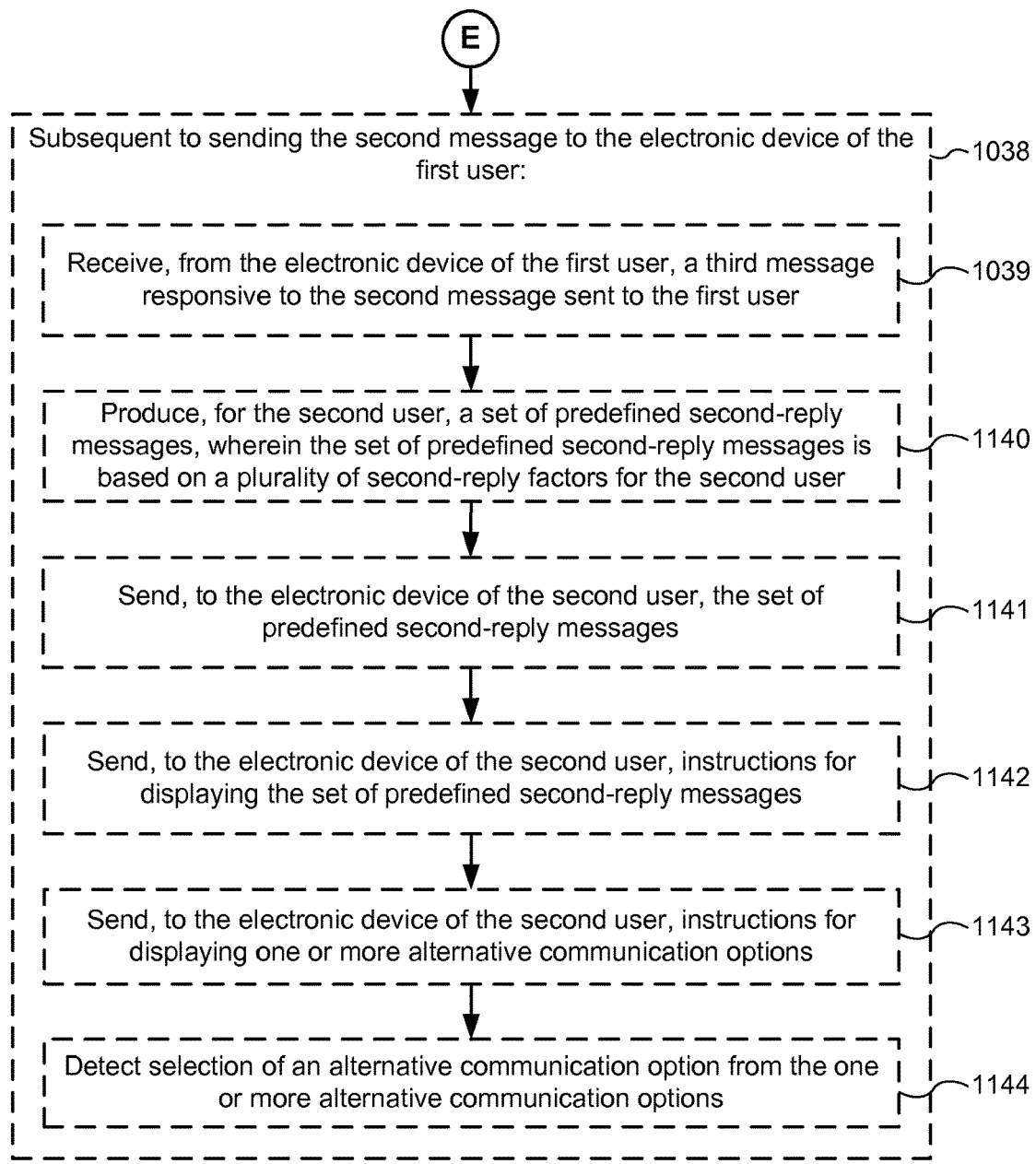

Referring now to FIG. 10E, in some embodiments, subsequent to sending (1038) the second message to the electronic device of the first user, the server receives (1039), from the electronic device of the first user, a third message responsive to the second message sent to the first user.

Furthermore, the server produces (1040), for the second user, a set of predefined second-reply messages, wherein the set of predefined second-reply messages is based on a plurality of second-reply factors for the second user. In some embodiments, the server sends (1041), to the electronic device of the second user, the set of predefined second-reply messages, and sends (1042), to the electronic device of the second user, instructions for displaying the set of predefined second-reply messages. Furthermore, in some embodiments, the server sends (1043), to the electronic device of the second user, instructions for displaying one or more alternative communication options, and detects (1044) selection of an alternative communication option from the one or more alternative communication options. Alternative communication options are described in greater detail above with respect to FIGS. 9A-9G.

Figure 10F:
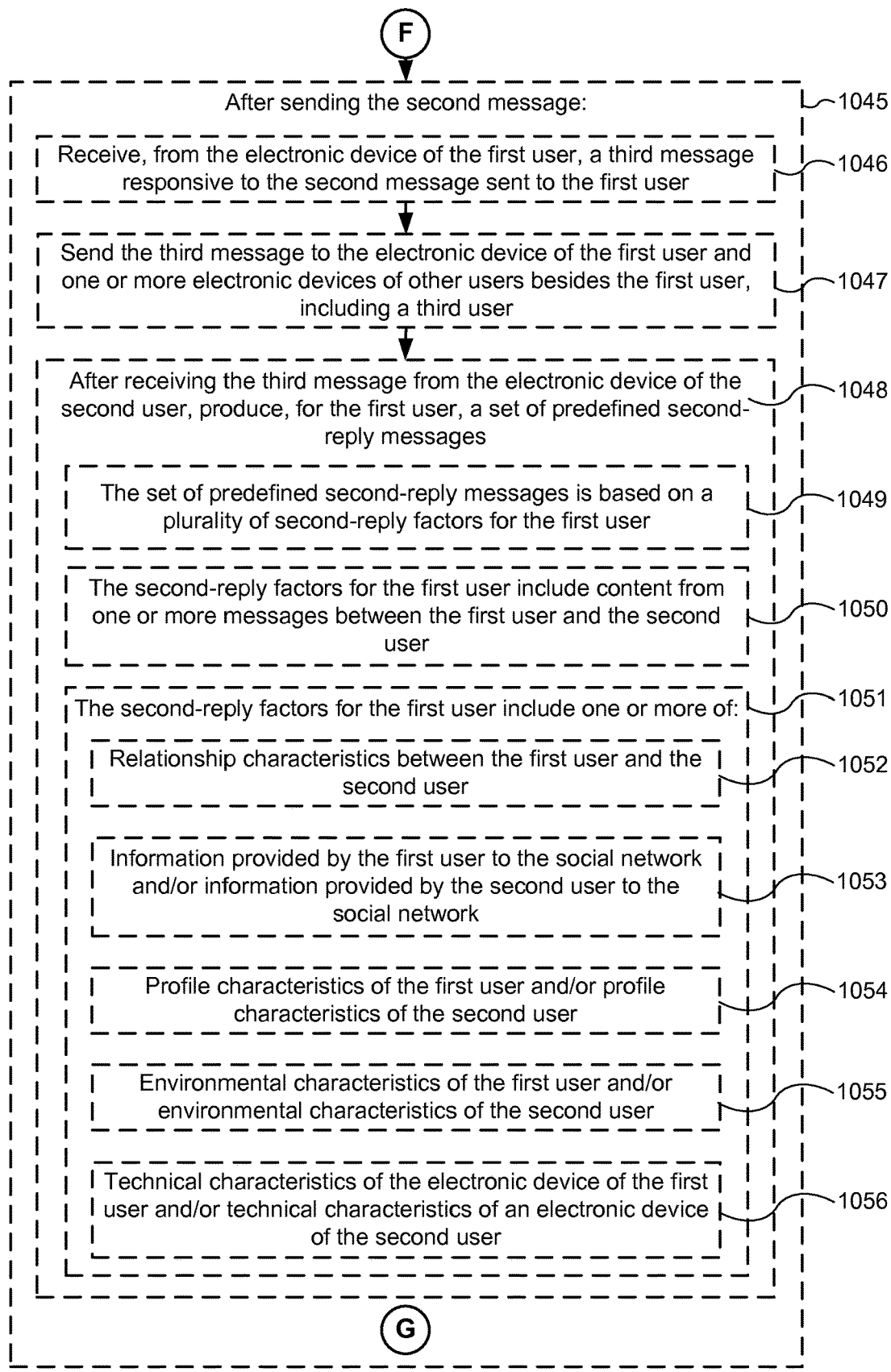
Figure 10G:
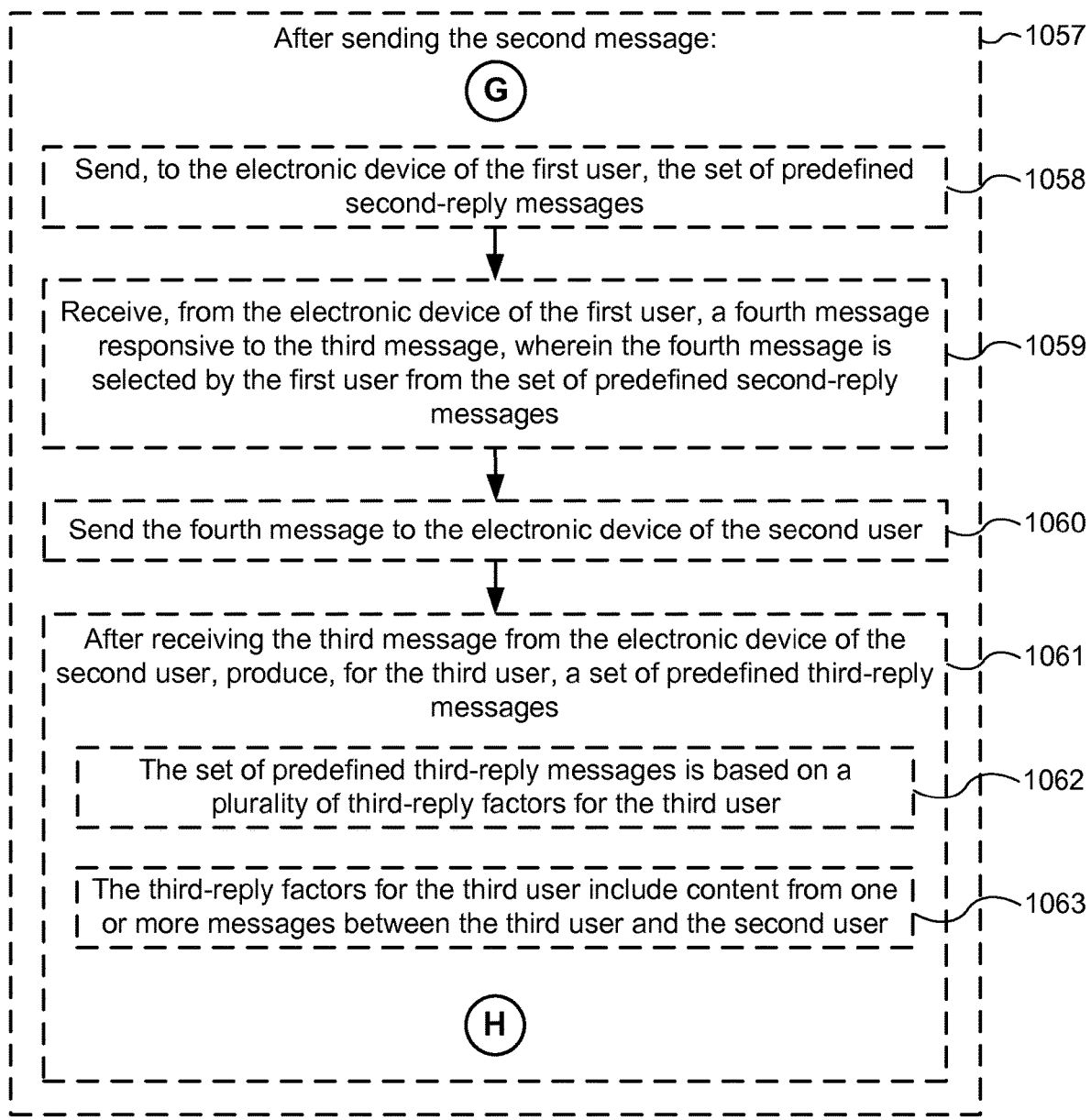
Figure 10H:
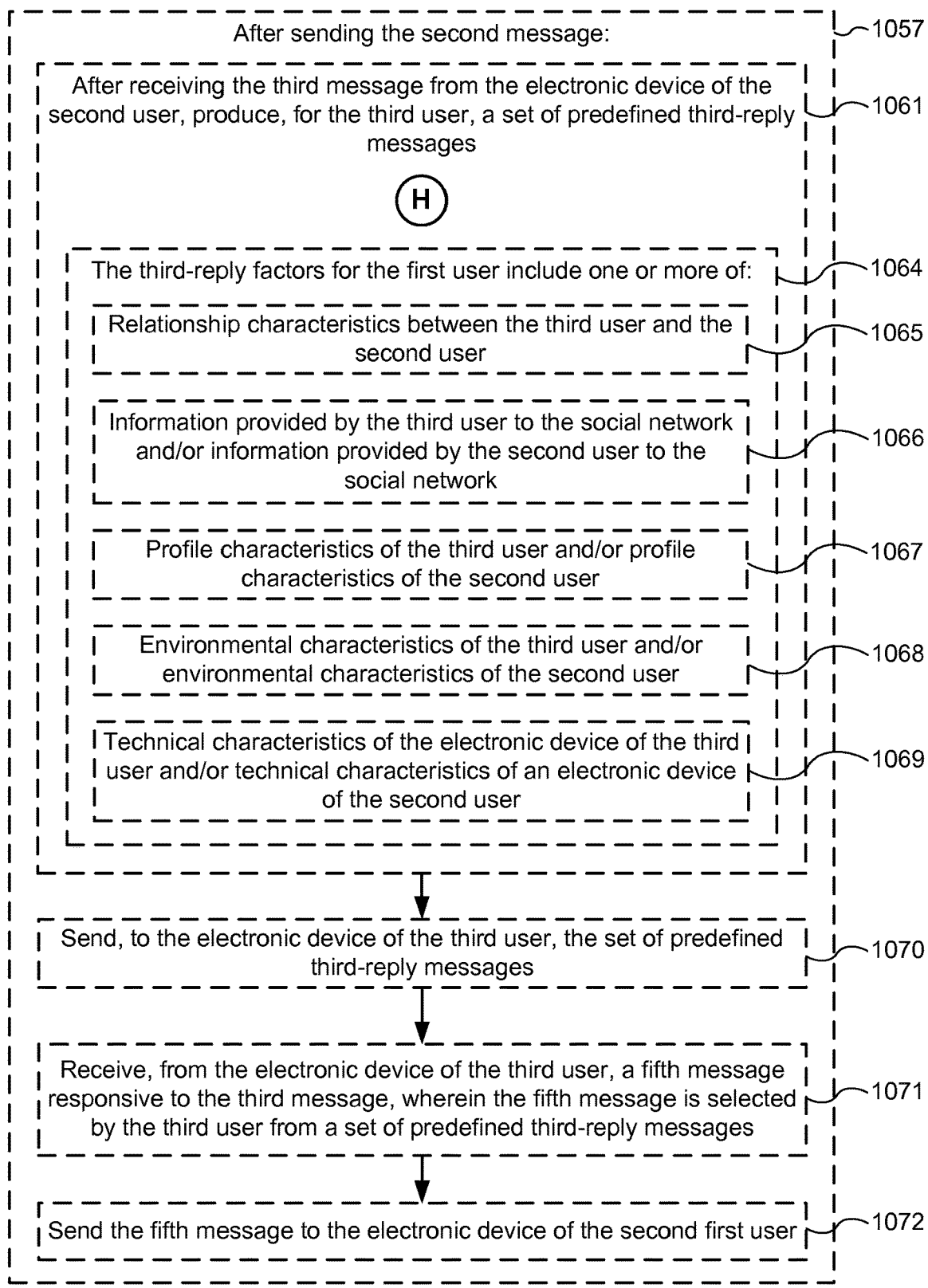

Referring now to FIG. 10F, in some embodiments, after sending (1045) the second message, the server receives (1046) a third message from the electronic device of the second user. In some embodiments, the server sends (1047) the third message to the electronic device of the first user and one or more electronic devices of other users besides the first user, including a third user. In some embodiments, after receiving the third message from the electronic device of the second user, the server produces (1048), for the first user, a set of predefined second-reply messages, wherein the set of predefined second-reply messages is based (1049) on a plurality of second-reply factors for the first user. In some embodiments, the second-reply factors for the first user include (1050) content from one or more messages between the first user and the second user. Furthermore, in some embodiments, the second-reply factors for the first user include (1051) one or more of: relationship characteristics (1052) between the first user and the second user, information provided (1053) by the first user to the social network and/or information provided by the second user to the social network, profile characteristics (1054) of the first user and/or profile characteristics of the second user, environmental characteristics (1055) of the first user and/or environmental characteristics of the second user, and/or technical characteristics (1056) of the electronic device of the first user and/or technical characteristics of an electronic device of the second user. In some embodiments (referring now to FIG. 10G), the server sends (1058), to the electronic device of the first user, the set of predefined second-reply messages, and receives (1059), from the electronic device of the first user, a fourth message responsive to the third message, wherein the fourth message is selected by the first user from the set of predefined second-reply messages. Furthermore, in some embodiments, the server sends (1060) the fourth message to the electronic device of the second user.

In some embodiments, after receiving the third message from the electronic device of the second user, the server produces (1061), for the third user, a set of predefined third-reply messages, wherein the set of predefined third-reply messages is based (1062) on a plurality of third-reply factors for the third user. In some embodiments, the third-reply factors for the third user include (1063) content from one or more messages between the third user and the second user. Furthermore, in some embodiments (referring now to FIG. 10H), the third-reply factors for the third user include (1064) one or more of: relationship characteristics (1065) between the third user and the second user, information provided (1066) by the third user to the social network and/or information provided by the second user to the social network, profile characteristics (1067) of the third user and/or profile characteristics of the second user, environmental characteristics (1068) of the third user and/or environmental characteristics of the second user, and/or technical characteristics (1069) of the electronic device of the third user and/or technical characteristics of an electronic device of the second user. In some embodiments, the server sends (1070), to the electronic device of the third user, the set of predefined third-reply messages, and receives (1071), from the electronic device of the third user, a fifth message responsive to the third message, wherein the fifth message is selected by the third user from a set of predefined third-reply messages. Furthermore, in some embodiments, the server sends (1072) the fifth message to the electronic device of the second first user.

The foregoing embodiments in which a user sends messages to multiple users (e.g., group messaging, FIGS. 10E-10H) are described in greater detail above with respect to FIGS. 9A-9G.

Figure 10I:
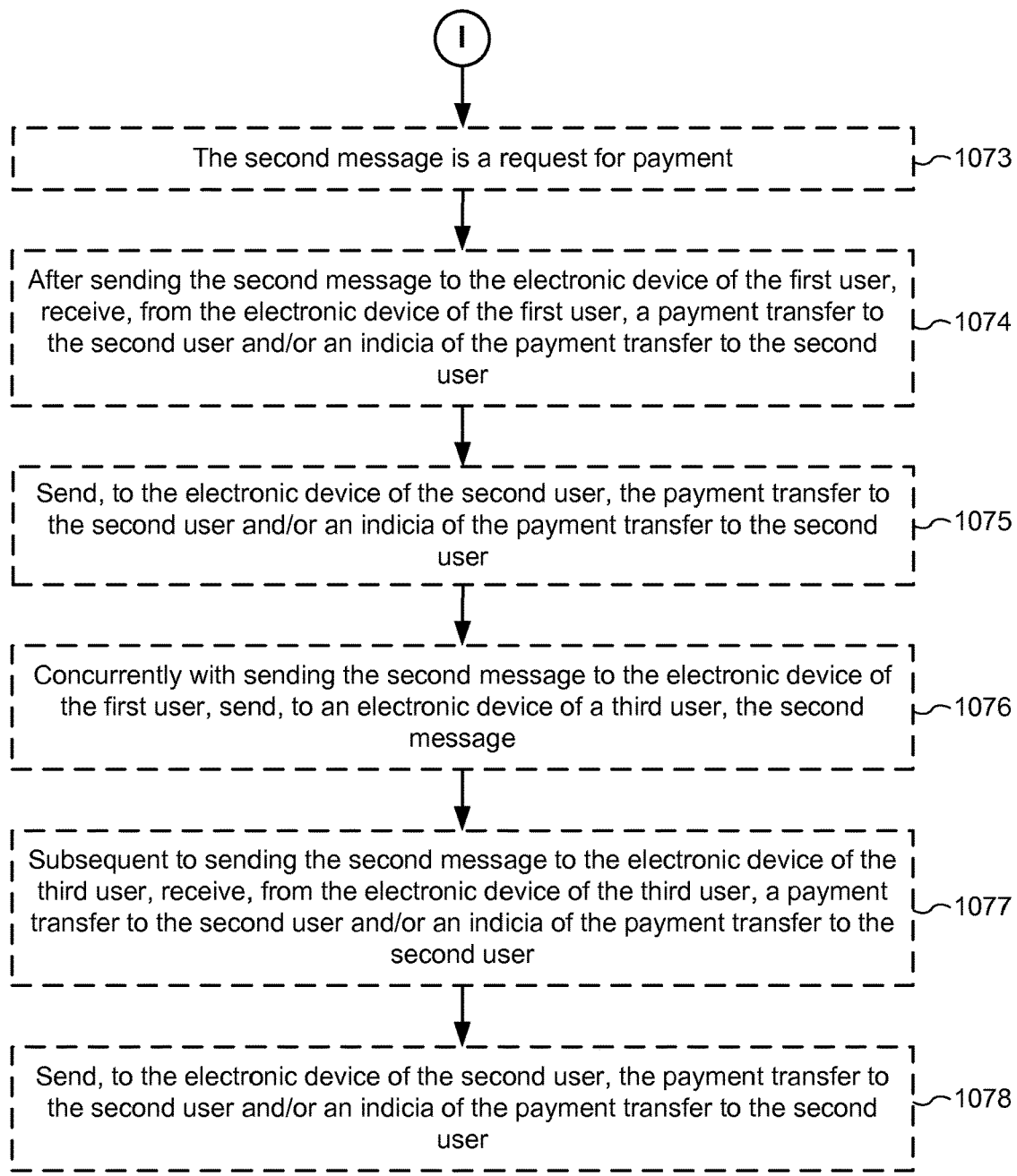

Referring now to FIG. 10I, in some embodiments, after sending the second message to the electronic device of the first user, wherein the second message is a request for payment (1073), the server receives (1074), from the electronic device of the first user, a payment transfer to the second user, a request for a payment transfer, and/or an indicia of the payment transfer to the second user. Furthermore, in some embodiments, the server sends (1075), to the electronic device of the second user, the payment transfer to the second user and/or an indicia of the payment transfer to the second user.

In some embodiments, concurrently with sending the second message to the electronic device of the first user, the server sends (1076), to an electronic device of a third user, the second message. Subsequent to sending the second message to the electronic device of the third user, in some embodiments, the server receives (1077), from the electronic device of the third user, a payment transfer to the second user and/or an indicia of the payment transfer to the second user, and sends (1078), to the electronic device of the second user, the payment transfer to the second user and/or an indicia of the payment transfer to the second user. Payment transfers are described in greater detail above with respect to FIGS. 9A-9G.

Figure 11A:
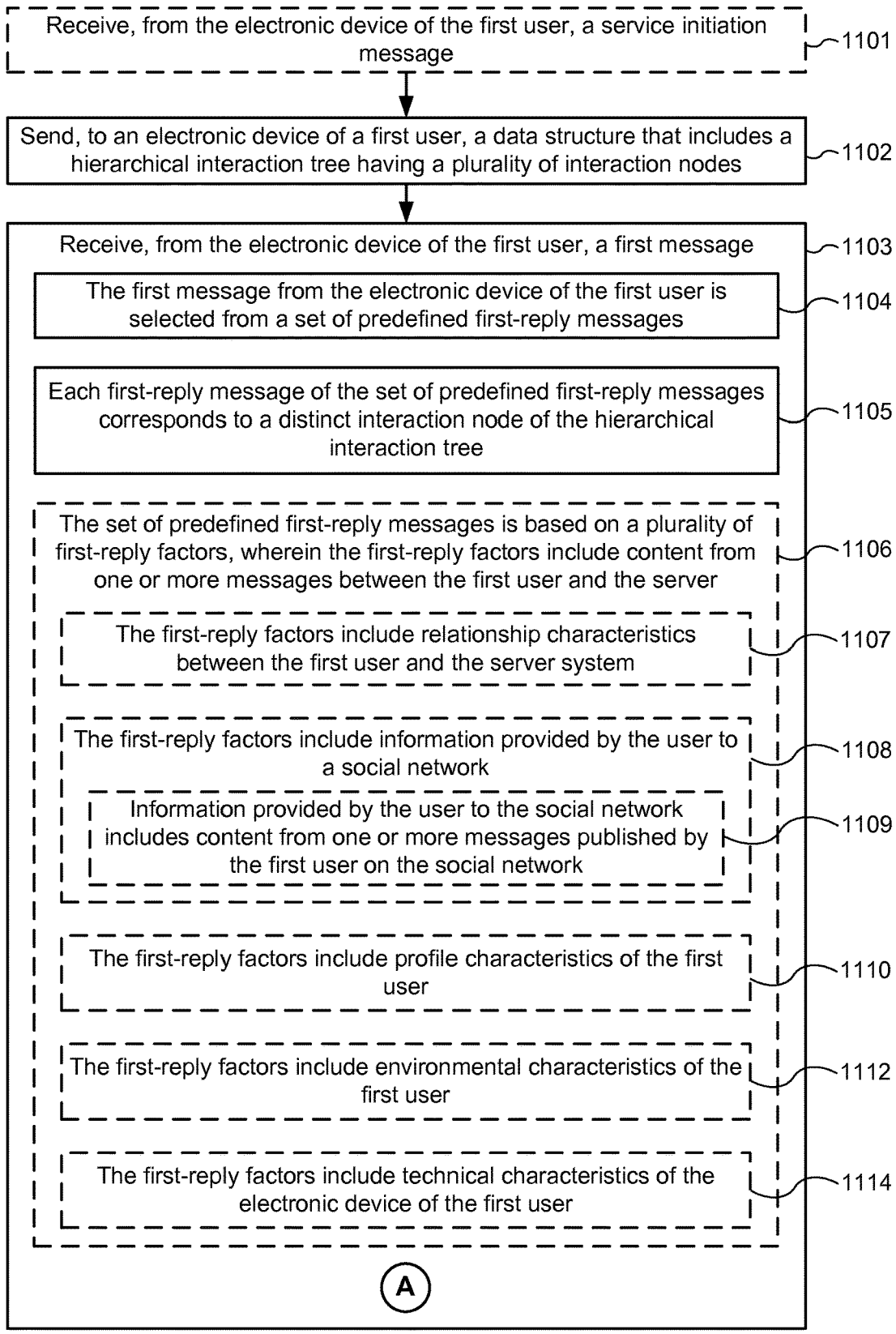
Figure 11B:
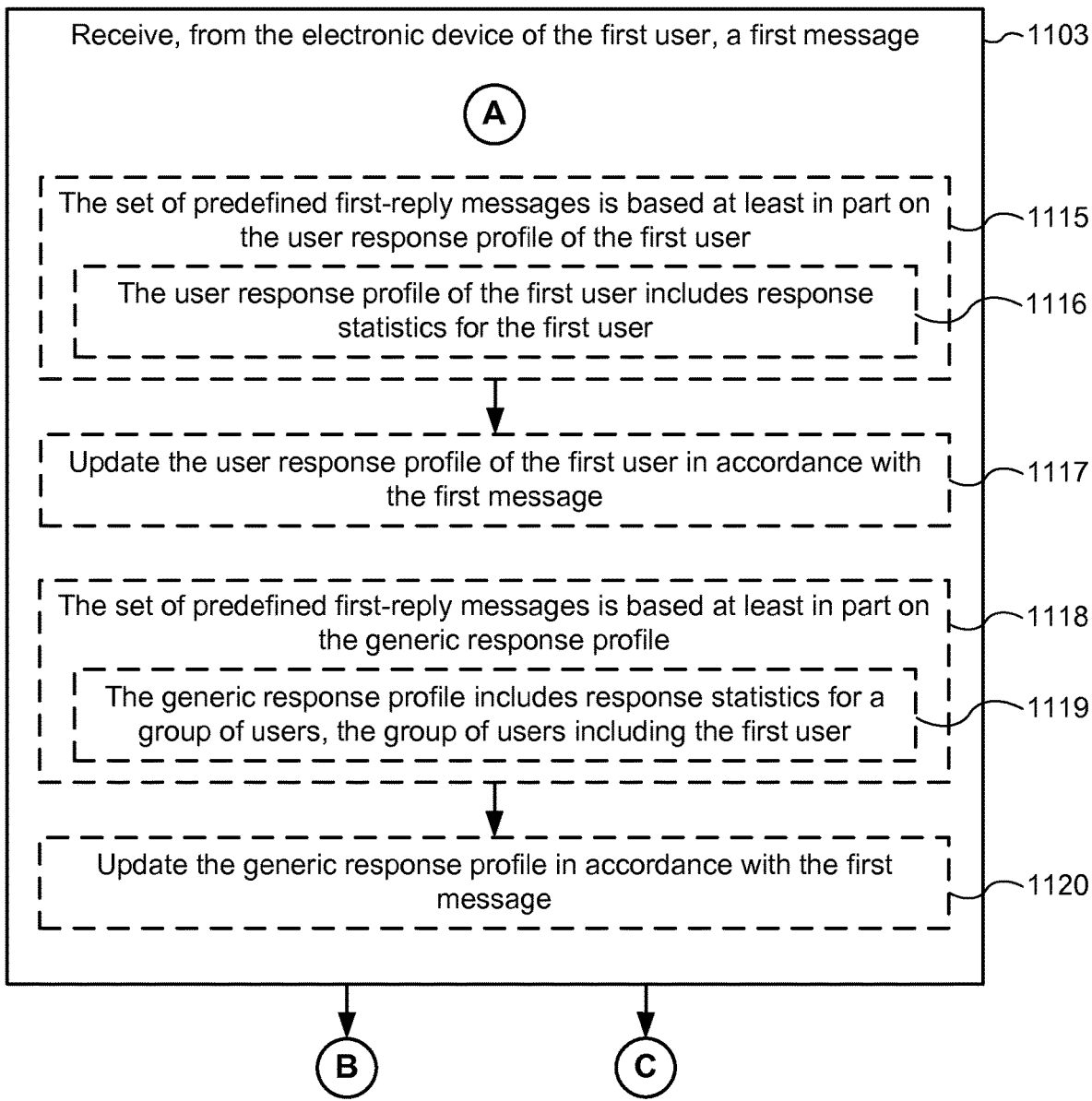
Figure 11C:
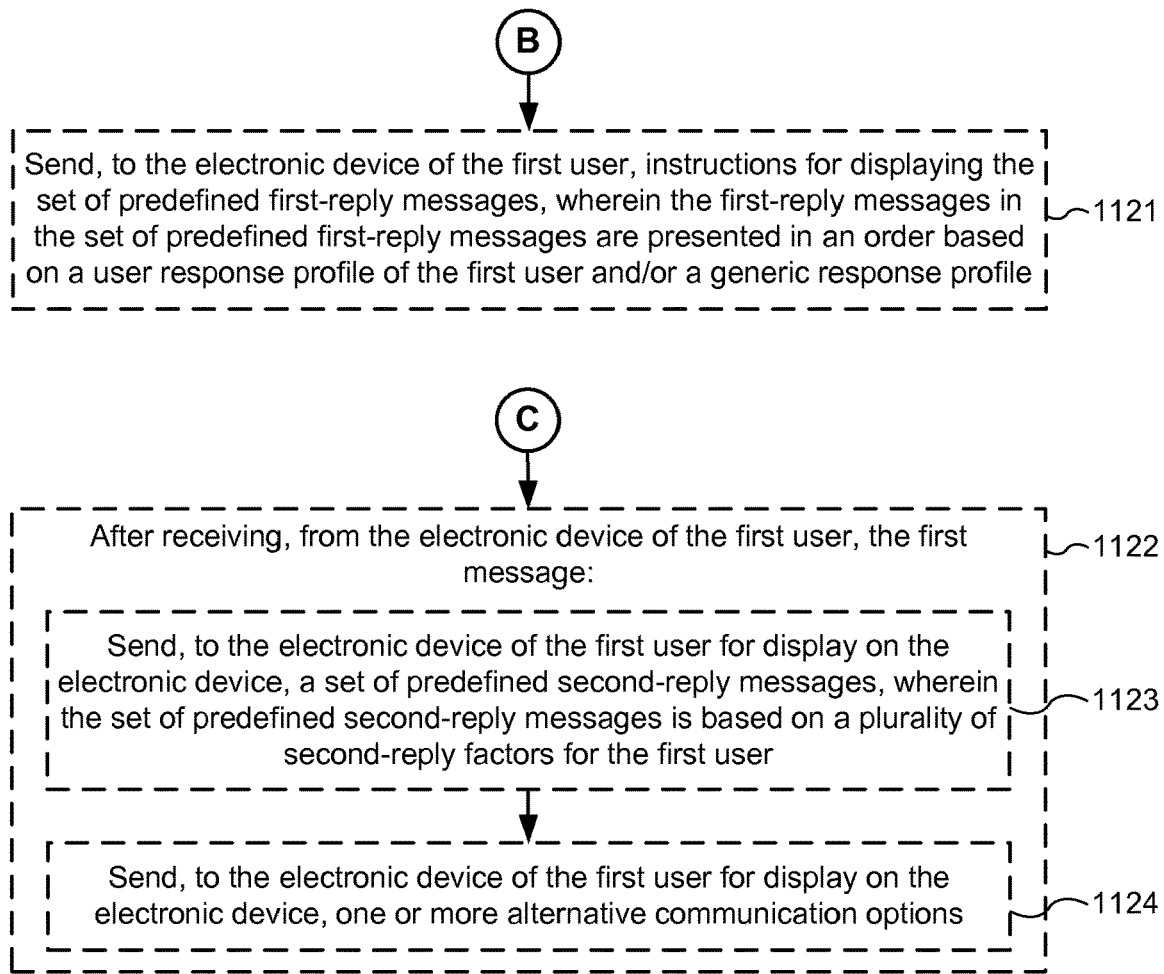

FIGS. 11A-11C are flow diagrams illustrating a method of messaging, in accordance with some embodiments. In some embodiments, the method 1100 is performed on a standalone device (e.g., client 104, where client 104 is acting as a standalone device). In some embodiments, the method 1100 is performed by instructions for an application (e.g., a messaging application) stored in the memory of a standalone device (e.g., messaging module 238, stored in memory 206 of social network system 108, FIG. 2; messaging module 341, stored in memory 306 of client device 104, FIG. 3). In some embodiments, the method 1100 is performed by a server device (e.g., social network system 108, third party servers 110, etc.) that sends information to a client for display. In some embodiments, the method 1100 is performed in part by a client device (e.g., client 104) and in part by a server device (e.g., social network system 108). For ease of reference, the method 1100 will be described below as being performed simply by a server or a server system. It will be understood that, in various embodiments, steps of the method 1100 are performed by any of the aforementioned devices or combination of devices. FIGS. 11A-11C correspond to instructions stored in a computer memory or computer readable storage medium (e.g., memory 206 of the social network system 108 and/or memory 306 of the client device 104).

Furthermore, while various steps of method 1100 refer to particular users (e.g., in describing actions performed with respect to messages, such as sending messages to and receiving messages from a user), it will be understood that in some embodiments, the various steps of method 1100 are with respect to electronic devices of those particular users (e.g., sending messages to and receiving messages from an electronic device of, belonging to, or otherwise associated with a particular user). Similarly, various steps of method 1100 referring to the electronic devices of particular users are also understood to be with respect to the particular users themselves.

The server (e.g., social network system 108, and/or third party server 110-1) sends (1102), to an electronic device of a first user, a data structure that includes a hierarchical interaction tree having a plurality of interaction nodes (e.g., hierarchical interaction tree 800, FIG. 8). In some embodiments, the hierarchical interaction tree is predefined (e.g., an associated business defines the interaction tree and the interconnections between interactive nodes). In some embodiments, the data structure includes the entire hierarchical interaction tree (e.g., all interaction nodes comprising the hierarchical interaction tree). In some embodiments, the data structure includes a portion of the hierarchical interaction tree (e.g., a subset of all interaction nodes comprising the hierarchical interaction tree), where in some embodiments, the portion of the hierarchical interaction tree is based on one or more reply factors for a respective user (e.g., previous messages, profile characteristics, information provided by the user to a social network, etc.), a user response profile for the respective user, and/or a generic response profile. As one example, referring to hierarchical interaction tree 800 of FIG. 8, the portion of the hierarchical interaction tree sent to the first user includes interaction node 801-1 and all other interaction nodes branching from interaction node 801-1 (e.g., including interaction nodes 802, 803, 804, 805, etc.) if a user response profile for the first user indicates that the first user frequently browses (i.e., selects interaction nodes falling within) the "Electronics" product category. Benefits of such implementations include, but are not limited to, improved latency and conserving the storage capacity of user devices.

Optionally, in some embodiments, prior to sending, to the electronic device of the first user, the data structure that includes the hierarchical interaction tree, the server receives (1101), from the electronic device of the first user, a service initiation message, wherein sending the data structure (step 1102) is in response to receiving the service initiation message. For example, referring to FIG. 6B, touch input 603 is detected on user interface element 602-2 (corresponding to "Airline"), which triggers sending a service initiation message. In response, a hierarchical interaction tree (not shown), or a portion thereof, is sent to the user and a set of predefined reply messages (e.g., 604-1 through 604-4) is displayed.

The server receives (1103), from the electronic device of the first user, a first message, where the first message from the electronic device of the first user is selected (1104) from a set of predefined first-reply messages, and each first-reply message of the set of predefined first-reply messages corresponds (1105) to a distinct interaction node of the hierarchical interaction tree. In some embodiments, a set of predefined reply messages comprises the entire hierarchical interaction tree sent to the user (e.g., all interaction nodes comprising the hierarchical interaction tree, or a portion of the hierarchical interaction tree), while in other embodiments, a set of predefined reply messages comprises a portion of the hierarchical interaction tree sent to the user (e.g., a subset of all interaction nodes comprising the hierarchical interaction tree, or a portion of the hierarchical interaction tree). As an example, referring to FIG. 8, the server sends a portion of hierarchical interaction tree 800 (e.g., all interaction nodes connected to interaction node 801-1, "Electronics"), and a respective set of predefined reply messages includes only a subset of all connected interaction nodes (e.g., 802-1 through 802-3).

In some embodiments, the set of predefined first-reply messages is based on (1106) a plurality of first-reply factors, wherein the first-reply factors include content from one or more messages between the first user and the server. Referring to the example of FIG. 6C, the set of predefined reply messages 605-1 through 605-3 is based on content from a previous message (e.g., "STATUS," message 604-1) between the user of client device 104-1 and "Airline." In particular, given the previous message sent by the user (e.g., "STATUS," message 604-1), predefined reply messages 605-1 through 605-3 correspond to different departure cities, as a departure city must be specified to complete the flight status request indicated by message 604-1 (e.g., "STATUS"). The content of messages as a reply factor is described in greater detail with respect to FIGS. 9A-9G.

In some embodiments, the first-reply factors include relationship characteristics (1107) between the first user and the server system. For example, relationship characteristics between the first user and the server system include a membership/subscription status with respect to business (e.g., trial user, premium member). Relationship characteristics as a reply factor are described in greater detail with respect to FIGS. 9A-9G.

In some embodiments, the first-reply factors include information provided (1108) by the user to a social network. In some embodiments, information provided by the user to the social network includes content from one or more messages published (1109) by the first user on the social network (e.g., posts, comments, statuses, etc.). As an example, referring to FIG. 6C, the set of predefined reply messages 605-1 through 605-3 includes predefined reply message 605-1 ("SJC") based on a location check-in by the user of client device 104-1, where the user indicates that the user is currently located at an airport in San Jose, Calif. As another example, referring to FIG. 6D, the set of predefined reply messages 607-1 through 607-3 includes predefined reply message 607-1 ("MIA") based on previous social network posts published by the user indicating upcoming travel plans to Miami, Fla. (e.g., posts stating "Headed to Miami tomorrow!" and "Can't wait for Miami!"). Information provided by a user to a social network as a reply factor is described in greater detail with respect to FIGS. 9A-9G.

In some embodiments, the first-reply factors include profile characteristics (1110) of the first user (e.g., demographic information, listed interests, etc.). For example, referring to FIG. 8, a set of predefined reply messages for a user includes a predefined reply message corresponding to interaction node 802-3 ("CAMERA"), based on the user listing "Photography" as a hobby. Profile characteristics as a reply factor are described in greater detail with respect to FIGS. 9A-9G.

In some embodiments, the first-reply factors include environmental characteristics (1112) of the first user (e.g., GPS coordinates of a user's current location). For example, if the GPS coordinates of a user's device indicate that the user is present at the physical location of retail business, then a respective set of predefined reply messages presented to the user will be different from a respective set of predefined reply messages presented to the user when the user's device is detected at a different location (e.g., for a clothing store, predefined reply messages presented in-store represent a catalogue of their products, such as "SHIRTS," "PANTS," "DRESSES," whereas offsite, the predefined reply messages presented include "HOURS," "LOCATION," "CONTACT"). FIG. 6E illustrates a different example, where a set of predefined reply messages is based on a current time (e.g., based on a current time of 7:00 AM, predefined reply message 608-1 is presented, which represents a flight with a departure time (8:15 AM) closest to the current time). Environmental characteristics as a reply factor are described in greater detail with respect to FIGS. 9A-9G.

In some embodiments, the first-reply factors include technical characteristics (1114) of the electronic device of the first user (e.g., client device is a mobile device). Technical characteristics as a reply factor are described in greater detail with respect to FIGS. 9A-9G.

Referring now to FIG. 11B, optionally, the set of predefined first-reply messages is based (1115) at least in part on the user response profile of the first user, where in some embodiments, the user response profile of the first user includes (1116) response statistics for the first user. In some embodiments, the server updates (1117) the user response profile in accordance with the first message. Furthermore, in some embodiments, the set of predefined first-reply messages is based (1118) at least in part on the generic response profile, where in some embodiments, the generic response profile includes (1119) response statistics for a group of users, the group of users including the first user. As an example, referring to hierarchical interaction tree 800 of FIG. 8, a set of predefined reply messages includes predefined reply message 802-1 ("HOME VIDEO") and 802-1 ("HOME AUDIO"), but not 802-3 ("CAMERA"), if the user response profile for a user indicates that the user frequently browses (i.e., selects interaction nodes falling within) the "HOME VIDEO" and "HOME AUDIO" categories. In some embodiments, the server sends (1121), to the electronic device of the first user, instructions for displaying the set of predefined first-reply messages, wherein the first-reply messages in the set of predefined first-reply messages are presented in an order based on a user response profile of the first user and/or a generic response profile. User response profiles and generic response profiles are described in greater detail above with respect to FIGS. 9A-9G.

In some embodiments, after receiving (1122), from the electronic device of the first user, the first message, the server send (1123), to the electronic device of the first user for display on the electronic device, a set of predefined second-reply messages, wherein the set of predefined second-reply messages is based on a plurality of second-reply factors for the first user, and sends (1124), to the electronic device of the first user for display on the electronic device, one or more alternative communication options (e.g., placing a phone call, sending an e-mail, visit external website, etc.). For example, referring to FIG. 6C, if a user prefers to speak with a customer service representative by phone (e.g., predefined reply messages do not list the desired departure city, user wishes to bypass navigating the hierarchical interaction tree, etc.), the user is presented with alternative communication option 605-5 (e.g., "Speak to Rep") in addition to predefined reply messages 605-1 through 605-3.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at an electronic device of a second user, the electronic device having a processor and memory storing instructions for execution by the processor:
    receiving, from a first user, a first message;
    receiving, from an electronic device distinct from the electronic device of the second user, a set of predefined first-reply messages for the second user, wherein:
        the set of predefined first-reply messages is based on a plurality of first-reply factors for the second user; and
        the first-reply factors for the second user include:
            content from one or more messages between the first user and the second user;
            one or more response statistics for the second user including (i) a first frequency with which the second user selects any predefined reply messages and (ii) a second frequency with which the second user sends any user-defined custom reply messages, wherein the set of predefined first-reply messages is filtered based on the first and the second frequencies; and
            a location of the first user and a location of the second user; and
    receiving a selection of a first-reply message of the set of first-reply messages by the second user; and
    transmitting the selected first-reply message to the first user.

2. The method of claim 1, further comprising:
    prior to transmitting the selected first-reply message, receiving, from a remote server, the set of predefined first-reply messages.

3. The method of claim 1, further comprising:
subsequent to transmitting the selected first-reply to the first user:
receiving, from the first user, a third message responsive to the transmitted first-reply message, wherein:
the third message is selected by the first user from a set of predefined second-reply messages;
the set of predefined second-reply messages is based on a plurality of second-reply factors for the first user;
the second-reply factors for the first user include content from one or more messages between the first user and the second user; and
the second-reply factors for the first user include one or more of:
relationship characteristics between the first user and the second user;
information provided by the first user to a social network and/or information provided by the second user to the social network;
profile characteristics of the first user and/or profile characteristics of the second user;
the location of the first user and/or the location of the second user; and/or
technical characteristics of the electronic device of the first user and/or technical characteristics of an electronic device of the second user.

4. The method of claim 1, wherein a messaging application at the electronic device of the second user receives the first message and transmits the selected first-reply message, the method further comprising:
in accordance with a determination that application-launch criteria are satisfied by content in the first message and/or content in the selected first-reply message, activating and displaying an application distinct from the messaging application.

5. The method of claim 1, further comprising:
subsequent to transmitting the selected first-reply message to the first user:
receiving, from the first user, a third message responsive to the transmitted first-reply message;
receiving a set of predefined second-reply messages, wherein the set of predefined second-reply messages is based on a plurality of second-reply factors for the second user;
displaying the set of predefined second-reply messages;
displaying one or more alternative communication options; and
detecting selection of an alternative communication option from the one or more alternative communication options.

6. The method of claim 1, further comprising:
after transmitting the selected first-reply message:
transmitting a third message to the first user and one or more other users besides the first user, including a third user;
receiving, from the first user, a fourth message responsive to the third message, wherein:
the fourth message is selected by the first user from a set of predefined second-reply messages;
the set of predefined second-reply messages is based on a plurality of second-reply factors for the first user;
the second-reply factors for the first user include content from one or more messages between the first user and the second user; and
the second-reply factors for the first user include one or more of:
relationship characteristics between the first user and the second user;
information provided by the first user to a social network and/or information provided by the second user to the social network;
profile characteristics of the first user and/or profile characteristics of the second user;
the location of the first user and/or the location of the second user; and/or
technical characteristics of the electronic device of the first user and/or technical characteristics of an electronic device of the second user; and
receiving, from the third user, a fifth message responsive to the third message, wherein:
the fifth message responsive to the third message is selected by the third user from a set of predefined third-reply messages;
the set of predefined third-reply messages is based on a plurality of third-reply factors for the third user;
the third-reply factors for the third user include content from one or more messages between the third user and the second user; and
the third-reply factors for the third user include one or more of:
relationship characteristics between the third user and the second user;
information provided by the third user to the social network and/or information provided by the second user to the social network;
profile characteristics of the third user and/or profile characteristics of the second user;
a location of the third user and/or the location of the second user; and/or
technical characteristics of the electronic device of the third user and/or technical characteristics of an electronic device of the second user.

7. The method of claim 1, wherein the selected first-reply message is a request for payment, the method further comprising:
after transmitting the selected first-reply message to the first user, receiving, from the first user, a payment transfer to the second user and/or an indicia of a payment transfer to the second user.

8. The method of claim 7, further comprising:
concurrently with transmitting the selected first-reply message to the first user, transmitting, to a third user, the selected first-reply message; and
subsequent to transmitting the selected first-reply message to the third user, receiving, from the third user, a payment transfer to the second user and/or an indicia of a payment transfer to the second user.

9. The method of claim 1, further comprising:
updating a user response profile of the second user in accordance with the selected first-reply message, wherein:
the set of predefined first-reply messages is based at least in part on the user response profile of the second user; and
the user response profile of the second user includes response statistics for the second user.

10. The method of claim 1, wherein the first-reply messages in the set of predefined first-reply messages are presented in an order based on a generic response profile.

11. The method of claim 1 wherein the one or more response statistics comprises contextual information indicating the context in which predefined first-reply messages are selected by the second user.

12. The method of claim 1, wherein the electronic device includes a display and the method further comprises:
displaying, on the display, a pop-up window including the set of predefined first-reply messages.

13. A method, comprising:
at a server system having a processor and memory storing instructions for execution by the processor:
receiving a first message from an electronic device of a first user;
after receiving the first message from the electronic device of the first user, sending the first message to an electronic device of a second user;
after receiving the first message from the electronic device of the first user, producing, for the second user, a set of predefined first-reply messages, wherein:
the set of predefined first-reply messages is based on a plurality of first-reply factors for the second user, including;
content from one or more messages between the first user and the second user; and
one or more response statistics for the second user including (i) a first frequency with which the second user selects any predefined reply messages and (ii) a second frequency with which the second user sends any user-defined custom reply messages, wherein the set of predefined first-reply messages is filtered based on the first and the second frequencies; and
a location of the first user and a location of the second user;
sending, to the electronic device of the second user, the set of predefined first-reply messages;
receiving, from the electronic device of the second user, a selection of a first-reply message of the set of first-reply messages; and
sending the selected first-reply message to the electronic device of the first user.

14. The method of claim 13, further comprising:
subsequent to receiving the selection of a first-reply message from the electronic device of the second user:
producing, for the first user, a set of predefined second-reply messages, wherein:
the set of predefined second-reply messages is based on a plurality of second-reply factors for the first user;
the second-reply factors for the first user include content from one or more messages between the first user and the second user; and
the second-reply factors for the first user include one or more of:
relationship characteristics between the first user and the second user;
information provided by the first user to a social network and/or information provided by the second user to the social network;
profile characteristics of the first user and/or profile characteristics of the second user;
the location of the first user and/or the location of the second user; and/or
technical characteristics of the electronic device of the first user and/or technical characteristics of an electronic device of the second user;
sending, to the electronic device of the first user, the set of predefined second-reply messages; and
receiving, from the electronic device of the first user, a third message responsive to the selected first-reply message sent to the first user, wherein the third message is selected by the first user from the set of predefined second-reply messages; and
sending the third message to the electronic device of the second user.

15. The method of claim 13, wherein the first message is sent to a messaging application on the electronic device of the second user, the set of predefined first-reply messages is sent to the messaging application, and the selected first-reply message is received from the messaging application, the method further comprising:
in accordance with a determination that application-launch criteria are satisfied by content in the first message and/or content in the selected first-reply message, sending instructions for activating and displaying an application, distinct from the messaging application, to the electronic device of the second user.

16. The method of claim 13, further comprising:
subsequent to sending the selected first-reply message to the electronic device of the first user:
receiving, from the electronic device of the first user, a third message responsive to the selected first-reply message sent to the first user;
producing, for the second user, a set of predefined second-reply messages, wherein the set of predefined second-reply messages is based on a plurality of second-reply factors for the second user;
sending, to the electronic device of the second user, the set of predefined second-reply messages;
sending, to the electronic device of the second user, instructions for displaying the set of predefined second-reply messages;
sending, to the electronic device of the second user, instructions for displaying one or more alternative communication options; and
receiving user selection of an alternative communication option from the one or more alternative communication options.

17. The method of claim 13, wherein the selected first-reply message is a request for payment, the method further comprising:
after sending the selected first-reply message to the electronic device of the first user, receiving, from the electronic device of the first user, a payment transfer to the second user and/or an indicia of the payment transfer to the second user; and
sending, to the electronic device of the second user, the payment transfer to the second user and/or the indicia of the payment transfer to the second user.

18. The method of claim 17, further comprising:
concurrently with sending the selected first-reply message to the electronic device of the first user, sending, to an electronic device of a third user, the selected first-reply message; and
subsequent to sending the selected first-reply message to the electronic device of the third user, receiving, from the electronic device of the third user, a payment transfer to the second user and/or the indicia of the payment transfer to the second user; and
sending, to the electronic device of the second user, the payment transfer to the second user and/or the indicia of the payment transfer to the second user.

19. The method of claim 13, further comprising:
updating a user response profile of the second user in accordance with the selected first-reply message, wherein:

the set of predefined first-reply messages is based at least in part on the user response profile of the second user; and the user response profile of the second user includes response statistics for the second user.

20. The method of claim 19, further comprising:
updating a generic response profile in accordance with the selected first-reply message, wherein:

the set of predefined first-reply messages is based at least in part on the generic response profile; and the generic response profile includes response statistics for a group of users, the group of users including the first user and second user.

21. The method of claim 13, further comprising:
sending, to the electronic device of the second user, instructions for displaying the set of predefined first-reply messages, wherein the first-reply messages in the set of predefined first-reply messages are presented in an order based on a user response profile of the first user and a generic response profile.

22. An electronic device, comprising:
one or more processors; and
memory, the memory storing one or more programs that are configured to be executed by the one or more processors, the one or more programs including instructions for:

receiving a first message from an electronic device of a first user;

after receiving the first message from the electronic device of the first user, sending the first message to an electronic device of a second user;

after receiving the first message from the electronic device of the first user, producing, for the second user, a set of predefined first-reply messages, wherein:

the set of predefined first-reply messages is based on a plurality of first-reply factors for the second user;

the first-reply factors for the second user include:
content from one or more messages between the first user and the second user;

one or more response statistics for the second user including (i) a first frequency with which the second user selects any predefined reply messages and (ii) a second frequency with which the second user sends any user-defined reply custom messages, wherein the set of predefined first-reply messages is filtered based on the first and the second frequencies; and a location of the first user and a location of the second user;

sending, to the electronic device of the second user, the set of predefined first-reply messages;

receiving, from the electronic device of the second user, a selected first-reply message responsive to the first message received from the first user, wherein the selected first-reply message is selected by the second user from the set of predefined first-reply messages; and sending the selected first-reply message to the electronic device of the first user.

23. A non-transitory computer readable storage medium storing one or more programs configured to be executed by one or more processors of an electronic device, the one or more programs including instructions for:

receiving a first message from an electronic device of a first user;

after receiving the first message from the electronic device of the first user, sending the first message to an electronic device of a second user;

after receiving the first message from the electronic device of the first user, producing, for the second user, a set of predefined first-reply messages, wherein:

the set of predefined first-reply messages is based on a plurality of first-reply factors for the second user;

the first-reply factors for the second user include:
content from one or more messages between the first user and the second user;

one or more response statistics for the second user including (i) a first frequency with which the second user selects any predefined reply messages and (ii) a second frequency with which the second user sends any user-defined custom reply messages, wherein the set of predefined first-reply messages is filtered based on the first and the second frequencies; and a location of the first user and a location of the second user; and sending, to the electronic device of the second user, the set of predefined first-reply messages;

receiving, from the electronic device of the second user, a selected first-reply message responsive to the first message received from the first user, wherein the selected first-reply message is selected by the second user from the set of predefined first-reply messages; and sending the selected first-reply message to the electronic device of the first user.

\* \* \* \* \*